(12) United States Patent
Du et al.

(10) Patent No.: US 11,265,265 B2
(45) Date of Patent: Mar. 1, 2022

(54) DATA COMMUNICATIONS SYSTEM AND METHOD

(71) Applicant: HUAWEI TECHNOLOGIES CO., LTD., Guangdong (CN)

(72) Inventors: Anxue Du, Dongguan (CN); Lianqiang Wang, Beijing (CN); Chong Chen, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/035,455

(22) Filed: Sep. 28, 2020

(65) Prior Publication Data
US 2021/0029058 A1    Jan. 28, 2021

Related U.S. Application Data

(63) Continuation of application No. PCT/CN2019/079815, filed on Mar. 27, 2019.

(30) Foreign Application Priority Data

Apr. 3, 2018    (CN) .................... 201810291272.X

(51) Int. Cl.
*H04L 12/28* (2006.01)
*H04L 49/15* (2022.01)
(Continued)

(52) U.S. Cl.
CPC .............. *H04L 49/15* (2013.01); *H04L 49/10* (2013.01); *H04L 49/45* (2013.01)

(58) Field of Classification Search
None
See application file for complete search history.

(56) References Cited

U.S. PATENT DOCUMENTS 5,751,596 A    5/1998  Ginei et al.
6,826,195 B1 *  11/2004  Nikolich ............ H04Q 11/0478
                                                   370/400
(Continued)

FOREIGN PATENT DOCUMENTS

CN          1209005 A     2/1999
CN        101442442 A     5/2009
(Continued)

*Primary Examiner* — Elisabeth Benoit Magloire
(74) *Attorney, Agent, or Firm* — Womble Bond Dickinson (US) LLP

(57) ABSTRACT

This application provides a data communications system and method. The system includes a first chassis and a second chassis. The first chassis includes a first high-performance switching module and a first low-performance switching module. The second chassis includes a second high-performance switching module and a second low-performance switching module. The first high-performance switching module is connected to the second low-performance switching module. The first low-performance switching module is connected to the second high-performance switching module. The first high-performance switching module is configured to connect to a third low-performance switching module in a third chassis that is to be added to the communications system. The second high-performance switching module is configured to connect to a fourth low-performance switching module in the third chassis that is to be added to the communications system. During capacity expansion, there is no need to change cables between deployed chassis.

20 Claims, 28 Drawing Sheets

(51) Int. Cl.
*H04L 49/10* (2022.01)
*H04L 49/45* (2022.01)

(56) References Cited

U.S. PATENT DOCUMENTS

| | | | |
|---|---|---|---|
| 7,552,262 | B1 | 6/2009 | Turner et al. |
| 7,872,989 | B1* | 1/2011 | Tong ................. H04L 45/00 370/254 |
| 9,225,666 | B1 | 12/2015 | Aybay |
| 2006/0203820 | A1 | 9/2006 | Coluccio |
| 2007/0211712 | A1 | 9/2007 | Fitch et al. |
| 2015/0349970 | A1* | 12/2015 | Wang ................. H04L 45/16 370/254 |
| 2016/0149816 | A1 | 5/2016 | Wu et al. |
| 2016/0315881 | A1 | 10/2016 | Pierson |
| 2018/0359194 | A1* | 12/2018 | Yang ................ H04B 10/801 |
| 2018/0367408 | A1* | 12/2018 | Li ................... H04L 41/0893 |
| 2019/0089627 | A1* | 3/2019 | Mirsky .............. H04L 45/50 |
| 2019/0182202 | A1* | 6/2019 | Garcia Del Rio ...... H04L 45/28 |
| 2019/0253777 | A1* | 8/2019 | Yang ............... H04Q 11/0071 |

FOREIGN PATENT DOCUMENTS

| | | |
|---|---|---|
| CN | 102273150 A | 12/2011 |
| CN | 105119849 A | 12/2015 |
| CN | 105379196 A | 3/2016 |
| CN | 106656804 A | 5/2017 |
| CN | 108768899 A | 11/2018 |
| EP | 2372961 A1 | 10/2011 |
| EP | 3029899 A1 | 6/2016 |
| JP | 2008535402 A | 8/2008 |
| JP | 2014096656 A | 5/2014 |
| WO | 2005072174 A2 | 8/2005 |

\* cited by examiner

DATA COMMUNICATIONS SYSTEM AND METHOD

CROSS-REFERENCE TO RELATED APPLICATIONS

This application is a continuation of International Application No. PCT/CN2019/079815, filed on Mar. 27, 2019, which claims priority to Chinese Patent Application No. 201810291272.X, filed on Apr. 3, 2018. The disclosures of the aforementioned applications are hereby incorporated by reference in their entireties.

TECHNICAL FIELD

This application relates to communications technologies, and in particular, to a data communications system and method.

BACKGROUND

Development of communications technologies has resulted in application and development of a multi-chassis cluster data communications device system. The multi-chassis cluster data communications device system includes a plurality of data communications chassis that are connected to implement internal and external data exchange tasks between data communications chassis.

A central switching chassis needs to be disposed and connected to each data communications chassis in the multi-chassis cluster data communications device system, so that each data communications chassis completes a data exchange task between chassis by using the central switching chassis. Specifically, m data switching modules are deployed in each data communications chassis, and m central switching modules are deployed in the central switching chassis, where m is a positive integer. Each data switching module in the data communications chassis is connected to one central switching module in a one-to-one correspondence, so that the data communications chassis completes the data exchange task between the chassis by using a data switching module and a central switching module corresponding to the data switching module.

However, a manner of deploying the central switching chassis in the multi-chassis cluster data communications device system needs to occupy a footprint. Further, the multi-chassis cluster data communications device system needs to occupy a comparatively large equipment room area, which is inconvenient for deployment of the multi-chassis cluster data communications device system. In addition, when the central switching chassis is deployed, hardware devices such as a power supply unit, a heat dissipation unit, and a control unit need to be configured for the central switching chassis. These hardware devices need to consume a large amount of power consumption. As a result, costs are increased.

SUMMARY

This application provides a data communications system and method, to resolve a problem that a multi-chassis cluster data communications device system with a central switching chassis occupies a large footprint, consumes a large amount of power consumption, and has comparatively high costs.

A first aspect of this application provides a data communications system, including a first chassis and a second chassis, where the first chassis includes a first high-performance switching module and a first low-performance switching module;

the second chassis includes a second high-performance switching module and a second low-performance switching module;

the first high-performance switching module is connected to the second low-performance switching module, and the first low-performance switching module is connected to the second high-performance switching module; and the first high-performance switching module is configured to connect to a third low-performance switching module in a third chassis that is to be added to the communications system, and the second high-performance switching module is configured to connect to a fourth low-performance switching module in the third chassis that is to be added to the communications system. Therefore, a central switching chassis is removed, and only a type-A service chassis and a type-B service chassis are deployed. The type-A service chassis is a service chassis that includes a high-performance switching module. The type-B service chassis is a service chassis that does not include a high-performance switching module but includes only a low-performance switching module. Therefore, a footprint of the data communications system is reduced. In addition, because the central switching chassis is removed, there is no need to add an auxiliary hardware device, and power consumption and costs are reduced. A structure of the data communications system provided in the first aspect has a feature of smooth expansion. During capacity expansion of the data communications system including the first chassis and the second chassis, the third chassis that is to be added to the system can be separately connected to the first chassis and the second chassis without changing cables and interfaces between the first chassis and the second chassis. This facilitates the capacity expansion, so that a back-to-back cluster system may be smoothly expanded to a multi-chassis cluster data communications system in this embodiment.

In one embodiment, the data communications system further includes a fourth chassis, and the fourth chassis includes a fifth low-performance switching module and a sixth low-performance switching module, and the first high-performance switching module is connected to the fifth low-performance switching module, and the second high-performance switching module is connected to the sixth low-performance switching module. Therefore, during capacity expansion of the data communications system including the first chassis, the second chassis, and the fourth chassis, the third chassis that is to be added to the system can be separately connected to the first chassis and the second chassis without changing cables and interfaces between the first chassis, the second chassis, and the fourth chassis. This facilitates the capacity expansion, so that the back-to-back cluster system may be smoothly expanded to the multi-chassis cluster data communications system in this embodiment.

In one embodiment, the data communications system further includes a fifth chassis, the fifth chassis includes a third high-performance switching module, a seventh low-performance switching module, and an eighth low-performance switching module, the first chassis further includes a ninth low-performance switching module, and the second chassis further includes a tenth low-performance switching module, the third high-performance switching module is connected to the ninth low-performance switching module and the tenth low-performance switching module, the first high-performance switching module is connected to the seventh low-performance switching module, and the second high-performance switching module is connected to the eighth low-performance switching module, and the third high-performance switching module is configured to connect to an eleventh low-performance switching module in the third chassis that is to be added to the communications system. Therefore, during capacity expansion of the data communications system including a plurality of type-A service chassis, a type-B service chassis that is to be added to the system can be separately connected to the type-A service chassis without changing cables and interfaces between the type-A service chassis. This facilitates the capacity expansion, and implements the smooth capacity expansion.

In one embodiment, the data communications system further includes a sixth chassis, and the sixth chassis includes a twelfth low-performance switching module, a thirteenth low-performance switching module, and a fourteenth low-performance switching module, and the twelfth low-performance switching module is connected to the first high-performance switching module, the thirteenth low-performance switching module is connected to the second high-performance switching module, and the fourteenth low-performance switching module is connected to the third high-performance switching module. Therefore, during capacity expansion of the data communications system including the plurality of type-A service chassis, and at least one type-B service chassis, a type-B service chassis that is to be added to the system can be separately connected to the type-A service chassis without changing cables and interfaces between the type-A service chassis, or cables and interfaces between the deployed type-B service chassis and the type-A service chassis. This facilitates the capacity expansion, and implements the smooth capacity expansion.

In one embodiment, the first chassis further includes a first service forwarding module and a second service forwarding module, the first service forwarding module and the second service forwarding module are configured to communicate with a device outside the data communications system, and the first low-performance switching module is configured to:

send data received from the first service forwarding module to the second high-performance switching module; and send data received from the second high-performance switching module to the second service forwarding module. Therefore, a service forwarding module is disposed in the first chassis, and in other words, the service forwarding module is disposed in each type-A service chassis, so that a chassis in the data communications system may communicate with another device outside the data communications system by using the service forwarding module. In addition, each type-A service chassis may complete data exchange between the chassis in the data communications system by using the service forwarding module, a low-performance switching module in a current type-A service chassis, and a high-performance switching module in another type-A service chassis.

In one embodiment, the first chassis further includes a third service forwarding module and a fourth service forwarding module, the third service forwarding module and the fourth service forwarding module are configured to communicate with the device outside the data communications system, and the first high-performance switching module is configured to:

send data received from the third service forwarding module to the second low-performance switching module; and send data received from the second low-performance switching module to the fourth service forwarding module. Therefore, a plurality of service forwarding modules are disposed in the first chassis, and in other words, the plurality of service forwarding modules are disposed in each type-A service chassis, so that the chassis in the data communications system may communicate with the another device outside the data communications system by using the service forwarding module. In addition, each type-A service chassis may complete the data exchange between the chassis in the data communications system by using the service forwarding module, a high-performance switching module in a current type-A service chassis, and a low-performance switching module in another type-A service chassis.

In one embodiment, the first high-performance switching module is configured to:

after the third chassis is added to the communications system, send data received from the third low-performance switching module to the second low-performance switching module; and after the third chassis is added to the communications system, send data received from the second low-performance switching module to the third low-performance switching module. Therefore, when the data communications system includes two type-A service chassis and one type-B service chassis, data may be sent and received between each type-A service chassis and the type-B service chassis by using a low-performance switching module in the type-B service chassis. Each type-A service chassis may send data of the type-B service chassis to another type-A service chassis. Each type-A service chassis may send data of the another type-A service chassis to the type-B service chassis. Therefore, the data is exchanged between chassis in the data communications system.

In one embodiment, the first high-performance switching module is configured to:

send data received from the fifth low-performance switching module to the second low-performance switching module; and send data received from the second low-performance switching module to the fifth low-performance switching module. Therefore, when the data communications system includes at least one type-A service chassis and at least one type-B service chassis, data may be sent and received between the type-A service chassis and the type-B service chassis by using a low-performance switching module in the type-B service chassis. Each type-A service chassis may send data of the type-B service chassis to another type-A service chassis. Each type-A service chassis may send data of the another type-A service chassis to the type-B service chassis. Therefore, the data is exchanged between chassis in the data communications system. When more type-B service chassis are added to the data communications system, the foregoing data exchange process can still be implemented.

In one embodiment, the first high-performance switching module is configured to:

send data received from the second low-performance switching module to the seventh low-performance switching module;

send data received from the seventh low-performance switching module to the second low-performance switching module;

after the third chassis is added to the communications system, send data received from the third low-performance switching module to one of the second low-performance switching module and the seventh low-performance switching module; and after the third chassis is added to the communications system, send data received from the one of the second low-performance switching module and the seventh low-performance switching module to the third low-performance switching module. Therefore, for the data communications system including the plurality of type-A service chassis, during capacity expansion of the data communications system including the type-A service chassis, the type-B service chassis that is to be added to the data communications system can be separately connected to the type-A service chassis without changing the cables and interfaces between the type-A service chassis. This facilitates the capacity expansion, and implements the smooth capacity expansion. In addition, data communication in the data communications system is implemented between various service chassis and the type-B service chassis by using a high-performance switching module, and a low-performance switching module.

In one embodiment, the first high-performance switching module is configured to:

send data received from the twelfth low-performance switching module to one of the second low-performance switching module and the seventh low-performance switching module; and send data received from the one of the second low-performance switching module and the seventh low-performance switching module to the twelfth low-performance switching module. Therefore, during capacity expansion of the data communications system including the plurality of type-A service chassis, and the at least one type-B service chassis, the type-B service chassis that is to be added to the system can be separately connected to the type-A service chassis without changing the cables and interfaces between the type-A service chassis, or the cables and the interfaces between the deployed type-B service chassis and the type-A service chassis. This facilitates the capacity expansion, and implements the smooth capacity expansion. In addition, the type-A service chassis and the type-B service chassis each have a service forwarding module, so that the chassis in the data communications system may communicate with the another device outside the data communications system by using the service forwarding module. The type-A service chassis and the type-B service chassis each complete the data communication in the data communications system by using a high-performance switching module, and a low-performance switching module.

A second aspect of this application provides a data communications system, including a first chassis and a second chassis, where the first chassis includes a first high-performance switching module, a first service forwarding module, and a second service forwarding module, and the first service forwarding module and the second service forwarding module are configured to communicate with a device outside the data communications system;

the second chassis includes a first low-performance switching module;

the first high-performance switching module is connected to the first low-performance switching module;

the first high-performance switching module is configured to send data received from the first service forwarding module to the first low-performance switching module, and send data received from the first low-performance switching module to the second service forwarding module; and the first high-performance switching module is further configured to connect to a second low-performance switching module in a third chassis that is to be added to the communications system. Therefore, a central switching chassis is removed, and only a type-C service chassis and at least one type-D service chassis are deployed. The type-C service chassis is a service chassis that includes only a high-performance switching module. The type-D service chassis is a service chassis that includes only a low-performance switching module. Therefore, a footprint of the data communications system is reduced. In addition, because the central switching chassis is removed, there is no need to add an auxiliary hardware device, and power consumption and costs are reduced. A structure of the data communications system provided in the second aspect has a feature of being capable of smooth expansion. During capacity expansion of the data communications system including the first chassis and the second chassis, the third chassis that is to be added to the system can be separately connected to the first chassis without changing cables and interfaces between the first chassis and the second chassis. This facilitates the capacity expansion, so that a back-to-back cluster system may be smoothly expanded to a multi-chassis cluster data communications system in this embodiment.

In one embodiment, the first high-performance switching module is further configured to:

after the third chassis is added to the communications system, send data received from the second low-performance switching module to one of the first low-performance switching module, the first service forwarding module, and the second service forwarding module; and after the third chassis is added to the communications system, send data received from the one of the first low-performance switching module, the first service forwarding module, and the second service forwarding module to the second low-performance switching module. Therefore, when more type-D service chassis are to be added to the data communications system provided in the second aspect, the type-D service chassis that is to be added is connected to the type-C service chassis. There is no need to change services on both the deployed type-C service chassis and the deployed type-D service chassis, or inter-chassis connections between the deployed type-C service chassis and the deployed type-D service chassis. This implements the smooth capacity expansion. In addition, the type-C service chassis may receive, by using a high-performance switching module, data sent by the type-D service chassis, and then store the data in a current type-C service chassis, or send the data to another type-D service chassis. The type-C service chassis may further send data of the type-C service chassis to the type-D service chassis, so as to implement data communication between chassis in the data communications system.

A third aspect of this application provides a data communications method applied to a data communications system. The data communications system includes a first chassis and a second chassis. The first chassis includes a first high-performance switching module and a first low-performance switching module. The second chassis includes a second high-performance switching module and a second low-performance switching module. The first high-performance switching module is connected to the second low-performance switching module. The first low-performance switching module is connected to the second high-performance switching module. The first high-performance switching module is configured to connect to a third low-performance switching module in a third chassis that is to be added to the communications system. The second high-performance switching module is configured to connect to a fourth low-performance switching module in the third chassis that is to be added to the communications system. The method includes:

sending, by the first high-performance switching module, data received from the third low-performance switching module to the second low-performance switching module, and sending, by the first high-performance switching module, data received from the second low-performance switching module to the third low-performance switching module; and sending, by the second high-performance switching module, data received from the fourth low-performance switching module to the first low-performance switching module, and sending, by the second high-performance switching module, data received from the first low-performance switching module to the fourth low-performance switching module.

In one embodiment, the data communications system further includes a fourth chassis, and the fourth chassis includes a fifth low-performance switching module and a sixth low-performance switching module; and the first high-performance switching module is connected to the fifth low-performance switching module, and the second high-performance switching module is connected to the sixth low-performance switching module.

In one embodiment, the data communications system further includes a fifth chassis, the fifth chassis includes a third high-performance switching module, a seventh low-performance switching module, and an eighth low-performance switching module, the first chassis further includes a ninth low-performance switching module, and the second chassis further includes a tenth low-performance switching module, the third high-performance switching module is connected to the ninth low-performance switching module and the tenth low-performance switching module, the first high-performance switching module is connected to the seventh low-performance switching module, and the second high-performance switching module is connected to the eighth low-performance switching module, and the third high-performance switching module is configured to connect to an eleventh low-performance switching module in the third chassis that is to be added to the communications system, and the method further includes:

sending, by the third high-performance switching module, data received from the eleventh low-performance switching module to one of the ninth low-performance switching module and the tenth low-performance switching module, and sending data received from the one of the ninth low-performance switching module and the tenth low-performance switching module to the eleventh low-performance switching module.

In one embodiment, the data communications system further includes a sixth chassis, and the sixth chassis includes a twelfth low-performance switching module, a thirteenth low-performance switching module, and a fourteenth low-performance switching module, and the twelfth low-performance switching module is connected to the first high-performance switching module, the thirteenth low-performance switching module is connected to the second high-performance switching module, and the fourteenth low-performance switching module is connected to the third high-performance switching module.

In one embodiment, the first chassis further includes a first service forwarding module and a second service forwarding module, the first service forwarding module and the second service forwarding module are configured to communicate with a device outside the data communications system, and the method further includes:

sending, by the first low-performance switching module, data received from the first service forwarding module to the second high-performance switching module; and sending, by the first low-performance switching module, data received from the second high-performance switching module to the second service forwarding module.

In one embodiment, the first chassis further includes a third service forwarding module and a fourth service forwarding module, the third service forwarding module and the fourth service forwarding module are configured to communicate with the device outside the data communications system, and the method further includes:

sending, by the first high-performance switching module, data received from the third service forwarding module to the second low-performance switching module; and sending, by the second low-performance switching module, data received from the second high-performance switching module to the fourth service forwarding module.

In one embodiment, the method further includes:

sending, by the first high-performance switching module, data received from the fifth low-performance switching module to the second low-performance switching module; and sending, by the first high-performance switching module, data received from the second low-performance switching module to the fifth low-performance switching module.

In one embodiment, the method further includes:

sending, by the first high-performance switching module, data received from the second low-performance switching module to the seventh low-performance switching module;

sending, by the first high-performance switching module, data received from the seventh low-performance switching module to the second low-performance switching module;

sending, by the first high-performance switching module, data received from the third low-performance switching module to one of the second low-performance switching module and the seventh low-performance switching module; and sending, by the first high-performance switching module, data received from the one of the second low-performance switching module and the seventh low-performance switching module to the third low-performance switching module.

In one embodiment, the method further includes:

sending, by the first high-performance switching module, data received from the twelfth low-performance switching module to one of the second low-performance switching module and the seventh low-performance switching module; and sending, by the first high-performance switching module, data received from the one of the second low-performance switching module and the seventh low-performance switching module to the twelfth low-performance switching module.

A fourth aspect of this application provides a data communications method applied to a data communications system. The data communications system includes a first chassis and a second chassis. The first chassis includes a first high-performance switching module, a first service forwarding module, and a second service forwarding module. The first service forwarding module and the second service forwarding module are configured to communicate with a device outside the data communications system. The second chassis includes a first low-performance switching module. The first high-performance switching module is connected to the first low-performance switching module. The first high-performance switching module is configured to connect to a second low-performance switching module in a third chassis that is to be added to the communications system. The method includes:

sending, by the first high-performance switching module, data received from the first service forwarding module to the first low-performance switching module;

sending, by the first high-performance switching module, data received from the first low-performance switching module to the second service forwarding module;

sending, by the first high-performance switching module, data received from the second low-performance switching module to one of the first low-performance switching module, the first service forwarding module, and the second service forwarding module; and sending, by the first high-performance switching module, data received from the one of the first low-performance switching module, the first service forwarding module, and the second service forwarding module to the second low-performance switching module.

According to a fifth aspect, a data communications system is provided, including units or means (means) configured to perform operations of any method in the third aspect.

According to a sixth aspect, a data communications system is provided. Each chassis in the data communications system includes a processor and a memory. The memory is configured to store a computer program. The processor invokes the computer program stored in the memory, to perform any method in the third aspect.

According to a seventh aspect, a data communications system is provided, including at least one processing element or chip configured to perform any method in the third aspect.

According to an eighth aspect, a program is provided. When being executed by a processor, the program is used to perform any method in the third aspect.

According to a ninth aspect, a computer-readable storage medium is provided, including the program in the eighth aspect.

According to a tenth aspect, a data communications system is provided, including units or means (means) configured to perform operations of any method in the fourth aspect.

According to an eleventh aspect, a data communications system is provided. Each chassis in the data communications system includes a processor and a memory. The memory is configured to store a computer program. The processor invokes the computer program stored in the memory, to perform any method in the fourth aspect.

According to a twelfth aspect, a data communications system is provided, including at least one processing element or chip configured to perform any method in the fourth aspect.

According to a thirteenth aspect, a program is provided. When being executed by a processor, the program is used to perform any method in the fourth aspect.

According to a fourteenth aspect, a computer-readable storage medium is provided, including the program in the thirteenth aspect.

DESCRIPTION OF EMBODIMENTS

Embodiments of this application are applied to the long term evolution (LTE), the fourth generation mobile communication technology (4G), the fifth generation mobile communication technology (5G) communications system, or another system that may appear in the future. The following explains and describes some terms in this application, to facilitate understanding by a person skilled in the art. It should be noted that, when solutions of the embodiments of this application are applied to the 4G system, the 5G system, or the another system that may appear in the future, names of a network device and a terminal may change, but this does not affect an implementation of the solutions in the embodiments of this application.

The following describes the technical solutions of the embodiments in this application with reference to accompanying drawings.

Technical terms in this application are first explained:

1. A large data communications device includes but is not limited to a core Ethernet switch device, a router device, and an optical transmission device. In a logical architecture, the large data communications device is usually divided into a data plane for high-speed data forwarding and switching, a control plane for signaling protocol processing, and a management plane for device running monitoring. The "plane" herein indicates a module, a unit, or the like in the large data communications device.

2. A chassis is a hardware component in a large data communications device, and the chassis may also be referred to as a service chassis, or a data communications service chassis.

3. A multi-chassis cluster data communications device system includes at least two chassis, and the multi-chassis cluster data communications system may also be referred to as a multi-chassis cluster data communications system, or a multi-chassis cluster system.

It should be noted that nouns or terms in the embodiments of this application may be mutually referenced. Details are not described.

Figure 1:
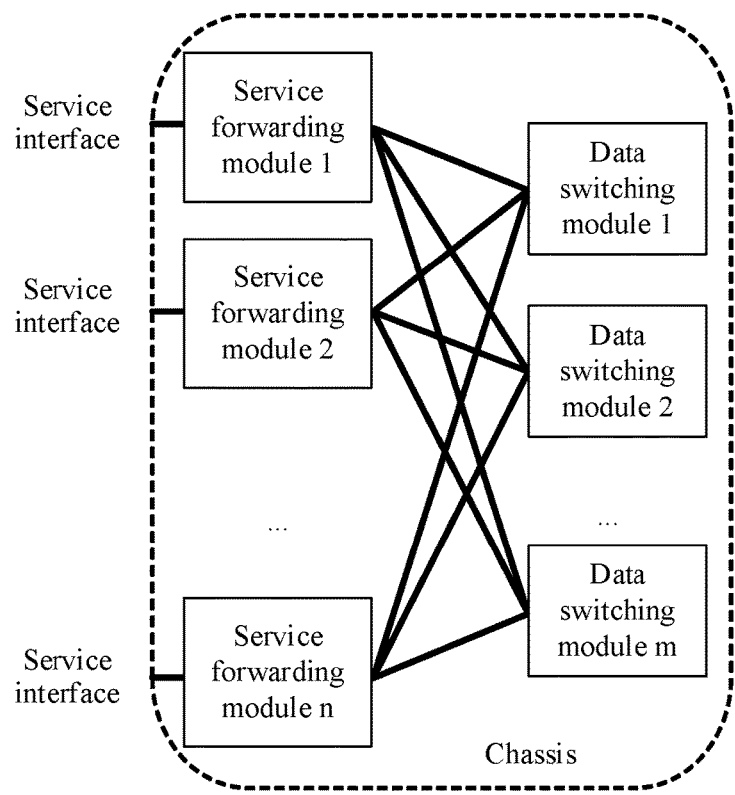
FIG. 1 is a schematic diagram of a structure of a large single-chassis data communications device.

FIG. 1 is a schematic diagram of a structure of a large single-chassis data communications device. As shown in FIG. 1, the large data communications device includes only one chassis. The chassis may be referred to as a subrack, and the chassis may be referred to as a single-chassis data communications device, or a single-subrack data communications device. In the single-chassis data communications device, a data plane of the single-chassis data communications device usually includes at least one service forwarding module and at least one data switching module. The service forwarding module herein may also be referred to as a service forwarding board. The data switching module may also be referred to as a data switching board. The service forwarding module and the data switching module are evenly interconnected through a high-speed data channel. Each service forwarding module is connected to at least one external service interface. For example, the large data communications device includes n service forwarding modules and m data switching modules, where both n and m are positive integers. A data switching module 1 is connected to each service forwarding module, a data switching module 2 is connected to each service forwarding module, . . . , and a data switching module m is connected to each service forwarding module. In the large single-chassis data communications device in FIG. 1, the service forwarding module is responsible for sending and receiving data through an external service interface, performing high-speed forwarding processing on a data packet based on a service requirement, sending data that needs to be switched to the data switching module, and receiving data from the data switching module. The data switching module is responsible for data exchange between any service forwarding modules. The data switching modules usually work in load sharing mode to bear data exchange tasks in the entire chassis. The data switching module usually is an integrated circuit chip supporting a data exchange function.

A multi-chassis cluster data communications device system interconnects a plurality of chassis through expansion of the data switching module, to form the multi-chassis cluster system with higher service data forwarding performance. Total service data forwarding performance of the multi-chassis cluster data communications device system is usually a sum of data forwarding performance of all chassis. The multi-chassis cluster data communications device system is presented as one or one set of device externally, and occupies one network node resource in a network instead of occupying a plurality of network node resources.

Figure 2:
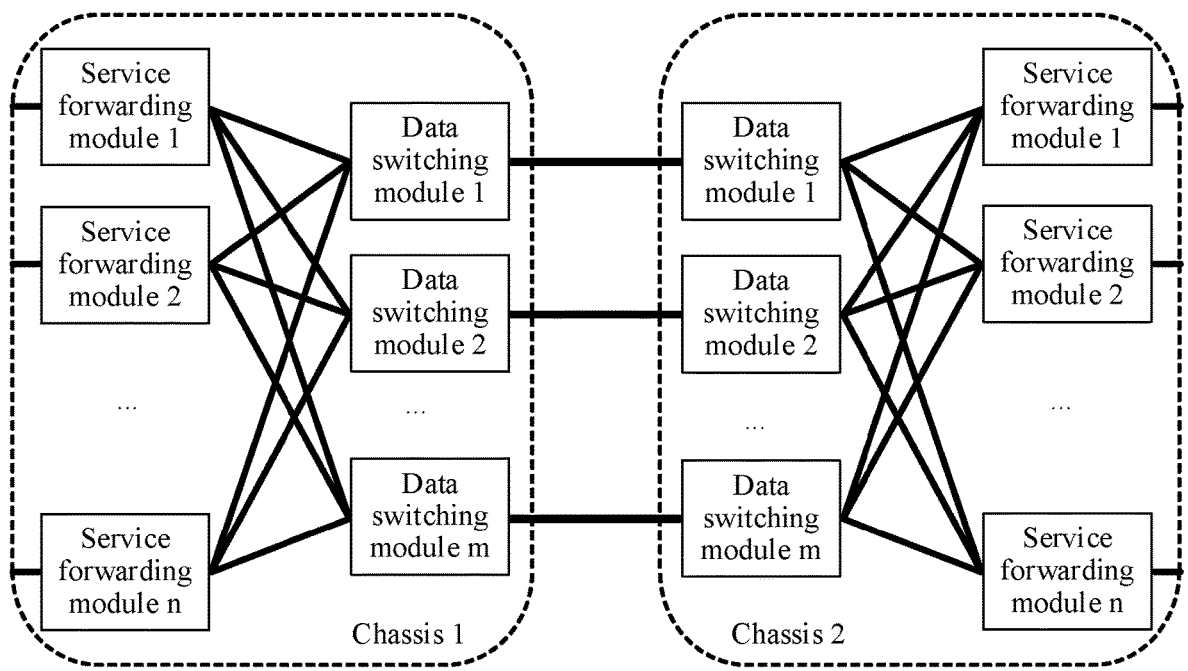
FIG. 2 is a schematic diagram of a structure of a back-to-back cluster system.

FIG. 2 is a schematic diagram of a structure of a back-to-back cluster system. As shown in FIG. 2, one data communications system includes two chassis components, and provides a chassis 1 and a chassis 2. Each chassis is the chassis shown in FIG. 1. Modules inside the chassis and connection manners of the modules are the same as those in FIG. 1. Data switching modules of each of the two chassis may extend an inter-chassis interconnection interface. The data switching modules of the two chassis are back-to-back interconnected through the inter-chassis interconnection interface. The inter-chassis interconnection interface of the chassis is a key component for constructing a multi-chassis cluster data communications device system, and is configured to provide a bearer channel for inter-chassis data exchange. As shown in FIG. 2, a data switching module 1 in the chassis 1 is connected to a data switching module 1 in the chassis 2 through an inter-chassis interconnection interface. A data switching module 2 in the chassis 1 is connected to a data switching module 2 in the chassis 2 through an inter-chassis interconnection interface, . . . , and a data switching module m in the chassis 1 is connected to a data switching module m in the chassis 2 through an inter-chassis interconnection interface, to form the back-to-back cluster system. A system capacity of the back-to-back cluster system is twice a system capacity of the device shown in FIG. 1. When the back-to-back cluster system is deployed, the single chassis as shown in FIG. 1 may be first deployed, and the second chassis may be deployed, to expand a single-chassis data communications device to the back-to-back cluster system. In the back-to-back cluster system, the chassis can exchange local data by using a data switching module in the chassis, or forward data between chassis by using a data switching module. In the back-to-back cluster system, when an interconnection bandwidth between the chassis is greater than or equal to a maximum service forwarding capability of the chassis, line-rate switching can be implemented between the two chassis.

Figure 3A:
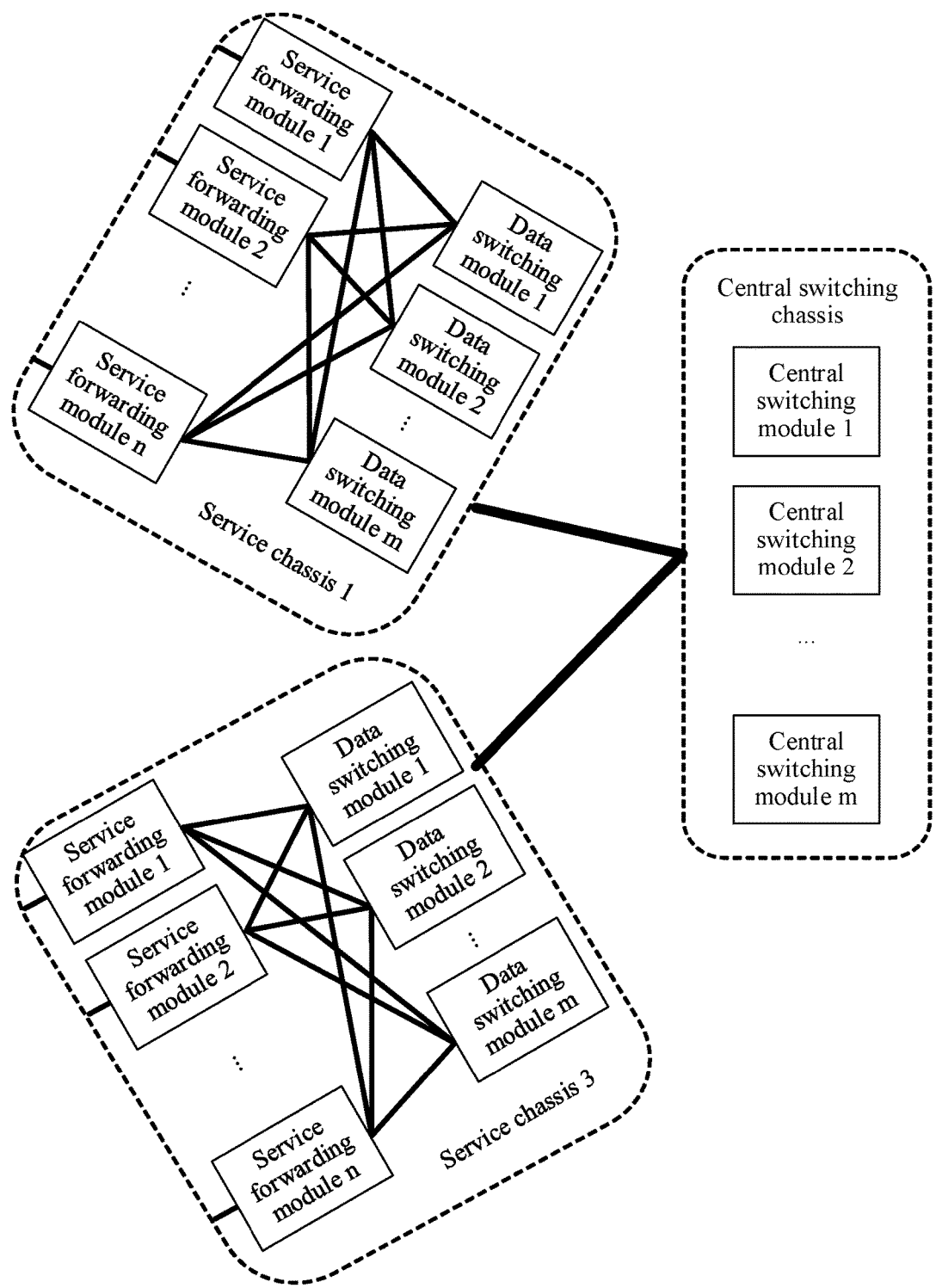
FIG. 3A and FIG. 3B are a schematic diagram 1 of a structure of a central switching chassis-based multi-chassis cluster system.
Figure 3B:
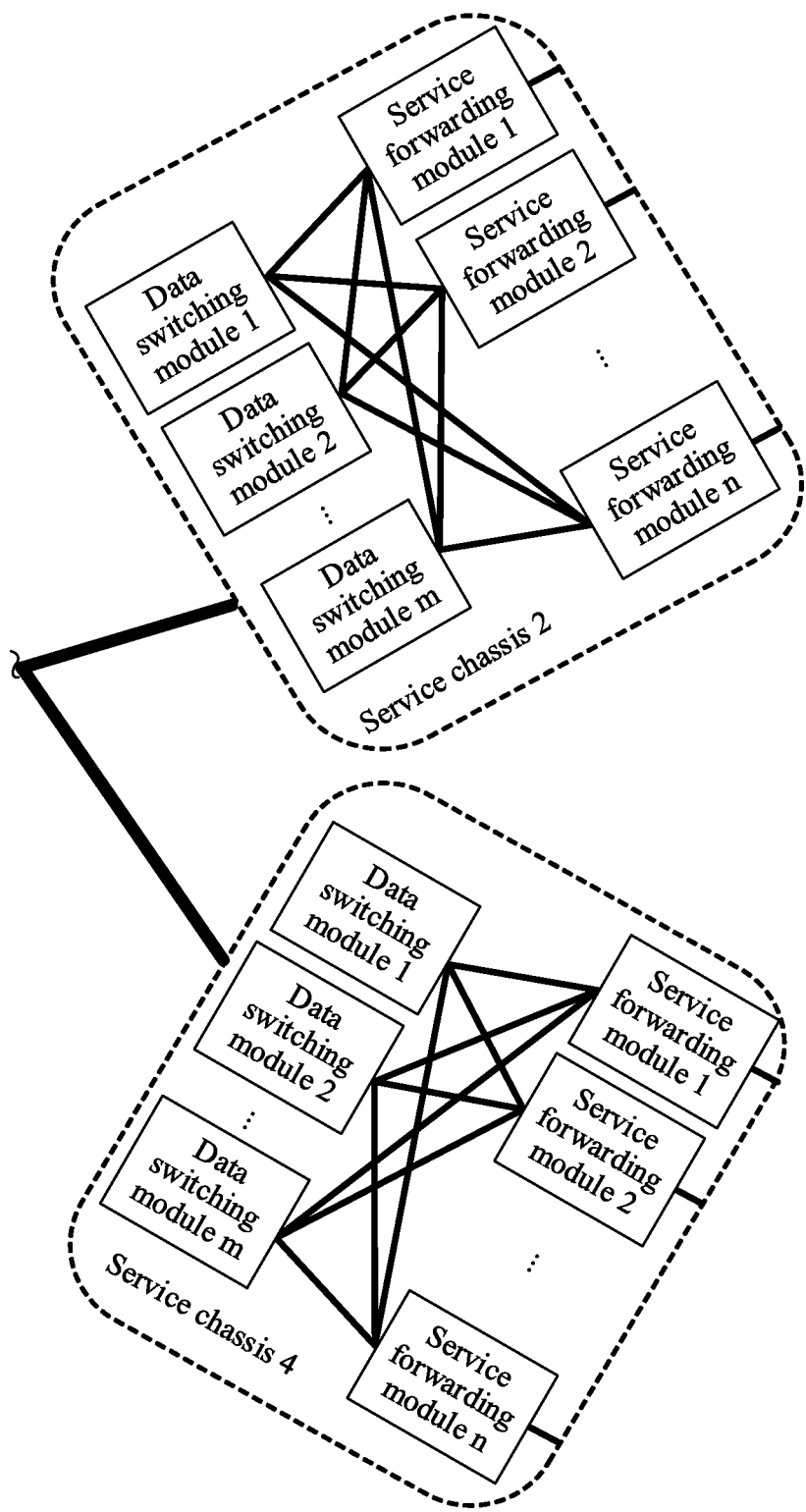
Figure 4A:
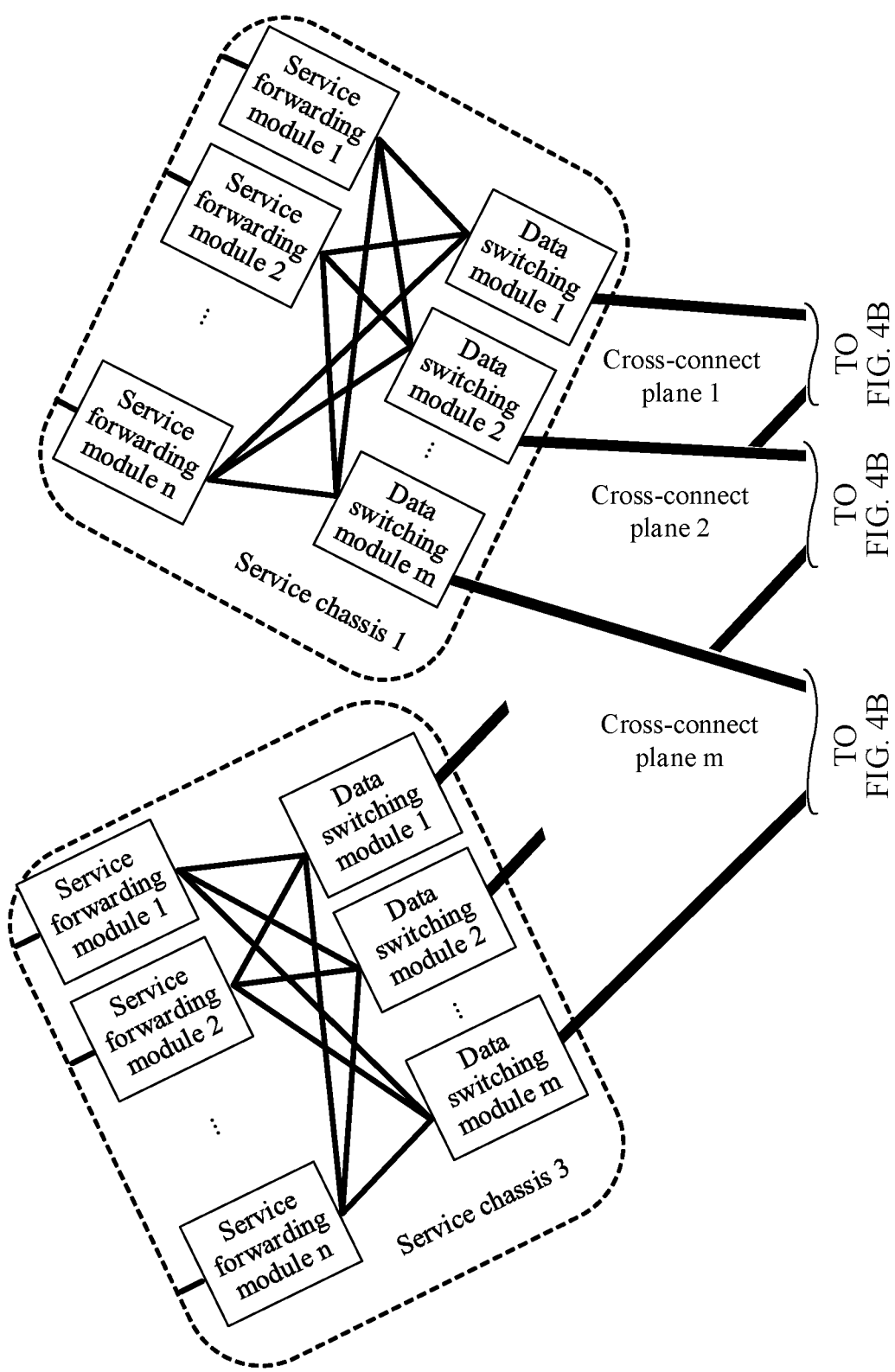
FIG. 4A and FIG. 4B are a schematic diagram 2 of a structure of a central switching chassis-based multi-chassis cluster system.
Figure 4B:
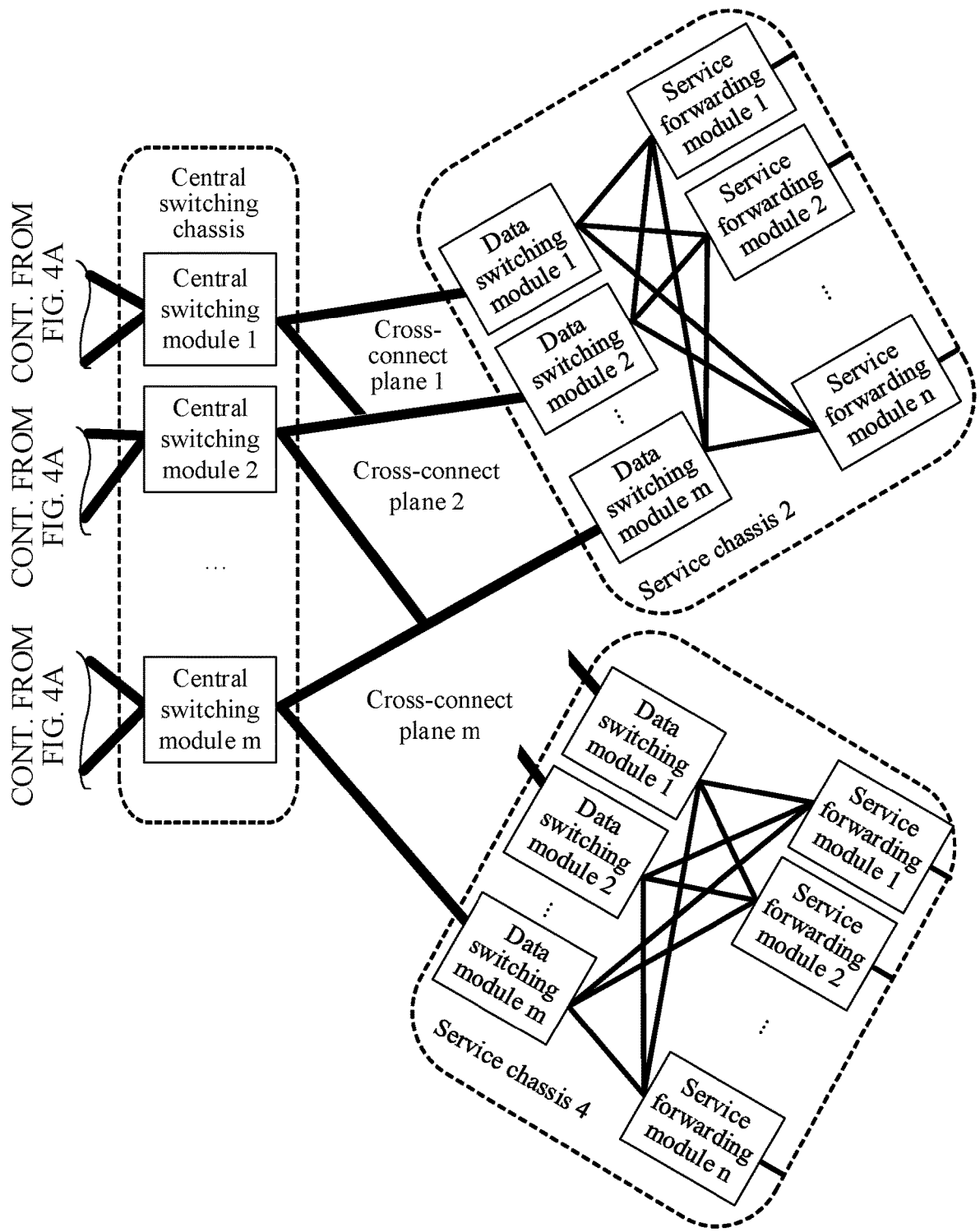

FIG. 3A and FIG. 3B are a schematic diagram 1 of a structure of a central switching chassis-based multi-chassis cluster system. As shown in FIG. 3A and FIG. 3B, the central switching chassis-based multi-chassis cluster system includes a plurality of service chassis, and one central switching chassis. Each service chassis is connected to the central switching chassis. Each service chassis is the chassis shown in FIG. 1. Modules inside the service chassis, and connection manners of the modules are the same as those in FIG. 1. m data switching modules are deployed in each service chassis, and m central switching modules are deployed in the central switching chassis, where m is a positive integer. For each service chassis, each data switching module in one service chassis is connected to one central switching module in a one-to-one correspondence. The central switching chassis may include one or more devices. The central switching chassis does not have a service forwarding module. The central switching chassis does not provide a service interface. In a physical implementation, each of the foregoing modules may include one or more physical modules. In the central switching chassis-based multi-chassis cluster system shown in FIG. 3, the service chassis may exchange local data by using a data switching module in the service chassis, or may exchange remote data by using a central switching module in the central switching chassis. Data exchange between two different service chassis needs be completed by using the central switching module in the central switching chassis. Therefore, the service chassis completes a data exchange task between chassis by using a data switching module, and a central switching module corresponding to the data switching module. Theoretically, when an inter-chassis interconnection bandwidth between each service chassis and the central switching chassis is greater than or equal to a maximum service forwarding capability of the chassis, inter-chassis line-rate switching can be implemented. In the central switching chassis-based multi-chassis cluster system shown in FIG. 3, the service chassis can be decoupled from each other. It is easy to add anew service chassis. FIG. 4A and FIG. 4B are a schematic diagram 2 of a structure of a central switching chassis-based multi-chassis cluster system. As shown in FIG. 4A and FIG. 4B, for each service chassis, each data switching module in one service chassis is connected to one central switching module in a one-to-one correspondence, to form a full-star cross-connect plane. When there are m central switching modules in a central switching chassis, the central switching chassis-based multi-chassis cluster system includes m full-star cross-connect planes in total. Data exchange between service chassis is completed through the m full-star cross-connect planes. In addition, each full-star cross-connect plane is independent of each other, and carries all inter-chassis data exchange functions in a load sharing mode. Different service chassis exchange data by using a central switching module in the central switching chassis. Therefore, each central switching module carries 1/m data exchange traffic.

In the central switching chassis-based multi-chassis cluster systems shown in FIG. 3A to FIG. 4B, in addition to the service chassis, the central switching chassis also needs to be deployed, which needs to occupy a footprint. Further, the multi-chassis cluster data communications device system needs to occupy a comparatively large equipment room area, which is inconvenient for deployment of the multi-chassis cluster data communications device system. When the central switching chassis is deployed, hardware devices such as a power supply unit, a heat dissipation unit, and a control unit need to be configured for the central switching chassis. These hardware devices consume a large amount of power consumption. As a result, costs are increased. In addition, when a back-to-back cluster system is expanded to the central switching chassis-based multi-chassis cluster system, interconnected cables between the service chassis need to be re-separated and adjusted, to separately connect the cables of the service chassis to central switching modules in the central switching chassis. Therefore, an expansion operation is very complex.

Figure 5A:
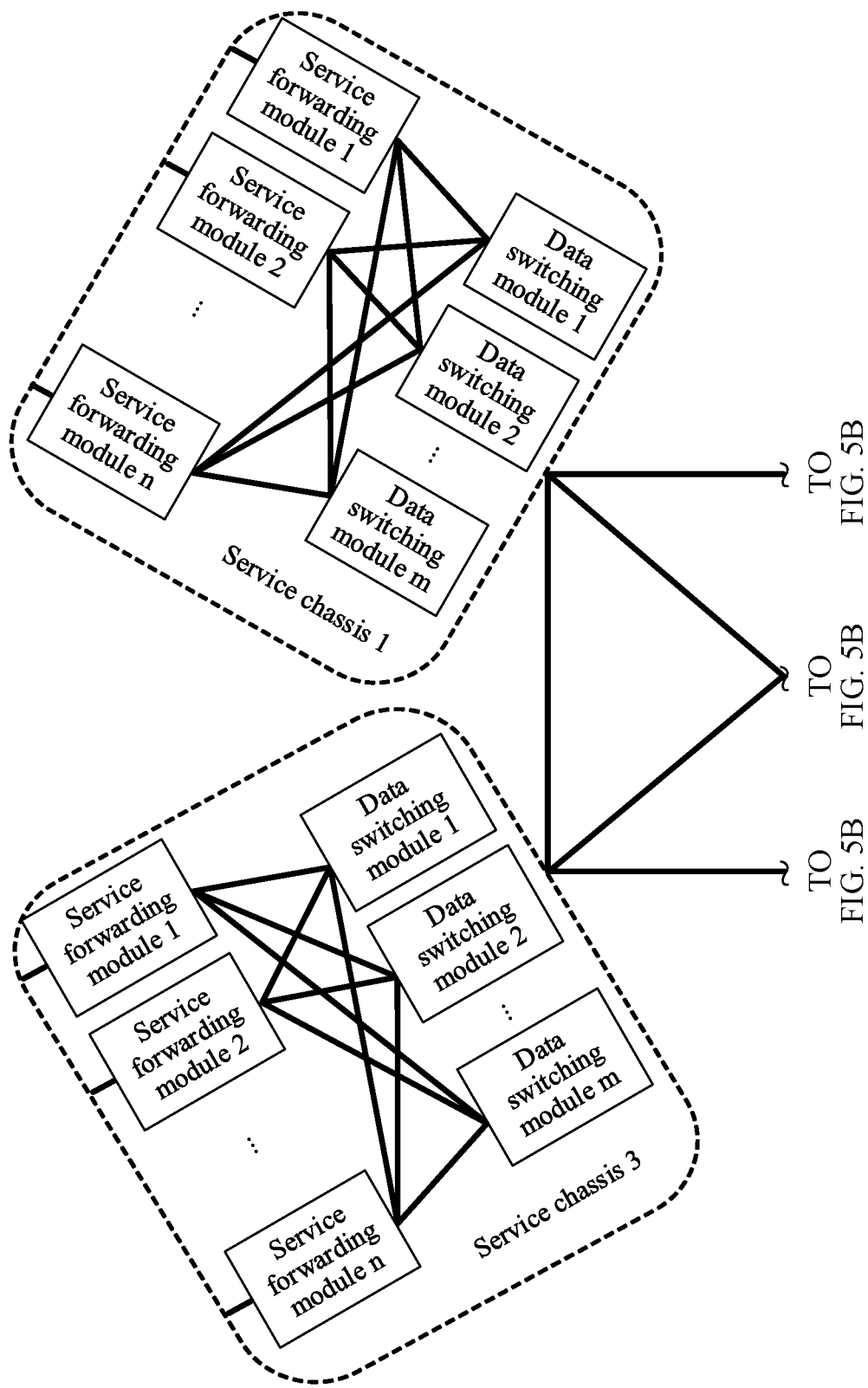
FIG. 5A and FIG. 5B are a schematic diagram 1 of a mesh structure of a switching network multi-chassis cluster system according to an embodiment of this application.
Figure 5B:
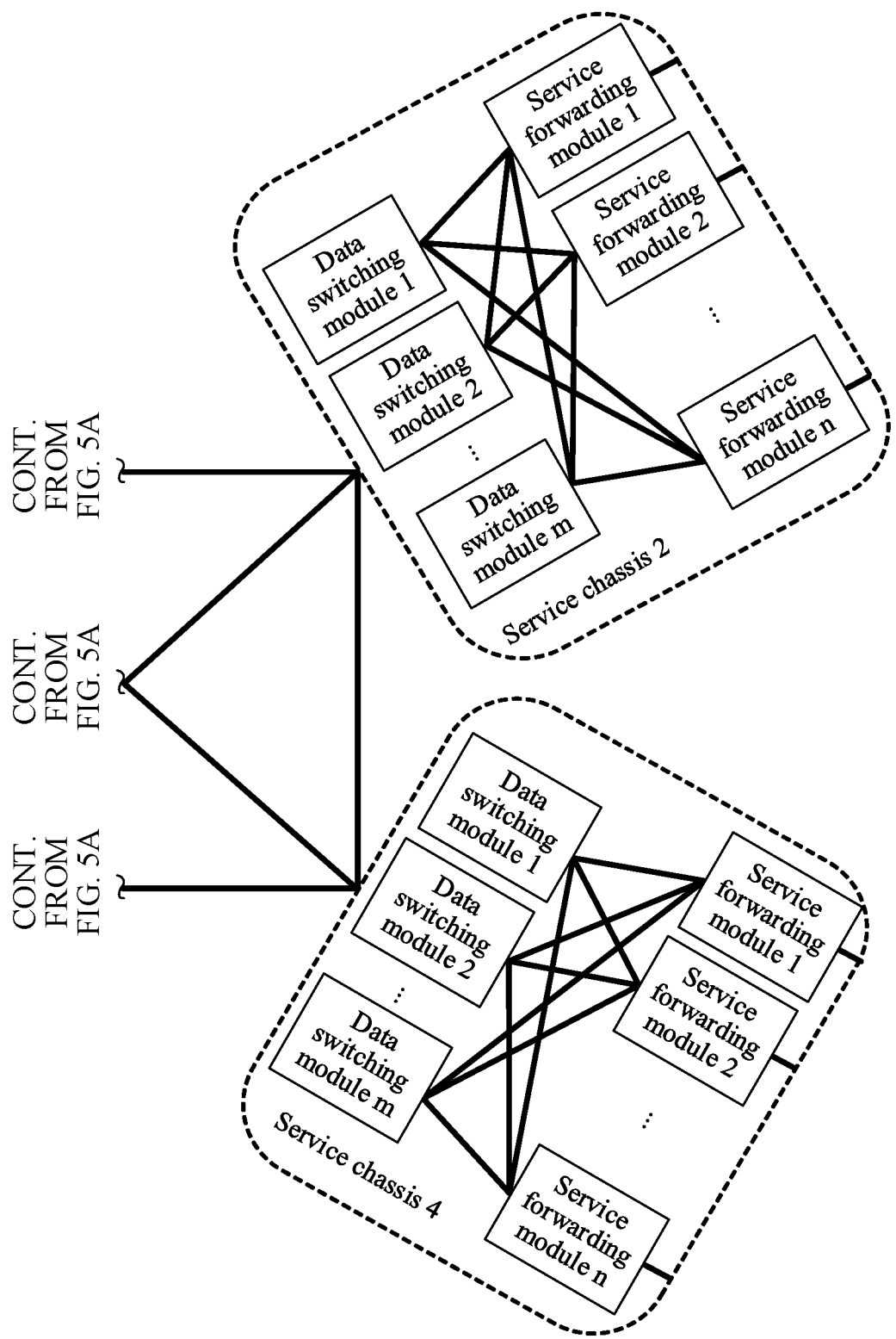
Figure 6A:
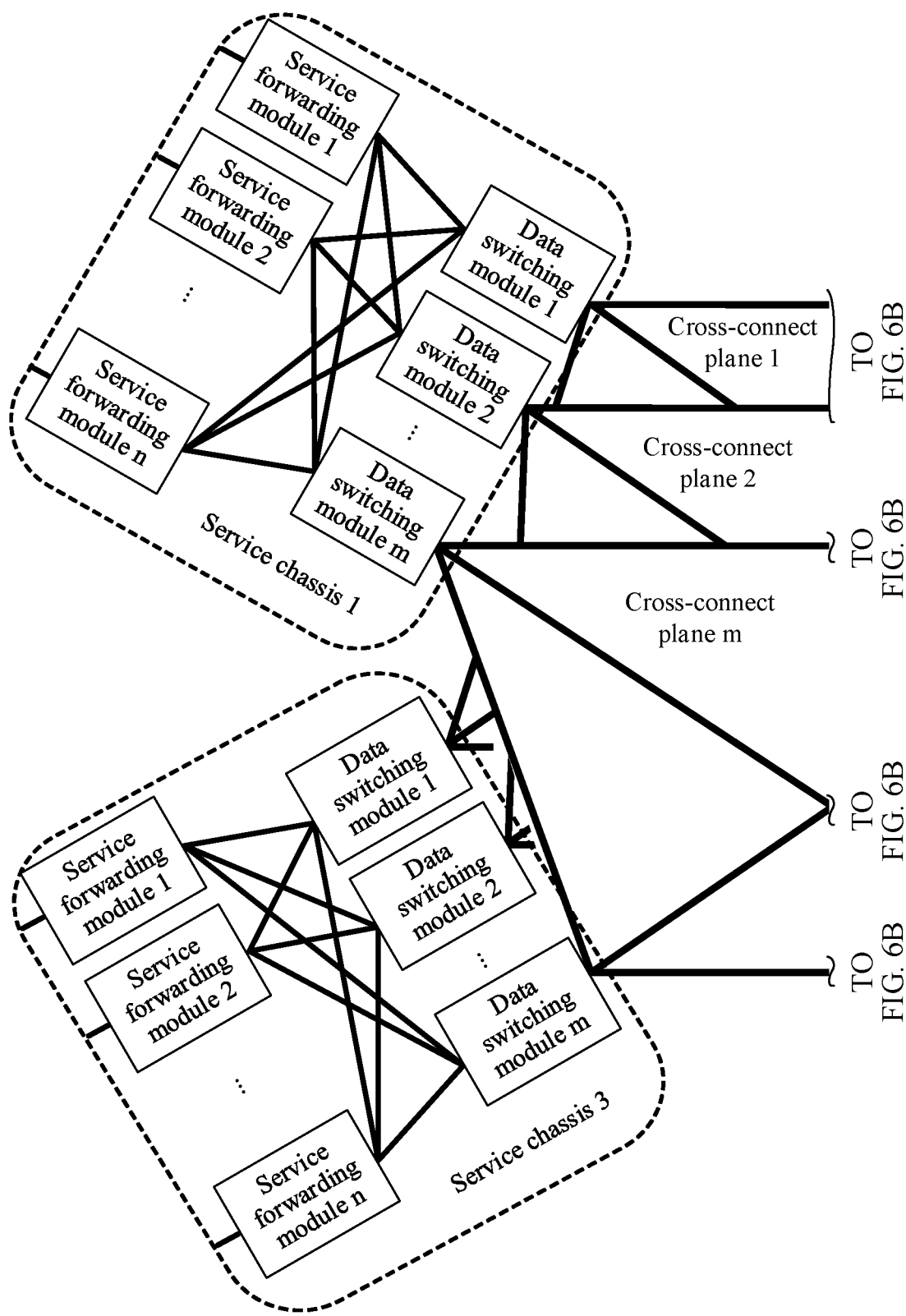
FIG. 6A and FIG. 6B are a schematic diagram 2 of a mesh structure of a switching network multi-chassis cluster system according to an embodiment of this application.
Figure 6B:
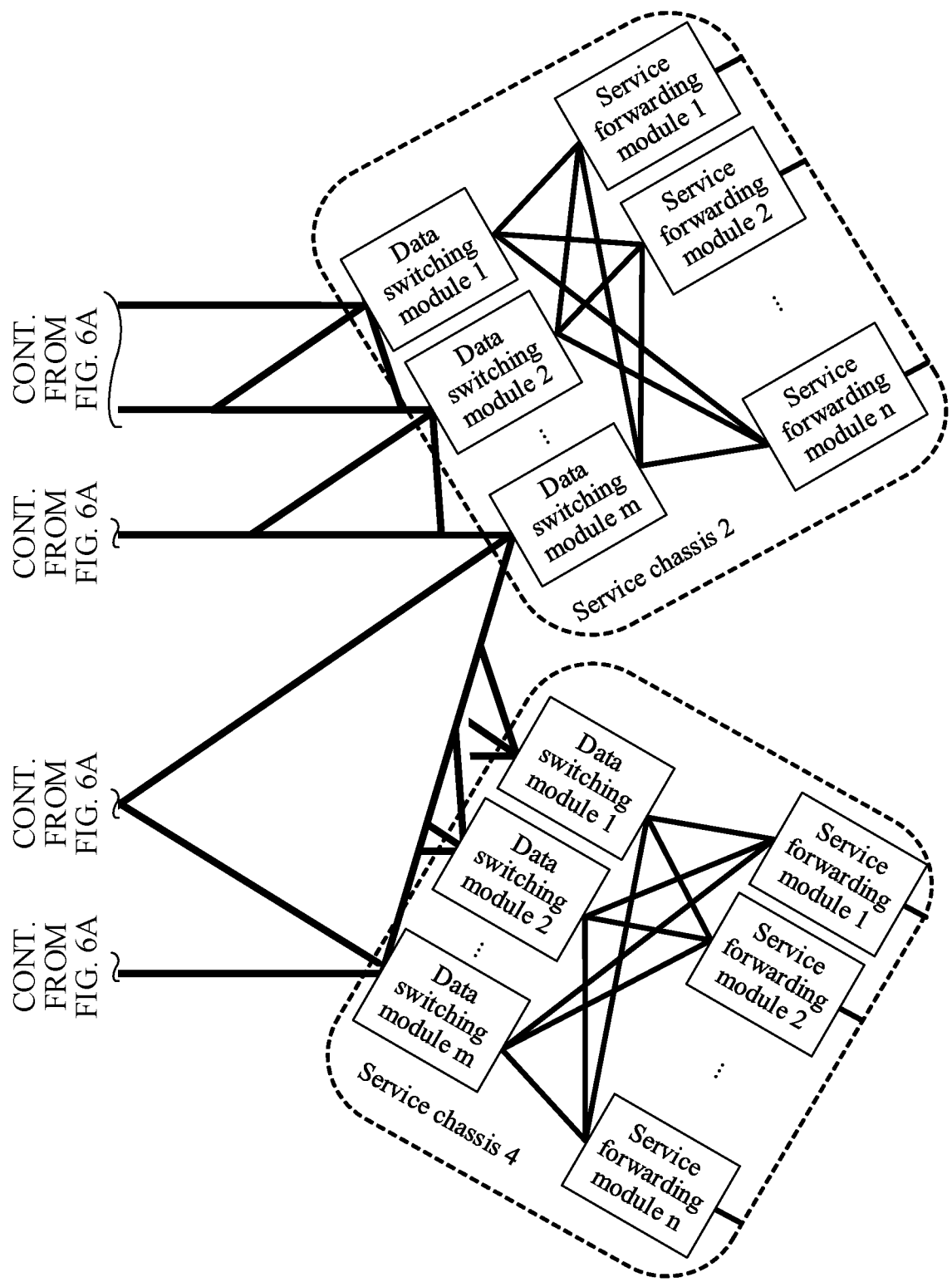

FIG. 5A and FIG. 5B are a schematic diagram 1 of a mesh structure of a switching network multi-chassis cluster system according to an embodiment of this application. As shown in FIG. 5, the switching network multi-chassis cluster system includes a plurality of service chassis. Each service chassis is the chassis shown in FIG. 1. Modules inside the service chassis, and connection manners of the modules are the same as those in FIG. 1. A data switching module in each service chassis is connected to a data switching module in another service chassis. The connection manner is interconnecting the data switching modules in the service chassis in a full mesh manner. The service chassis may exchange local data by using a data switching module in the chassis. Different service chassis exchange data by using interconnected data switching modules. In the switching network multi-chassis cluster system, to implement inter-chassis line-rate switching, a mesh interconnection bandwidth between any two service chassis needs be greater than or equal to a maximum service forwarding capability of the service chassis. If data exchange between the any two service chassis can be implemented only by using a data switching module directly connected to the any two service chassis, an inter-chassis bandwidth of each service chassis needs to be greater than or equal to (x−1) times the maximum service forwarding capability of the single service chassis, where x is a total quantity of service chassis in the switching network multi-chassis cluster system, and x is greater than or equal to 3. If data between the any two service chassis can be exchanged by using a data switching module directly connected to the any two service chassis, and can be forwarded by using a data switching module in a third-party service chassis, an inter-chassis bandwidth of each service chassis can be set to twice the maximum service forwarding capability of the single service chassis. FIG. 6A and FIG. 6B are a schematic diagram 2 of a mesh structure of a switching network multi-chassis cluster system according to an embodiment of this application. As shown in FIG. 6A and FIG. 6B, a data switching module in each service chassis is connected to a data switching module in another service chassis. In other words, the data switching module in each service chassis is evenly cross-connected with each other. Therefore, a mesh cross-connect plane may be formed, to obtain m mesh cross-connect planes. Data exchange between service chassis is completed through the m mesh cross-connect planes. Each mesh cross-connect plane is independent of each other and carries an inter-chassis data exchange function in a load sharing mode.

However, in the switching network multi-chassis cluster systems shown in FIG. 5A to FIG. 6B, when a new service chassis needs to be added, interconnected cables between all the service chassis need to be adjusted. Therefore, an expansion operation is complex. For example, when m=3, and when a data switching module 1 in a service chassis 1 is connected to a data switching module 1 in a service chassis 2, and a data switching module 1 in a service chassis 3, the data switching module 1 in the service chassis 1 has p cables, where p is a positive integer. The data switching module 1 in the service chassis 1 uses p/2 cables to connect to the data switching module 1 in the service chassis 2, and the data switching module 1 of the service chassis 1 uses another p/2 cables to connect to the data switching module 1 in the service chassis 3. However, when the service chassis is added, namely, when m=4, and when the data switching module 1 in the service chassis 1 needs to connect to the data switching module 1 in the service chassis 2, the data switching module 1 in the service chassis 3, and a data switching module 1 in a service chassis 4, the data switching module 1 in the service chassis 1 uses p/3 cables to connect to the data switching module 1 in the service chassis 2, the data switching module 1 in the service chassis 1 uses another p/3 cables to connect to the data switching module 1 in the service chassis 3, and the data switching module 1 in the service chassis 1 uses remaining p/3 cables to connect to the data switching module 1 in the service chassis 4. It can be learned that cables of the data switching module 1 in the service chassis 1 need to be re-separated and adjusted, and so on. When the service chassis is added, cables of each data switching module in all service chassis need to be separated and adjusted. Therefore, the capacity expansion operation is complex.

This application provides a data communications system and method, to further resolve the foregoing problem.

First, in the embodiments of this application, a "first-type chassis" is referred to as a "type-A service chassis" for short. A "second-type chassis" is referred to as a "type-B service chassis" for short. A "high-performance switching module" is referred to as an "S" for short. A "low-performance switching module" is referred to as an "R" for short. A "service forwarding module" is referred to as an "X" for short. The type-A service chassis includes an S, and may further include an R. The type-B service chassis includes an R, but does not include an S. In this application, names "high-performance switching module" and "low-performance switching module" are used only to distinguish between two types of modules, and do not limit functions of the modules. In a connection relationship, a difference between the two types of modules lies in that the high-performance module may be connected to one or more low-performance modules, and the low-performance module may be connected to one high-performance module but cannot be connected to a plurality of high-performance modules. Compared with the low-performance module, the high-performance module in a same chassis has a higher performance requirement. The performance requirement is, for example, a bandwidth requirement. The bandwidth requirement of a module is, for example, a data bandwidth that can be processed by the module. In one embodiment, compared with the low-performance modules, high-performance modules in different chassis may also have a higher performance requirement. In one embodiment, the high-performance modules in the different chassis may have a same performance requirement, and the low-performance modules in the different chassis may have a same performance requirement.

Figure 7:
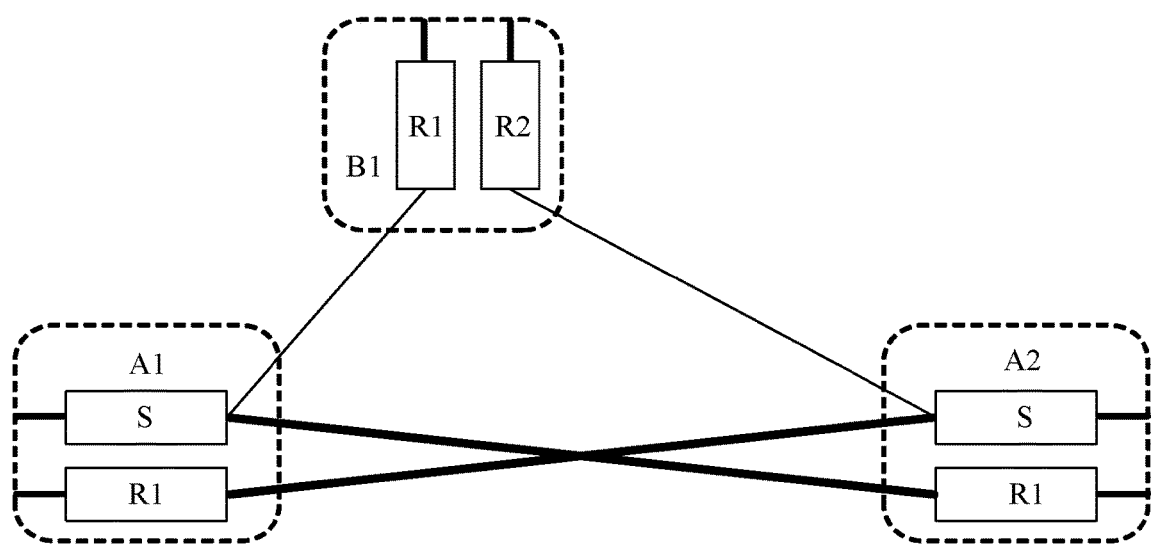
FIG. 7 is a schematic diagram of a structure of a data communications system according to an embodiment of this application.

FIG. 7 is a schematic diagram of a structure of a data communications system according to an embodiment of this application. As shown in FIG. 7, the data communications system provided in this embodiment of this application includes a first chassis and a second chassis, where the first chassis includes a first high-performance switching module and a first low-performance switching module;

the second chassis includes a second high-performance switching module and a second low-performance switching module;

the first high-performance switching module is connected to the second low-performance switching module, and the first low-performance switching module is connected to the second high-performance switching module; and the first high-performance switching module is configured to connect to a third low-performance switching module in a third chassis that is to be added to the communications system, and the second high-performance switching module is configured to connect to a fourth low-performance switching module in the third chassis that is to be added to the communications system.

For example, a formed data communications system is divided into a first-type chassis and a second-type chassis. The first-type chassis includes the first chassis A1 and the second chassis A2. The first chassis A1 includes the first high-performance switching module S and the first low-performance switching module R1. The second chassis A2 includes the second high-performance switching module S and the second low-performance switching module R1.

The S in the A1 is connected to the R1 in the A2 through an inter-chassis interconnection interface, and the S in the A2 is connected to the R1 in the A1 through another inter-chassis interconnection interface.

When the second-type chassis is added in the data communications system including the A1 and the A2, namely, when the third chassis B1 is added, the provided third chassis B1 includes the third low-performance switching module R1 and the fourth low-performance switching module R2. In this case, the data communications system already has two type-A service chassis, which are respectively A1 and A2, and the chassis that is to be added to the data communications system is the type-B service chassis B1.

When the B1 is added to the data communications system including the A1 and the A2, the S in the A1 may be connected to the R1 in the B1, and the S in the A2 may be connected to the R2 in the B1. According to the data communications system provided in the foregoing embodiment, the data communications system including the A1, the A2, and the B1 is provided. A central switching chassis is removed, and only type-A service chassis and a type-B service chassis are deployed. Therefore, a footprint of the data communications system is reduced. In addition, because the central switching chassis is removed, there is no need to add an auxiliary hardware device, and power consumption and costs are reduced. During capacity expansion of the data communications system including the A1 and the A2, there is no need to, but to wait the B1 that is to be added to the system to separately connect to the A1 and the A2 without changing cables between the A1 and the A2. This facilitates the capacity expansion, so that a back-to-back cluster system may be smoothly expanded to a multi-chassis cluster data communications system in this embodiment.

Figure 8:
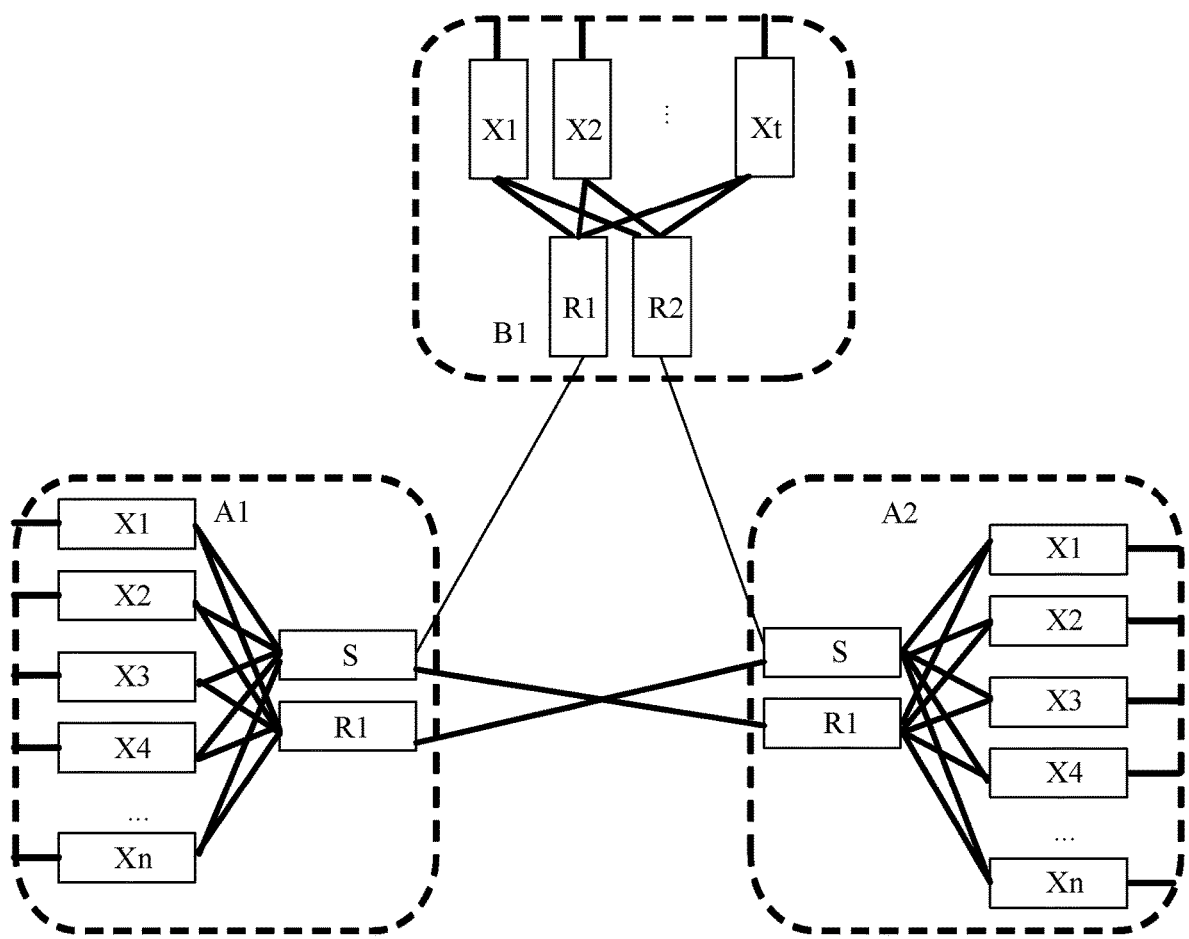
FIG. 8 is a schematic diagram of a structure of another data communications system according to an embodiment of this application.

FIG. 8 is a schematic diagram of a structure of another data communications system according to an embodiment of this application. Based on the embodiment shown in FIG. 7, as shown in FIG. 8, in the another data communications system provided in this embodiment of this application, the first chassis further includes a first service forwarding module and a second service forwarding module, the first service forwarding module and the second service forwarding module are configured to communicate with a device outside the data communications system.

The first low-performance switching module is configured to:

send data received from the first service forwarding module to the second high-performance switching module; and send data received from the second high-performance switching module to the second service forwarding module.

In one embodiment, the first chassis further includes a third service forwarding module and a fourth service forwarding module, the third service forwarding module and the fourth service forwarding module are configured to communicate with the device outside the data communications system, and the first high-performance switching module is configured to: send data received from the third service forwarding module to the second low-performance switching module; and send data received from the second low-performance switching module to the fourth service forwarding module. In one embodiment, the third service forwarding module and the fourth service forwarding module may be a same module.

In one embodiment, the first high-performance switching module is configured to: after the third chassis is added to the communications system, send data received from the third low-performance switching module to the second low-performance switching module; and after the third chassis is added to the communications system, send data received from the second low-performance switching module to the third low-performance switching module.

For example, the first chassis A1 further includes n service forwarding modules X, where n is a positive integer. For example, the A1 further includes the first service forwarding module X1, the second service forwarding module X2, the third service forwarding module X3, and the fourth service forwarding module X4. The second chassis A2 further includes n service forwarding modules X. For example, the A2 further includes a fifth service forwarding module X1, a sixth service forwarding module X2, a seventh service forwarding module X3, and an eighth service forwarding module X4. A quantity of service forwarding modules in the A1 may be the same as or different from a quantity of service forwarding modules in the A2.

Each X in the A1 is connected to the S in A1 and the R1 in the A1. In other words, an X1 in the A1 is separately connected to the S in the A1 and the R1 in the A1, an X2 in the A1 is separately connected to the S in the A1 and the R1 in the A1, an X3 in the A1 is separately connected to the S in A1 and the R1 in the A1, an X4 in the A1 is separately connected to the S in the A1 and the R1 in the A1, and so on. Each X in the A2 is connected to the S in the A2 and the R1 in the A2. In other words, an X1 in the A2 is separately connected to the S in the A2 and the R1 in the A2, an X2 in the A2 is separately connected to the S in the A2 and the R1 in the A2, an X3 in the A2 is separately connected to the S in the A2 and the R1 in the A2, an X4 in the A2 is separately connected to the S in the A2 and the R1 in the A2, and so on.

The X1 in the A1, the X2 in the A1, the X3 in the A1, and the X4 in the A1 may communicate with the another device outside the data communications system, and further send and receive data to and from the another device outside the data communications system. Likewise, the X1 in the A2, the X2 in the A2, the X3 in the A2, and the X4 in the A2 may communicate with the another device outside the data communications system, and further send and receive data to and from the another device outside the data communications system The R1 in the A1 may receive, through an intra-chassis interconnection interface, data sent by the X1 in the A1 or the X2 in the A1. Then, the R1 in the A1 determines whether a destination of the data is the A1 or another chassis. If the R1 in the A1 determines that the destination of the data is the A1, the R1 in the A1 sends the data to the X1 in the A1 or the X2 in the A1 through the intra-chassis interconnection interface. If the R1 in the A1 determines that the destination of the data is the another chassis, the R1 in the A1 does not need to identify a specific destination chassis, and the R1 in the A1 sends the data to the S in the A2 through the inter-chassis interconnection interface. The R1 in the A1 may also receive, through the inter-chassis interconnection interface, data sent by the S in the A2. Then, the R1 in the A1 determines whether a destination of the data is the A1 or another chassis. If the R1 in the A1 determines that the destination of the data is the A1, the R1 in the A1 sends the data to the X1 in the A1 or the X2 in the A1 through the intra-chassis interconnection interface. If the R1 in the A1 determines that the destination of the data is the another chassis, the R1 in the A1 considers that invalid data is received and directly discards the data.

The S in the A1 may receive, through the intra-chassis interconnection interface, data sent by the X1 in the A1, the X2 in the A1, the X3 in the A1, or the X4 in the A1. Then, the S in the A1 determines whether a destination of the data is the A1 or another chassis. If the S in the A1 determines that the destination of the data is the A1, the S in the A1 sends the data to the X1 in the A1, the X2 in the A1, the X3 in the A1, or the X4 in the A1 through the intra-chassis interconnection interface. If the S in the A1 determines that the destination of the data is the another chassis, the S in the A1 may identify a specific destination chassis, and the S in the A1 sends the data to the destination chassis through the inter-chassis interconnection interface. For example, when the S in the A1 determines that the destination of the data is the A2, the S in the A1 sends the data to the R1 in the A2 through the inter-chassis interconnection interface. The S in the A1 may also receive, through the inter-chassis interconnection interface, data sent by the R1 in the A2. Then, the S in the A1 determines whether a destination of the data is the A1 or another chassis. If the S in the A1 determines that the destination of the data is the A1, the S in the A1 sends the data to the X1 in the A1, the X2 in the A1, the X3 in the A1, or the X4 in the A1 through an intra-chassis interconnection interface. If the S in the A1 determines that the destination of the data is the another chassis, the S in the A1 may identify a specific destination chassis, and the S in the A1 sends the data to the destination chassis through an inter-chassis interconnection interface. For example, when the S in the A1 determines that the destination of the data is the A2, the S in the A1 sends the data to the R1 in the A2 through the inter-chassis interconnection interface.

For a process in which the R1 in the A2 sends and receives data, refer to the process in which the R1 in the A1 sends and receives the data. For a process in which the S in the A2 sends and receives data, refer to the process in which the S in the A1 sends and receives the data.

In this embodiment, when the B1 is added to the data communications system including the A1 and the A2, the S in the A1 is connected to the R1 in the B1, and the S in the A2 is connected to the R2 in the B1. The B1 further includes at least one seventh service forwarding module X. The R1 in the B1 is separately connected to each X in the B1. The R2 in the B1 is separately connected to each X in the B1. For example, t Xs are set in the B1 and are respectively an X1, an X2, . . . , and an Xt, where t is a positive integer greater than or equal to 1.

The S in the A1 may receive, through the intra-chassis interconnection interface, the data sent by the X1 in the A1, the X2 in the A1, the X3 in the A1, or the X4 in the A1. Then, the S in the A1 determines whether the destination of the data is the A1 or the another chassis. If the S in the A1 determines that the destination of the data is the A1, the S in the A1 sends the data to the X1 in the A1, the X2 in the A1, the X3 in the A1, or the X4 in the A1 through the intra-chassis interconnection interface. If the S in the A1 determines that the destination of the data is the B1, the S in the A1 sends the data to the R1 in the B1 through an inter-chassis interconnection interface. The S in the A1 may also receive, through the inter-chassis interconnection interface, data sent by the R1 in the B1. Then, the S in the A1 determines whether a destination of the data is the A1 or another chassis. If the S in the A1 determines that the destination of the data is the A1, the S in the A1 sends the data to the X1 in the A1, the X2 in the A1, the X3 in the A1, or the X4 in the A1 through the intra-chassis interconnection interface. If the S in the A1 determines that the destination of the data is the another chassis, the S in the A1 may identify a specific destination chassis, and the S in the A1 sends the data to the destination chassis through an inter-chassis interconnection interface. For example, when the S in the A1 determines that the destination of the data is the A2, the S in the A1 sends the data to the R1 in the A2 through the inter-chassis interconnection interface. The S in the A1 may also receive, through the inter-chassis interconnection interface, the data sent by the R1 in the A2. Then, the S in the A1 determines whether the destination of the data is the A1 or the another chassis. If the S in the A1 determines that the destination of the data is the A1, the S in the A1 sends the data to the X1 in the A1, the X2 in the A1, the X3 in the A1, or the X4 in the A1 through the intra-chassis interconnection interface. If the S in the A1 determines that the destination of the data is the another chassis, the S in the A1 may identify the specific destination chassis, and the S in the A1 sends the data to the destination chassis through an inter-chassis interconnection interface. For example, when the S in the A1 determines that the destination of the data is the B1, the S in the A1 sends the data to the R1 in the B1 through the inter-chassis interconnection interface.

For a process in which the S in the A2 sends and receives data, refer to the process in which the S in the A1 sends and receives the data.

The R1 in the B1 may receive, through an intra-chassis interconnection interface, data sent by an X in the B1. Then, the R1 in the B1 determines whether a destination of the data is the B1 or another chassis. If the R1 in the B1 determines that the destination of the data is the B1, the R1 in the B1 sends the data to the X in the B1 through the intra-chassis interconnection interface. If the R1 in the B1 determines that the destination of the data is the another chassis, the R1 in the B1 does not need to identify a specific destination chassis, and the R1 in the B1 sends the data to the S in the A1 through the inter-chassis interconnection interface. The R1 in the B1 may also receive, through the inter-chassis interconnection interface, data sent by the S in the A1. Then, the R1 in the B1 determines whether a destination of the data is the B1 or another chassis. If the R1 in the B1 determines that the destination of the data is the B1, the R1 in the B1 sends the data to the X in the B1 through the intra-chassis interconnection interface. If the R1 in the B1 determines that the destination of the data is the another chassis, the R1 in the B1 considers that invalid data is received and directly discards the data.

For a process in which the R2 in the B1 sends and receives data, refer to the process in which the R1 in the B1 sends and receives the data.

According to the data communications system provided in the foregoing embodiment, the data communications system including the A1, the A2, and the B1 is provided. A central switching chassis is removed, and only type-A service chassis and the type-B service chassis are deployed. Therefore, a footprint of the data communications system is reduced. In addition, because the central switching chassis is removed, there is no need to add an auxiliary hardware device, and power consumption and costs are reduced. During capacity expansion of the data communications system including the A1 and the A2, the B1 that is to be added to the system can be separately connected to the A1 and the A2 without changing cables between the A1 and the A2. This facilitates the capacity expansion, so that a back-to-back cluster system may be smoothly expanded to a multi-chassis cluster data communications system in this embodiment. In addition, the A1, the A2, and the B1 have service forwarding modules, so that the chassis in the data communications system may communicate with the another device outside the data communications system by using the service forwarding modules. The A1, the A2, and the B1 may complete data communication in the data communications system by using the S, the R1, and the like.

Figure 9:
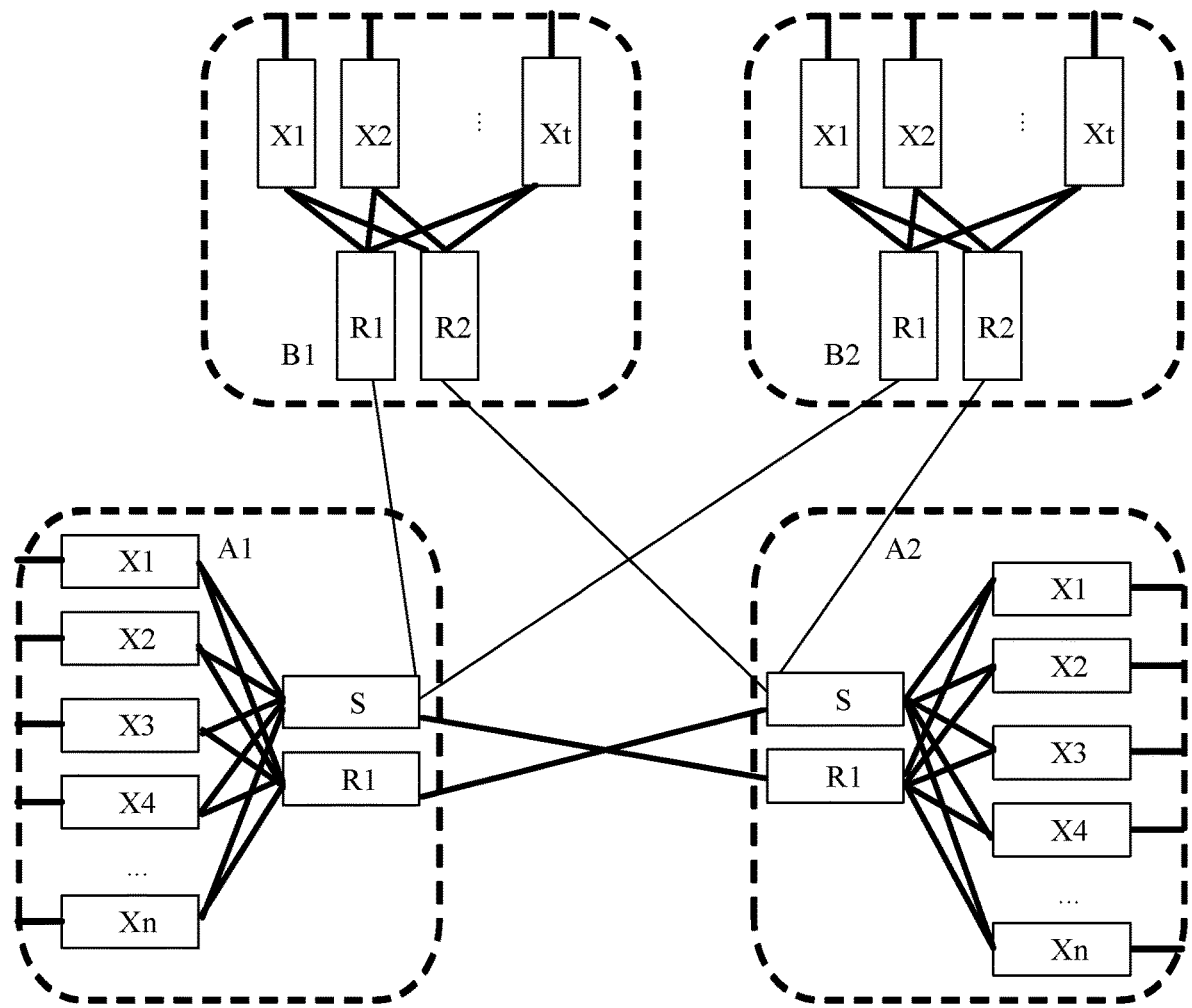
FIG. 9 is a schematic diagram of a structure of still another data communications system according to an embodiment of this application.

FIG. 9 is a schematic diagram of a structure of still another data communications system according to an embodiment of this application. Based on the embodiment shown in FIG. 7, as shown in FIG. 9, in the still another data communications system provided in this embodiment of this application, the data communications system further includes a fourth chassis, and the fourth chassis includes a fifth low-performance switching module and a sixth low-performance switching module, and the first high-performance switching module is connected to the fifth low-performance switching module, and the second high-performance switching module is connected to the sixth low-performance switching module.

In one embodiment, the first high-performance switching module is configured to: send data received from the fifth low-performance switching module to the second low-performance switching module; and send data received from the second low-performance switching module to the fifth low-performance switching module.

In one embodiment, the first chassis further includes a first service forwarding module and a second service forwarding module, the first service forwarding module and the second service forwarding module are configured to communicate with a device outside the data communications system, and the first low-performance switching module is configured to: send data received from the first service forwarding module to the second high-performance switching module; and send data received from the second high-performance switching module to the second service forwarding module.

In one embodiment, the first chassis further includes a third service forwarding module and a fourth service forwarding module, the third service forwarding module and the fourth service forwarding module are configured to communicate with the device outside the data communications system, and the first high-performance switching module is configured to: send data received from the third service forwarding module to the second low-performance switching module; and send data received from the second low-performance switching module to the fourth service forwarding module. In one embodiment, the third service forwarding module and the fourth service forwarding module may be a same module.

In one embodiment, the first high-performance switching module is configured to: after the third chassis is added to the communications system, send data received from the third low-performance switching module to the second low-performance switching module; and after the third chassis is added to the communications system, send data received from the second low-performance switching module to the third low-performance switching module.

For example, the data communications system already has the A1 and the A2, the A1 includes the S and the R1, and the A2 includes the S and the R1. The S in the A1 is connected to the R1 in the A2 through the inter-chassis interconnection interface, and the S in the A2 is connected to the R1 in the A1 through the another inter-chassis interconnection interface. Then, the fourth chassis B2 is further disposed in the data communications system. The B2 is a type-B service chassis. The B2 includes the fifth low-performance switching module R1 and the sixth low-performance switching module R2. The S in the A1 is connected to an R1 in the B2 through an inter-chassis interconnection interface, and the S in the A2 is connected to an R2 in the B2 through an inter-chassis interconnection interface.

In this case, the data communications system already has two type-A service chassis, which are respectively the A1 and the A2, and the data communications system also has the type-B service chassis B2. Then, a chassis that is to be added to the data communications system is a type-B service chassis B1.

The S in the A1 may receive, through an intra-chassis interconnection interface, data sent by an X in the A1. Then, the S in the A1 determines whether a destination of the data is the A1 or another chassis. If the S in the A1 determines that the destination of the data is the A1, the S in the A1 sends the data to the X in the A1 through the intra-chassis interconnection interface. If the S in the A1 determines that the destination of the data is the B2, the S in the A1 sends the data to the R1 in the B2 through the inter-chassis interconnection interface. The S in the A1 may also receive, through the inter-chassis interconnection interface, data sent by the R1 in the B2. Then, the S in the A1 determines whether a destination of the data is the A1 or another chassis. If the S in the A1 determines that the destination of the data is the A1, the S in the A1 sends the data to the X in the A1 through the intra-chassis interconnection interface. If the S in the A1 determines that the destination of the data is the another chassis, the S in the A1 may identify a specific destination chassis, and the S in the A1 sends the data to the destination chassis through an inter-chassis interconnection interface. For example, when the S in the A1 determines that the destination of the data is the A2, the S in the A1 in this embodiment sends the data to the R1 in the A2 through the inter-chassis interconnection interface. The S in the A1 may also receive, through the inter-chassis interconnection interface, data sent by the R1 in the A2. Then, the S in the A1 determines whether a destination of the data is the A1 or another chassis. If the S in the A1 determines that the destination of the data is the A1, the S in the A1 sends the data to the X in the A1 through the intra-chassis interconnection interface. If the S in the A1 determines that the destination of the data is the another chassis, the S in the A1 may identify a destination chassis, and the S in the A1 sends the data to the destination chassis through an inter-chassis interconnection interface. For example, when the S in the A1 determines that the destination of the data is the B2, the S in the A1 sends the data to the R1 in the B2 through the inter-chassis interconnection interface.

For a process in which the S in the A2 sends and receives data, refer to the process in which the S in the A1 sends and receives the data.

When a type-B service chassis is added in the data communications system including the A1, the A2, and the B2, for example, when the third chassis B1 is added, the provided B1 includes an R1 and an R2. When the B1 is added, the S in the A1 may be connected to the R1 in the B1, and the S in the A2 may be connected to the R2 in the B1.

For a process in which another module in the A1 sends and receives data, a process in which another module in the A2 sends and receives data, and a process in which a module in the B1 sends and receives data, refer to the description of the embodiment shown in FIG. 8.

Figure 10:
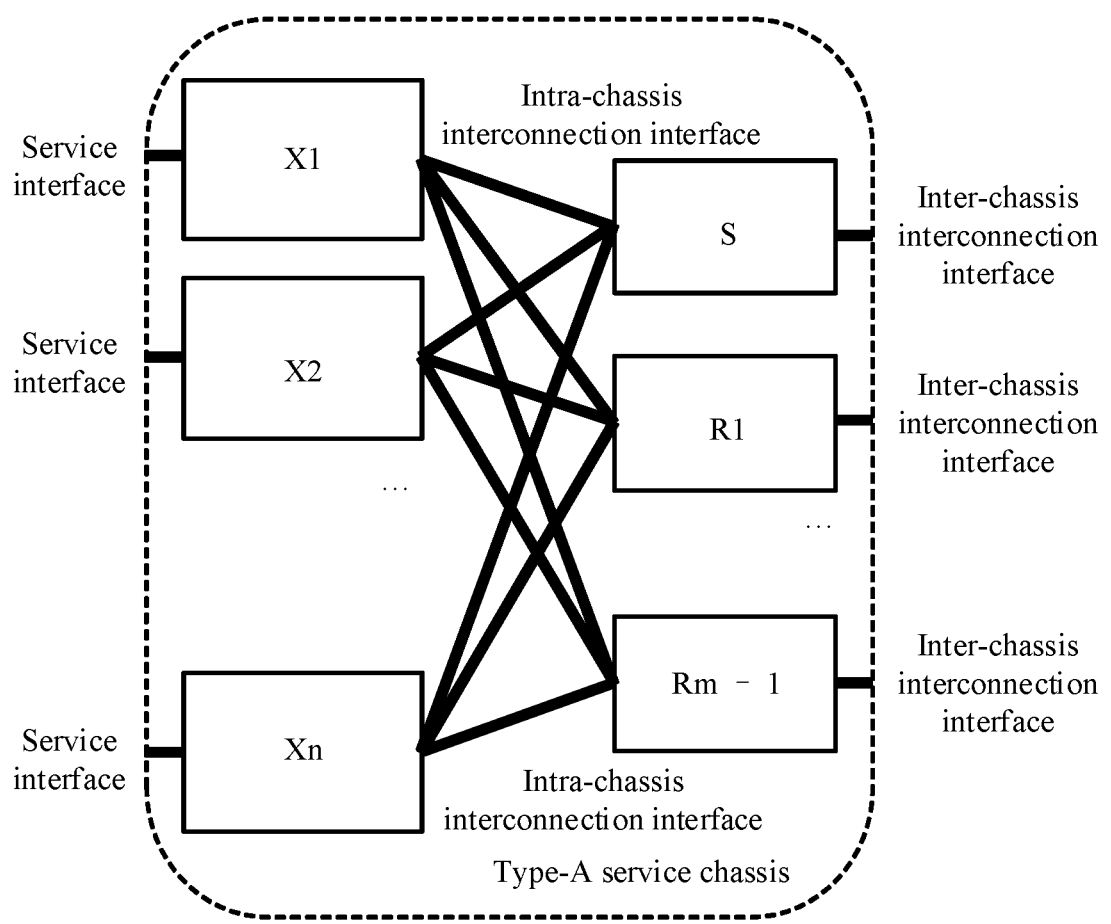
FIG. 10 is a schematic diagram 1 of a structure of a type-A service chassis in still another data communications system according to an embodiment of this application.
Figure 11:
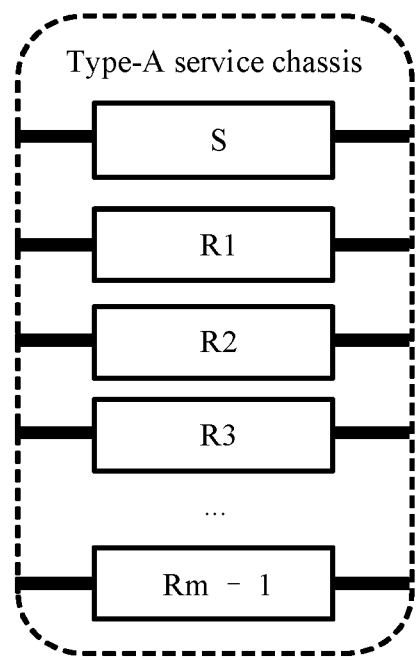
FIG. 11 is a schematic diagram 2 of a structure of a type-A service chassis in still another data communications system according to an embodiment of this application.
Figure 12:
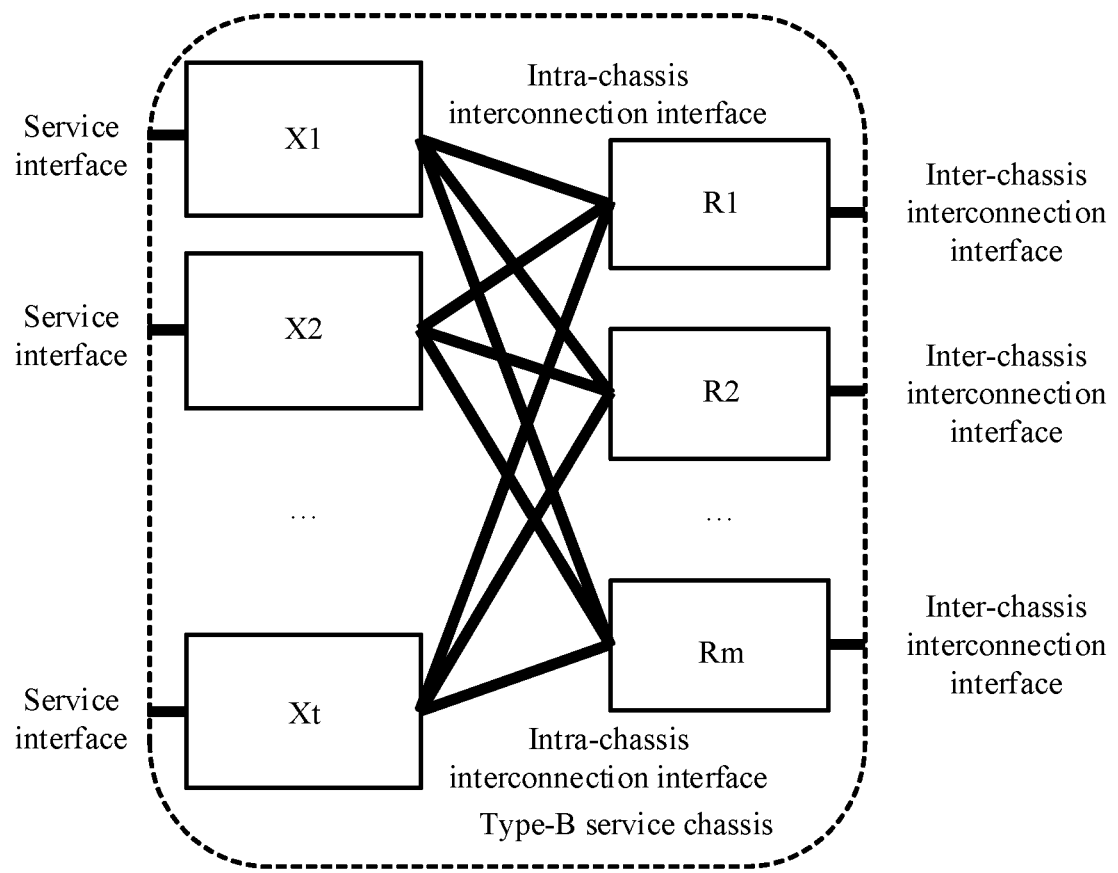
FIG. 12 is a schematic diagram 1 of a structure of a type-B service chassis in still another data communications system according to an embodiment of this application.
Figure 13:
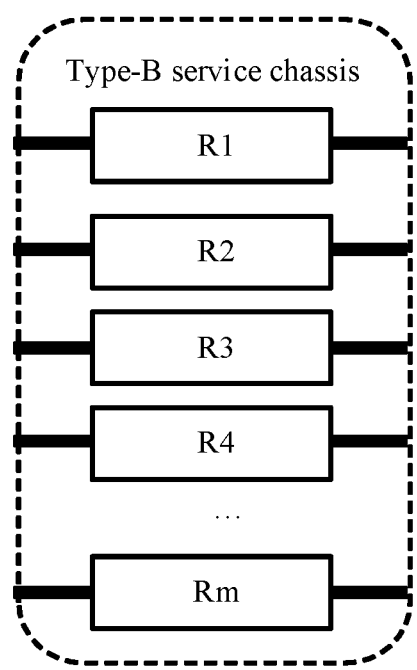
FIG. 13 is a schematic diagram 2 of a structure of a type-B service chassis in still another data communications system according to an embodiment of this application.

It can be learned from the foregoing description that FIG. 10 is a schematic diagram 1 of a structure of a type-A service chassis in still another data communications system according to an embodiment of this application. As shown in FIG. 10, each type-A service chassis includes one S and m−1 Rs, and further includes n Xs, for example, includes an S, an R1, an R2, . . . , an Rm−1, and an X1, an X2, . . . , and an Xn. Each X is connected to the S through an intra-chassis interconnection interface. Each X is connected to each R through an intra-chassis interconnection interface. The S is connected to another chassis through an inter-chassis interconnection interface. Each R is connected to another chassis through an inter-chassis interconnection interface. Each X is connected to another device outside the data communications system through a service interface. Each R in each chassis carries 1/m of a service bandwidth of the chassis. FIG. 11 is a schematic diagram 2 of a structure of a type-A service chassis in still another data communications system according to an embodiment of this application. The type-A service chassis shown in FIG. 10 is simplified to obtain the structure shown in FIG. 11. FIG. 12 is a schematic diagram 1 of a structure of a type-B service chassis in still another data communications system according to an embodiment of this application. As shown in FIG. 12, each type-B service chassis includes m Rs, and further includes t Xs, for example, an R1, an R2, . . . , and an Rm, an X1, an X2, . . . , and an Xt. Each X is connected to each R through an intra-chassis interconnection interface. Each R is connected to another chassis through an inter-chassis interconnection interface. Each X is connected to another device outside the data communications system through a service interface. Each R in each chassis carries 1/m of a service bandwidth of the chassis. FIG. 13 is a schematic diagram 2 of a structure of a type-B service chassis in still another data communications system according to an embodiment of this application. The type-B service chassis shown in FIG. 12 is simplified to obtain the structure shown in FIG. 13. n, m, and t are all positive integers. In addition, m also indicates a total quantity of type-A service chassis. It can be learned that, when the quantity of type-A service chassis is m, a quantity of Rs in each type-A service chassis is m−1. A quantity of Rs in each type-B service chassis is m. A total quantity of type-B service chassis can be the same as or different from the total quantity of type-A service chassis.

Figure 14:
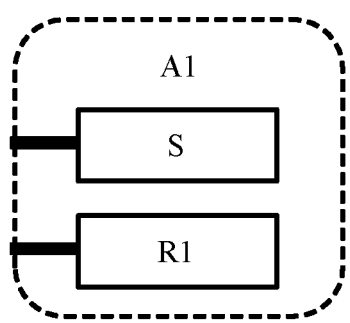
FIG. 14 is a schematic diagram of a structure of a single-chassis system in still another data communications system according to an embodiment of this application.
Figure 15:
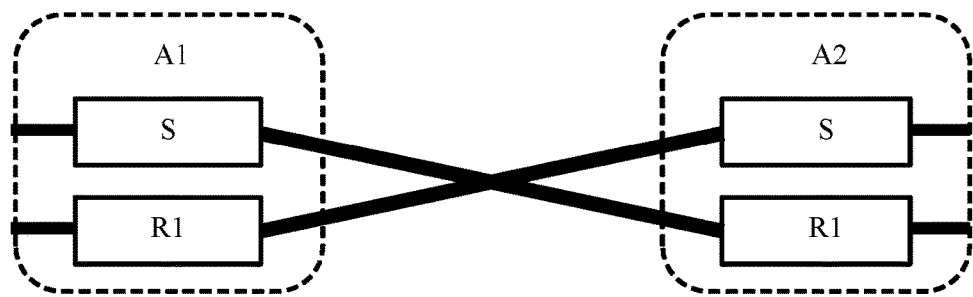
FIG. 15 is a schematic diagram of a structure of a two-chassis back-to-back cluster system in still another data communications system according to an embodiment of this application.

During capacity expansion of a multi-chassis cluster data communications device system, FIG. 14 is a schematic diagram of a structure of a single-chassis system in still another data communications system according to an embodiment of this application. As shown in FIG. 14, the single-chassis system includes only one type-A service chassis A1. The A1 includes one S and one R1. Then, first capacity expansion is performed. FIG. 15 is a schematic diagram of a structure of a two-chassis back-to-back cluster system in still another data communications system according to an embodiment of this application. As shown in FIG. 15, the two-chassis back-to-back cluster system includes two type-A service chassis: an A1 and an A2. The A1 includes one S and one R1. The A2 includes one S and one R1. The A1 and the A2 are evenly interconnected. Because there is only one A1 in FIG. 14 and the A1 is not connected to another chassis, when the single-chassis system shown in FIG. 14 is expanded to the two-chassis back-to-back cluster system shown in FIG. 15, namely, when the A2 is added, the A1 is connected to the A2 through new cables. Existing cables are not adjusted. Therefore, the capacity expansion process does not affect a service deployed on the type-A service chassis A1, and the system shown in FIG. 14 is smoothly expanded to the system shown in FIG. 15.

Figure 16:
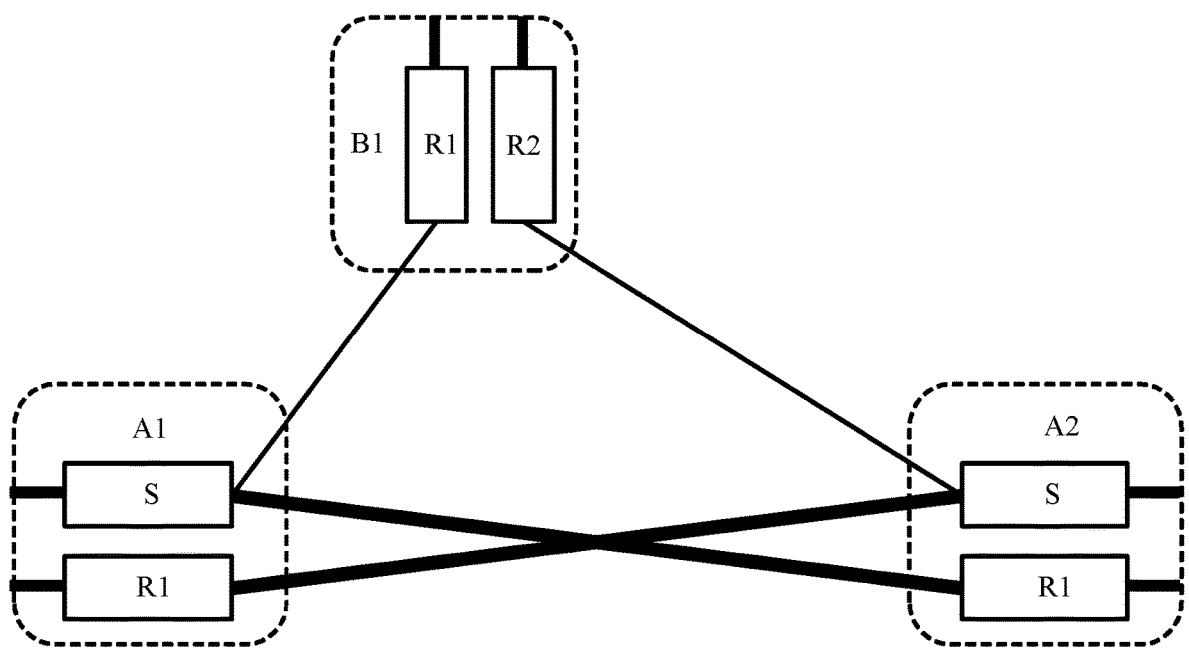
FIG. 16 is a schematic diagram of a structure of a three-chassis cluster system in still another data communications system according to an embodiment of this application.

Then, second capacity expansion is performed. FIG. 16 is a schematic diagram of a structure of a three-chassis cluster system in still another data communications system according to an embodiment of this application. As shown in FIG. 16, a type-B service chassis B1 is added to the system shown in FIG. 15. The B1 is separately connected to the A1 and the A2 through new cables. Existing cables are not adjusted. Therefore, the capacity expansion process does not affect services deployed on the type-A service chassis: the A1 and the A2, or inter-chassis connections deployed between the type-A service chassis: the A1 and the A2, and the system shown in FIG. 15 is smoothly expanded to the system shown in FIG. 16.

Figure 17:
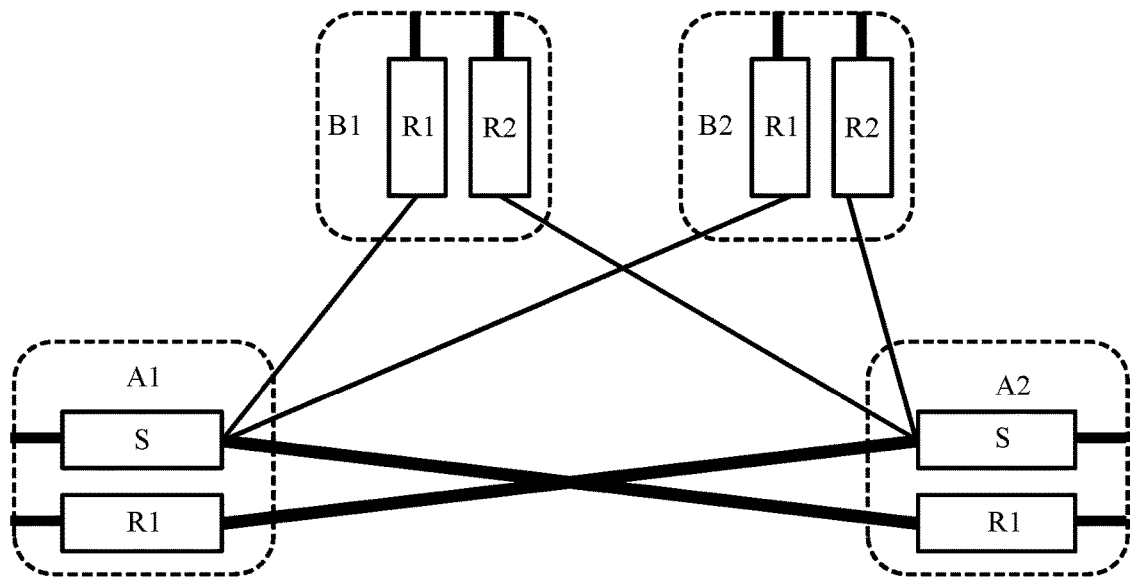
FIG. 17 is a schematic diagram of a structure of a four-chassis cluster system in still another data communications system according to an embodiment of this application.

Then, third capacity expansion is performed. FIG. 17 is a schematic diagram of a structure of a four-chassis cluster system in still another data communications system according to an embodiment of this application. As shown in FIG. 17, a type-B service chassis B2 is added to the system shown in FIG. 16. The B2 is separately connected to the A1 and the A2 through new cables. Existing cables are not adjusted. Therefore, the capacity expansion does not affect services on both the deployed type-A service chassis and the deployed type-B service chassis, or inter-chassis connections between the deployed type-A service chassis and the deployed type-B service chassis, and the system shown in FIG. 16 is smoothly expanded to the system shown in FIG. 17.

Figure 18:
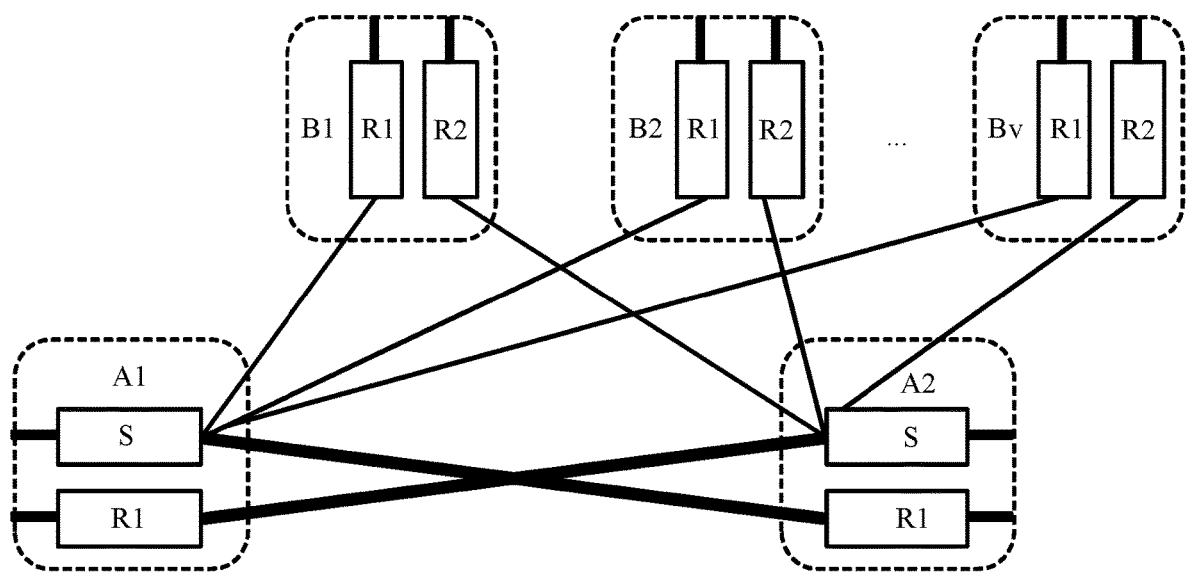
FIG. 18 is a schematic diagram of a structure of a multi-chassis cluster system in still another data communications system according to an embodiment of this application.

When the capacity expansion continues, the rest may be deduced by analogy. FIG. 18 is a schematic diagram of a structure of a multi-chassis cluster system in still another data communications system according to an embodiment of this application. When a $v^{th}$ type-B service chassis is added, By is separately connected to the A1 and the A2 through new cables. It can be learned that, when new type-B service chassis are continuously added, the type-B service chassis that are to be added are separately connected to the A1 and the A2 through new cables. Existing cables are not adjusted. Therefore, the capacity expansion does not affect services on both the deployed type-A service chassis and the deployed type-B service chassis, or inter-chassis connections between the deployed type-A service chassis and the deployed type-B service chassis. This implements smooth capacity expansion. Table 1 lists performance requirements for an S and an R when an (m+v)-chassis cluster system with m=2 is constructed, where v is a quantity of type-B service chassis, as shown in Table 1.

TABLE 1

Performance requirements for an S and an R when an (m + v)-chassis cluster system with m = 2 is constructed

| Quantity of type-A service chassis | Quantity of type-B service chassis | Quantity of Ss in a type-A service chassis | Quantity of R modules in a type-A service chassis | A performance requirement for an S in a type-A service chassis | A performance requirement for an R in a type-A service chassis | Quantity of Rs in a type-B service chassis | A performance requirement for an R in a type-B service chassis |
|---|---|---|---|---|---|---|---|
| m | v | 1 | m − 1 | (1 + (v/m)) times performance of a single chassis | (1/m) times performance of a single chassis | m | (1/m) times performance of a single chassis |
| 2 | 0 | 1 | 1 | 1 | 0.5 | — | — |
| 2 | 1 | 1 | 1 | 1.5 | 0.5 | 2 | 0.5 |
| 2 | 2 | 1 | 1 | 2 | 0.5 | 2 | 0.5 |
| 2 | 3 | 1 | 1 | 2.5 | 0.5 | 2 | 0.5 |
| 2 | 4 | 1 | 1 | 3 | 0.5 | 2 | 0.5 |
| . . . | . . . | . . . | . . . | . . . | . . . | . . . | . . . |

It can be learned from Table 1 that, when the quantity of type-B service chassis gradually increases, a higher performance requirement is imposed on an S in the type-A service chassis. In other words, a supported cluster scale depends on an engineering implementation capability of a switching module S in the type-A service chassis.

According to the data communications system provided in the foregoing embodiment, the data communications system including the A1, the A2, and the B1 is provided. A central switching chassis is removed, and only the type-A service chassis and the type-B service chassis are deployed. Therefore, a footprint of the data communications system is reduced. In addition, because the central switching chassis is removed, there is no need to add an auxiliary hardware device, and power consumption and costs are reduced. During capacity expansion of the data communications system including the A1 and the A2, the B1 that is to be added to the system can be separately connected to the A1 and the A2 without changing cables between the A1 and the A2. This facilitates the capacity expansion, so that a back-to-back cluster system may be smoothly expanded to a multi-chassis cluster data communications system in this embodiment. In addition, the A1, the A2, and the B1 have a service forwarding module, so that the chassis in the data communications system may communicate with the another device outside the data communications system by using the service forwarding module. The A1, the A2, and the B1 may complete data communication in the data communications system by using an S, an R1, and the like.

Figure 19:
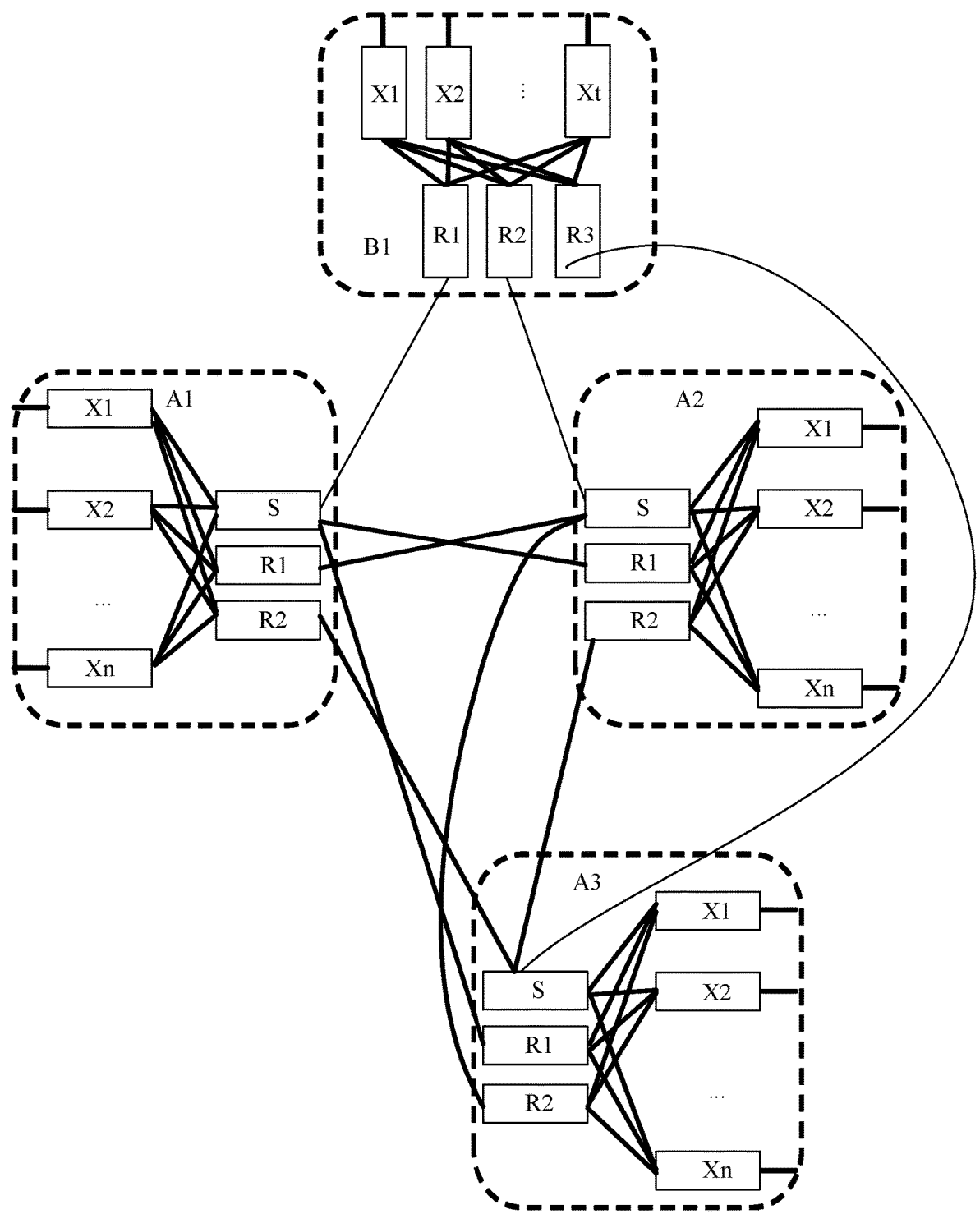
FIG. 19 is a schematic diagram of a structure of yet another data communications system according to an embodiment of this application.

FIG. 19 is a schematic diagram of a structure of yet another data communications system according to an embodiment of this application. Based on the embodiment shown in FIG. 7, as shown in FIG. 19, the yet another data communications system provided in this embodiment of this application further includes a fifth chassis, the fifth chassis includes a third high-performance switching module, a seventh low-performance switching module, and an eighth low-performance switching module, the first chassis further includes a ninth low-performance switching module, and the second chassis further includes a tenth low-performance switching module, the third high-performance switching module is connected to the ninth low-performance switching module and the tenth low-performance switching module, the first high-performance switching module is connected to the seventh low-performance switching module, and the second high-performance switching module is connected to the eighth low-performance switching module, and the third high-performance switching module is configured to connect to an eleventh low-performance switching module in the third chassis that is to be added to the communications system.

In one embodiment, the first high-performance switching module is configured to send data received from the second low-performance switching module to the seventh low-performance switching module; send data received from the seventh low-performance switching module to the second low-performance switching module; after the third chassis is added to the communications system, send data received from the third low-performance switching module to one of the second low-performance switching module and the seventh low-performance switching module; and after the third chassis is added to the communications system, send data received from the one of the second low-performance switching module and the seventh low-performance switching module to the third low-performance switching module.

For example, the data communications system already has the A1 and the A2, the A1 includes the S and the R1, and the A2 includes the S and the R1. The S in the A1 is connected to the R1 in the A2 through the inter-chassis interconnection interface, and the S in the A2 is connected to the R1 in the A1 through the another inter-chassis interconnection interface. Then, the fifth chassis A3 is further disposed in the data communications system. The A3 is a type-A service chassis. The A3 includes the third high-performance switching module R1, the seventh low-performance switching module R2, and the eighth low-performance switching module R3. In this case, the data communications system has three type-A service chassis, which are the A1, the A2, and the A3 respectively. Each type-A service chassis has one S and two Rs. It can further be learned that the A1 further includes the ninth low-performance switching module R2, and the A2 further includes the tenth low-performance switching module R2.

Therefore, the data communications system includes the three type-A service chassis, which are the A1, the A2, and the A3 respectively. Each type-A service chassis has one S and the two Rs. The S in the A1 is connected to the R1 in the A2 through the inter-chassis interconnection interface. The S in the A1 is connected to the R1 in the A3 through one inter-chassis interconnection interface. The S in the A2 is connected to the R1 in the A1 through one inter-chassis interconnection interface. The S in the A2 is connected to the R2 in the A3 through one inter-chassis interconnection interface. The S in the A3 is connected to the R2 in the A1 through one inter-chassis interconnection interface. The S in the A3 is connected to the R2 in the A2 through one inter-chassis interconnection interface.

Figure 20:
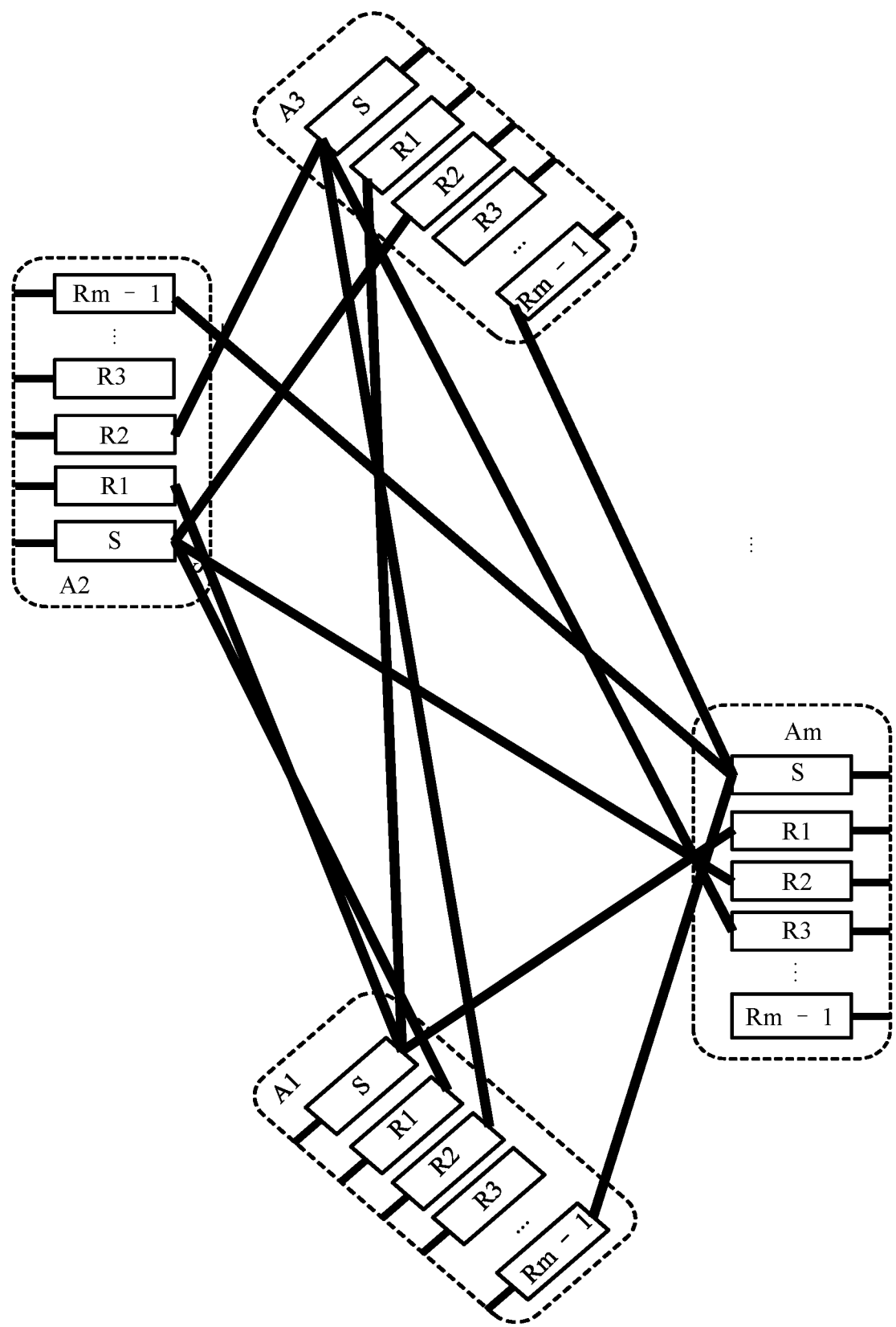
FIG. 20 is a diagram of a connection relationship of type-A service chassis in yet another data communications system according to an embodiment of this application.

First, based on the data communications system including the two type-A service chassis in the embodiment shown in FIG. 7, and the data communications system including the three type-A service chassis in FIG. 19, it can be learned that the S in each type-A service chassis is evenly connected to Rs in other type-A service chassis, and Rs in each type-A service chassis is evenly connected to an S in the other type-A service chassis. FIG. 20 is a diagram of a connection relationship of type-A service chassis in yet another data communications system according to an embodiment of this application. The type-A service chassis in FIG. 20 is in a representation manner in FIG. 11. As shown in FIG. 20, m type-A service chassis are disposed, where m is greater than or equal to 2. An S in each type-A service chassis is evenly connected to Rs in other type-A service chassis through inter-chassis interconnection interfaces. One cross-connect plane is constructed by an S in one type-A service chassis and Rs in other type-A service chassis that are connected to the S in the type-A service chassis. Therefore, a total of m cross-connect planes are constructed by the m type-A service chassis. The m cross-connect planes are independent of each other and work in load sharing mode to bear all inter-chassis data exchange. In addition, an internal connection of each cross-connect plane is a star connection manner from a plurality of Rs to one S, which is totally different from the mesh connection manner of the switching module used in the foregoing switching network cluster system.

Table 2 shows a connection manner of the m cross-connect planes constructed by the m type-A service chassis. As shown in Table 2, after the m type-A service chassis are cross-connected based on the solution shown in FIG. 20, the m cross-connect planes are constructed, and a connection status of each cross-connect plane is shown in Table 2. Each row in Table 2 represents an R or an S in each type-A service chassis included in one cross-connect plane. For example, a cross-connect plane 1 is constructed by an S in a type-A service chassis A1, an R1 in a type-A service chassis A2, an R1 in a type-A service chassis A3, . . . , an R1 in a type-A service chassis Am−1, and an R1 in a type-A service chassis Am.

TABLE 2

A connection manner of m cross-connect planes
constructed by m type-A service chassis

| Cross-connect plane number | Type-A service chassis 1 | Type-A service chassis 2 | Type-A service chassis 3 | ... | Type-A service chassis m − 1 | Type-A service chassis m |
|---|---|---|---|---|---|---|
| 1 | S | R1 | R1 | ... | R1 | R1 |
| 2 | R1 | S | R2 | ... | R2 | R2 |
| 3 | R2 | R2 | S | ... | R3 | R3 |
| ... | ... | ... | ... | ... | ... | ... |
| m − 1 | Rm − 2 | Rm − 2 | Rm − 2 | ... | S | Rm − 1 |
| m | Rm − 1 | Rm − 1 | Rm − 1 | ... | Rm − 1 | S |

It can be seen from FIG. 20 that, Rs are only connected to an S in a type-A service chassis. Therefore, as long as a data net bandwidth of an inter-chassis interconnection interface for an R is greater than or equal to a data net bandwidth of an intra-chassis interconnection interface for the R, the R can work at a line rate. However, the S in the type-A service chassis is connected with one R in each of other service chassis. Therefore, a data net bandwidth requirement of an inter-chassis interconnection interface for the S is related to a total quantity of chassis in the multi-chassis cluster system. In the multi-chassis cluster system, the data net bandwidth of the inter-chassis interconnection interface for the S is several times a data net bandwidth of an intra-chassis interconnection interface for the S. As shown in FIG. 20, when the multi-chassis cluster system has only the m type-A service chassis having same performance, a bandwidth provided by an inter-chassis interconnection interface of each S is m−1 times a bandwidth of the intra-chassis interconnection interface for the S.

As shown in FIG. 19, the data communications system includes the three type-A service chassis, which are respectively the A1, the A2, and the A3. The chassis that is to be added to the data communications system is the type-B service chassis B1.

The S in the A1 may receive, through an intra-chassis interconnection interface, data sent by an X in the A1. Then, the S in the A1 determines whether a destination of the data is the A1 or another chassis. If the S in the A1 determines that the destination of the data is the A1, the S in the A1 sends the data to the X in the A1 through the intra-chassis interconnection interface. If the S in the A1 determines that the destination of the data is the A2, the S in the A1 sends the data to the R1 in the A2 through an inter-chassis interconnection interface. If the S in the A1 determines that the destination of the data is the A3, the S in the A1 sends the data to the R1 in the A3 through an inter-chassis interconnection interface. The S in the A1 may also receive, through the inter-chassis interconnection interface, data sent by the R1 in the A2. Then, the S in the A1 determines whether a destination of the data is the A1 or another chassis. If the S in the A1 determines that the destination of the data is the A1, the S in the A1 sends the data to the X in the A1 through the intra-chassis interconnection interface. If the S in the A1 determines that the destination of the data is the another chassis, the S in the A1 may identify a destination chassis, and the S in the A1 sends the data to the destination chassis through an inter-chassis interconnection interface. For example, when the S in the A1 determines that the destination of the data is the A3, the S in the A1 sends the data to the R1 in the A3 through the inter-chassis interconnection interface. The S in the A1 may also receive, through the inter-chassis interconnection interface, data sent by the R1 in the A3. Then, the S in the A1 determines whether a destination of the data is the A1 or another chassis. If the S in the A1 determines that the destination of the data is the A1, the S in the A1 sends the data to the X in the A1 through the intra-chassis interconnection interface. If the S in the A1 determines that the destination of the data is the another chassis, the S in the A1 may identify a destination chassis, and the S in the A1 sends the data to the destination chassis through an inter-chassis interconnection interface. For example, when the S in the A1 determines that the destination of the data is the A2, the S in the A1 sends the data to the R1 in the A2 through the inter-chassis interconnection interface.

For a process in which the S in the A2 sends and receives data, refer to the process in which the S in the A1 sends and receives the data.

When the type-B service chassis is added to the data communications system including the A1, the A2, and the A3, for example, when the third chassis B1 is added, the provided B1 includes a third low-performance switching module R1, a fourth low-performance switching module R2, and an eleventh low-performance switching module R3. When the B1 is added, the S in the A1 may be connected to the R1 in the B1, the S in the A2 may be connected to the R2 in the B1, and the S in the A3 may be connected to the R3 in the B1.

The S in the A1 may also receive, through an inter-chassis interconnection interface, data sent by the R1 in the B1. Then, the S in the A1 determines whether a destination of the data is the A1 or another chassis. If the S in the A1 determines that the destination of the data is the A1, the S in the A1 sends the data to the X in the A1 through the intra-chassis interconnection interface. If the S in the A1 determines that the destination of the data is the another chassis, the S in the A1 may identify a specific destination chassis, and the S in the A1 sends the data to the destination chassis through an inter-chassis interconnection interface. For example, when the S in the A1 determines that the destination of the data is the A2, the S in the A1 sends the data to the R1 in the A2 through the inter-chassis interconnection interface, or when the S in the A1 determines that the destination of the data is the A3, the S in the A1 sends the data to the R1 in the A3 through the inter-chassis interconnection interface. The S in the A1 may also receive, through the inter-chassis interconnection interface, the data sent by the R1 in the A2. Then, the S in the A1 determines whether a destination of the data is the A1 or another chassis. If the S in the A1 determines that the destination of the data is the A1, the S in the A1 sends the data to the X in the A1 through the intra-chassis interconnection interface. If the S in the A1 determines that the destination of the data is the another chassis, the S in the A1 may identify a specific destination chassis, and the S in the A1 sends the data to the destination chassis through an inter-chassis interconnection interface. For example, when the S in the A1 determines that the destination of the data is the B1, the S in the A1 sends the data to the R1 in the B1 through the inter-chassis interconnection interface, or when the S in the A1 determines that the destination of the data is the A3, the S in the A1 sends the data to the R1 in the A3 through the inter-chassis interconnection interface. The S in the A1 may also receive, through the inter-chassis interconnection interface, data sent by the R1 in the A3. Then, the S in the A1 determines whether a destination of the data is the A1 or another chassis. If the S in the A1 determines that the destination of the data is the A1, the S in the A1 sends the data to the X in the A1 through the intra-chassis interconnection interface. If the S in the A1 determines that the destination of the data is the another chassis, the S in the A1 may identify a specific destination chassis, and the S in the A1 sends the data to the destination chassis through an inter-chassis interconnection interface. For example, when the S in the A1 determines that the destination of the data is the B1, the S in the A1 sends the data to the R1 in the B1 through the inter-chassis interconnection interface, or when the S in the A1 determines that the destination of the data is the A2, the S in the A1 sends the data to the R1 in the A2 through the inter-chassis interconnection interface.

For a process in which the S in the A2 sends and receives data, refer to the process in which the S in the A1 sends and receives the data.

For a process in which another module in the A1 sends and receives data, a process in which another module in the A2 sends and receives data, and a process in which a module in the B1 sends and receives data, refer to the description of the embodiment shown in FIG. 8.

According to the data communications system provided in the foregoing embodiment, the data communications system including the A1, the A2, and the A3 is provided. A central switching chassis is removed, and only the type-A service chassis and the type-B service chassis are deployed. Therefore, a footprint of the data communications system is reduced. In addition, because the central switching chassis is removed, there is no need to add an auxiliary hardware device, and power consumption and costs are reduced. During capacity expansion of the data communications system including the type-A service chassis, the B1 that is to be added to the system can be separately connected to the type-A service chassis without changing cables between the type-A service chassis. This facilitates the capacity expansion, and implements smooth capacity expansion. In addition, the A1, the A2, the A3, and the B1 have service forwarding modules, so that the chassis in the data communications system may communicate with the another device outside the data communications system by using the service forwarding module. The A1, the A2, the A3, and the B1 may complete data communication in the data communications system by using the S, the R1, and the like.

Figure 21:
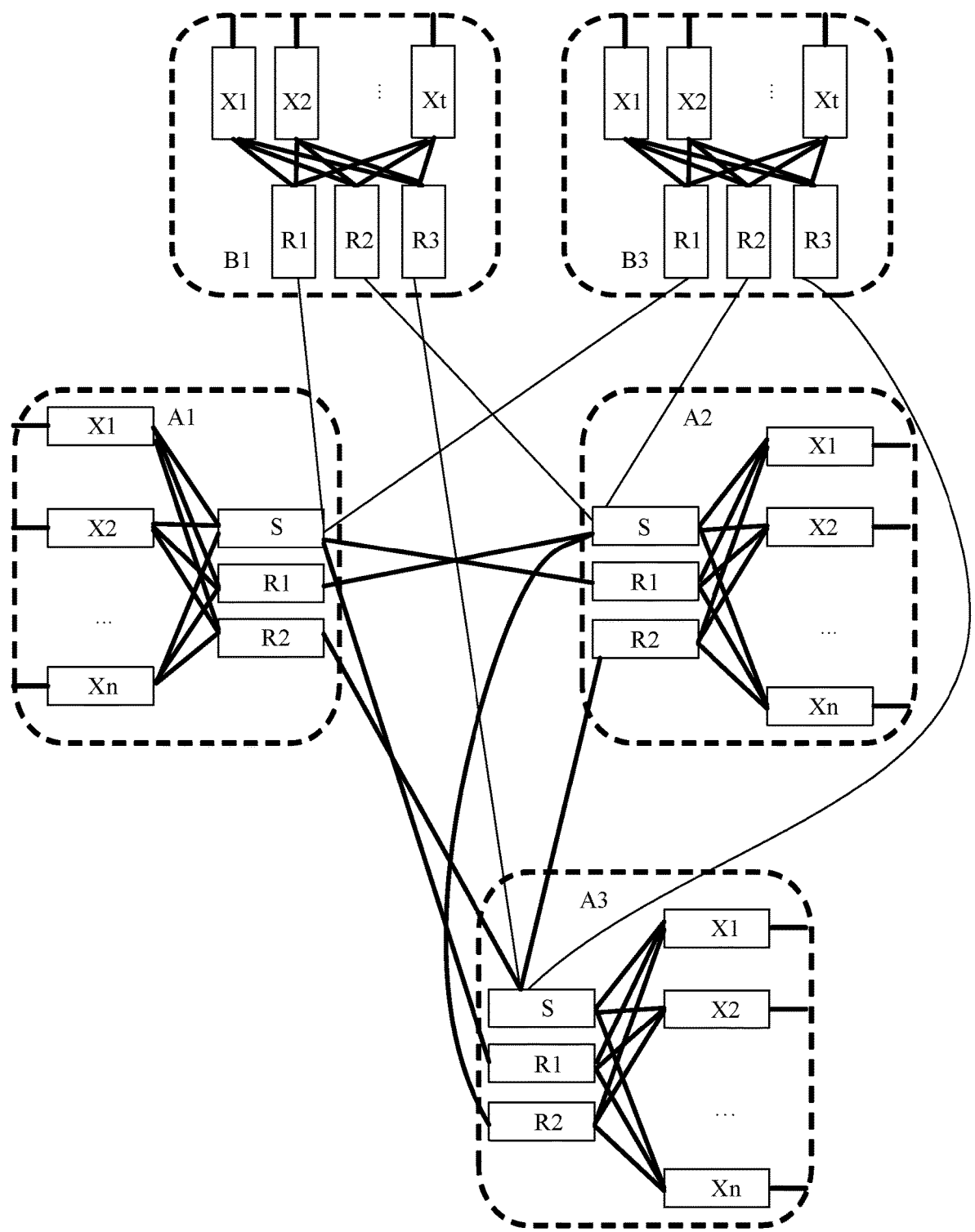
FIG. 21 is a schematic diagram of a structure of another data communications system according to an embodiment of this application.

FIG. 21 is a schematic diagram of a structure of another data communications system according to an embodiment of this application. Based on the embodiment shown in FIG. 19, as shown in FIG. 21, in the another data communications system provided in this embodiment of this application, the data communications system further includes a sixth chassis, and the sixth chassis includes a twelfth low-performance switching module, a thirteenth low-performance switching module, and a fourteenth low-performance switching module.

The twelfth low-performance switching module is connected to the first high-performance switching module, the thirteenth low-performance switching module is connected to the second high-performance switching module, and the fourteenth low-performance switching module is connected to the third high-performance switching module.

In one embodiment, the first high-performance switching module is configured to: send data received from the twelfth low-performance switching module to one of the second low-performance switching module and the seventh low-performance switching module; and send data received from the one of the second low-performance switching module and the seventh low-performance switching module to the twelfth low-performance switching module.

For example, the data communications system already has the A1, the A2, and the A3. The sixth chassis B3 is further disposed in the data communications system. The B3 includes the twelfth low-performance switching module R1, the thirteenth low-performance switching module R2, and the fourteenth low-performance switching module R3. The S in the A1 may be connected to the R1 in the B3. The S in the A2 is connected to the R2 in the B3. The S in the A3 is connected to the R3 in the B3. For a connection relationship between the A1, the A2, and the A3, refer to the embodiment shown in FIG. 19.

In this case, the data communications system already has three type-A service chassis, which are respectively the A1, the A2 and the A3, and the data communications system also has the type-B service chassis B3. Then, a chassis that is to be added to the data communications system is a type-B service chassis B1.

The S in the A1 may receive, through an intra-chassis interconnection interface, data sent by the X in the A1. Then, the S in the A1 determines whether a destination of the data is the A1 or another chassis. If the S in the A1 determines that the destination of the data is the A1, the S in the A1 sends the data to the X in the A1 through the intra-chassis interconnection interface. If the S in the A1 determines that the destination of the data is the A2, the S in the A1 sends the data to the R1 in the A2 through an inter-chassis interconnection interface. If the S in the A1 determines that the destination of the data is the A3, the S in the A1 sends the data to the R1 in the A3 through an inter-chassis interconnection interface. If the S in the A1 determines that the destination of the data is the B3, the S in the A1 sends the data to the R1 in the B3 through an inter-chassis interconnection interface. The S in the A1 may also receive, through the inter-chassis interconnection interface, data sent by the R1 in the B3. Then, the S in the A1 determines whether a destination of the data is the A1 or another chassis. If the S in the A1 determines that the destination of the data is the A1, the S in the A1 sends the data to the X in the A1 through the intra-chassis interconnection interface. If the S in the A1 determines that the destination of the data is the another chassis, the S in the A1 may identify a specific destination chassis, and the S in the A1 sends the data to the destination chassis through an inter-chassis interconnection interface. For example, when the S in the A1 determines that the destination of the data is the A2, the S in the A1 sends the data to the R1 in the A2 through the inter-chassis interconnection interface, or when the S in the A1 determines that the destination of the data is the A3, the S in the A1 sends the data to the R1 in the A3 through the inter-chassis interconnection interface. The S in the A1 may also receive, through the inter-chassis interconnection interface, data sent by the R1 in the A2. Then, the S in the A1 determines whether a destination of the data is the A1 or another chassis. If the S in the A1 determines that the destination of the data is the A1, the S in the A1 sends the data to the X in the A1 through the intra-chassis interconnection interface. If the S in the A1 determines that the destination of the data is the another chassis, the S in the A1 may identify a specific destination chassis, and the S in the A1 sends the data to the destination chassis through an inter-chassis interconnection interface. For example, when the S in the A1 determines that the destination of the data is the B3, the S in the A1 sends the data to the R1 in the B3 through the inter-chassis interconnection interface, or when the S in the A1 determines that the destination of the data is the A3, the S in the A1 sends the data to the R1 in the A3 through the inter-chassis interconnection interface. The S in the A1 may also receive, through the inter-chassis interconnection interface, data sent by the R1 in the A3. Then, the S in the A1 determines whether a destination of the data is the A1 or another chassis. If the S in the A1 determines that the destination of the data is the A1, the S in the A1 sends the data to the X in the A1 through the intra-chassis interconnection interface. If the S in the A1 determines that the destination of the data is the another chassis, the S in the A1 may identify a specific destination chassis, and the S in the A1 sends the data to the destination chassis through an inter-chassis interconnection interface. For example, when the S in the A1 determines that the destination of the data is the B3, the S in the A1 sends the data to the R1 in the B3 through the inter-chassis interconnection interface, or when the S in the A1 determines that the destination of the data is the A2, the S in the A1 sends the data to the R1 in the A2 through the inter-chassis interconnection interface.

For a process in which the S in the A2 sends and receives data, refer to the process in which the S in the A1 sends and receives the data.

When the type-B service chassis is added in the data communications system including the A1, the A2, the A3, and the B3, for example, when the third chassis B1 is added, the provided B1 includes one R1, one R2, and one R3. When the B1 is added, the S in the A1 may be connected to the R1 in the B1, the S in the A2 may be connected to the R2 in the B1, and the S in the A3 may be connected to the R3 in the B1.

For a process in which the S in the A1 sends and receives data, and a process in which the S in the A2 sends and receives data, refer to the description of the embodiment shown in FIG. 19. In addition, for a process in which another module in the A1 sends and receives data, a process in which another module in the A2 sends and receives data, a process in which another module in the A3 sends and receives data, and a process in which a module in the B1 sends and receives data, refer to the description of the embodiment shown in FIG. 8.

According to the data communications system provided in the foregoing embodiment, the data communications system including the A1, the A2, the A3, and the B3 is provided. A central switching chassis is removed. When the type-B service chassis is added, only the type-A service chassis and the type-B service chassis are deployed. Therefore, a footprint of the data communications system is reduced. In addition, because the central switching chassis is removed, there is no need to add an auxiliary hardware device, and power consumption and costs are reduced. During capacity expansion of the data communications system including a plurality of type-A service chassis and at least one type-B service chassis, the B1 that is to be added to the system can be separately connected to the type-A service chassis without changing the cables and interfaces between the type-A service chassis, or cables and interfaces between the deployed type-B service chassis and each type-A service chassis. This facilitates the capacity expansion, and implements smooth capacity expansion. In addition, the A1, the A2, the A3, the B3, and the B1 have service forwarding modules, so that the chassis in the data communications system may communicate with the another device outside the data communications system by using the service forwarding module. The A1, the A2, the A3, the B3, and the B1 may complete data communication in the data communications system by using the S, the R1, and the like.

Figure 22:
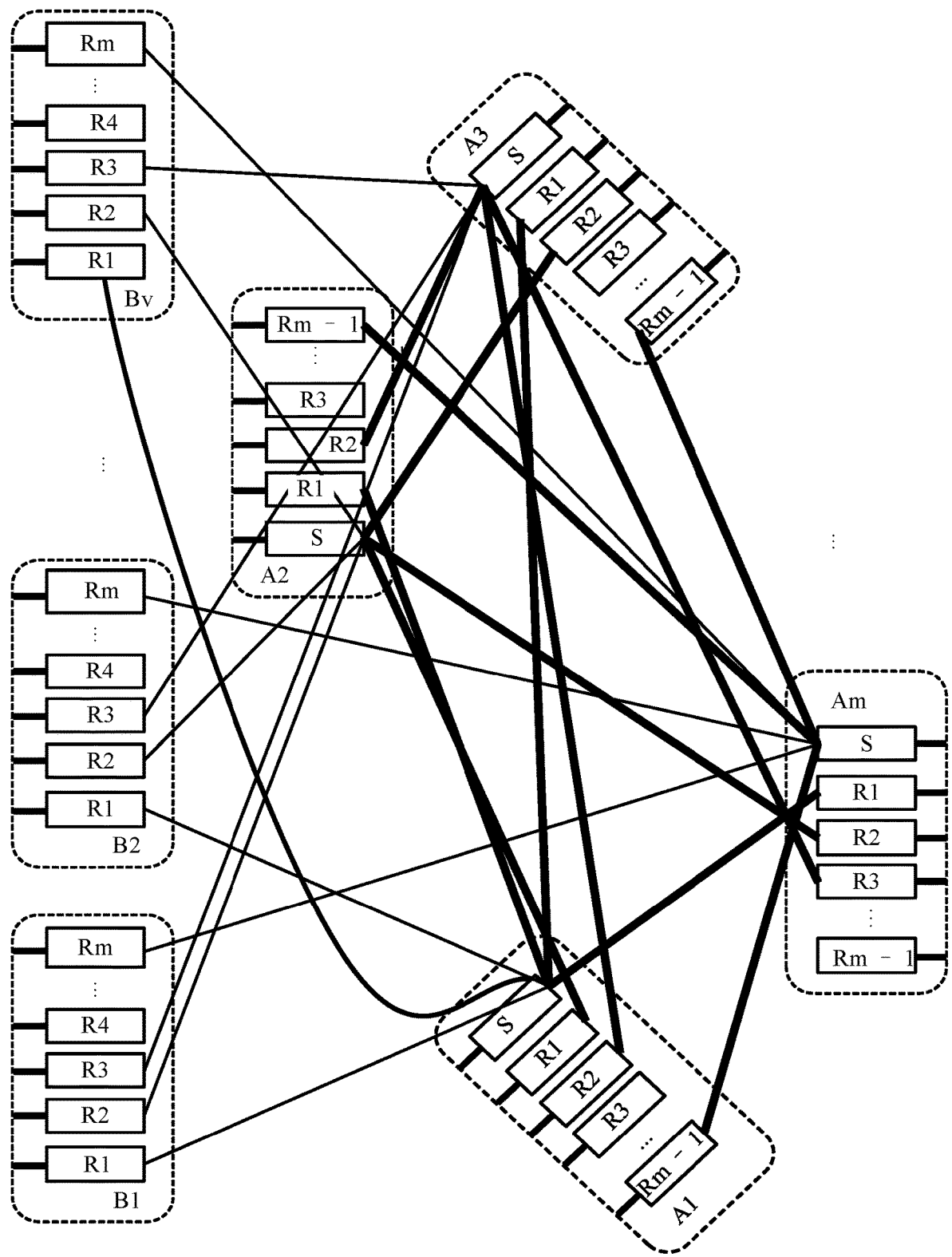
FIG. 22 is a schematic diagram 1 of a structure of still another data communications system according to an embodiment of this application.
Figure 23:
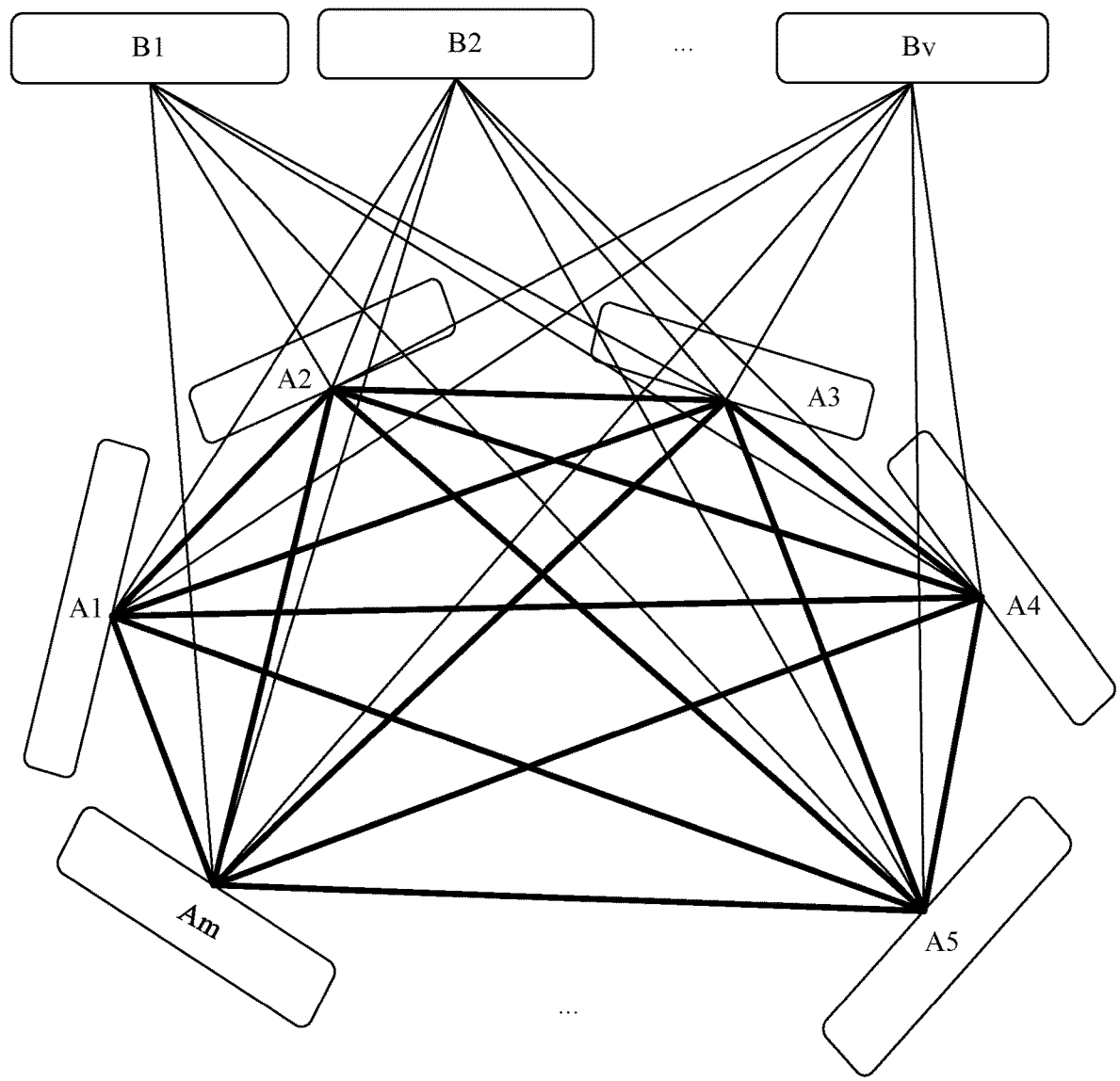
FIG. 23 is a schematic diagram 2 of a structure of still another data communications system according to an embodiment of this application.

FIG. 22 is a schematic diagram 1 of a structure of still another data communications system according to an embodiment of this application. FIG. 23 is a schematic diagram 2 of a structure of the still another data communications system according to an embodiment of this application. Based on the embodiment shown in FIG. 19, as shown in FIG. 22 and FIG. 23, the till another data communications system provided in this embodiment of this application includes m type-A service chassis and v type-B service chassis. Each type-A service chassis includes one S and m−1 Rs, and each type-B service chassis includes m Rs, where m and v are positive integers.

For example, it can be learned from the description in FIG. 19 to FIG. 21 that, when the data communications system includes the m type-A service chassis and the v type-B service chassis, refer to connection manners in FIG. 19 to FIG. 21. An R in the type-B service chassis and an R in the type-A service chassis are cross-connected. To be specific, Rs in the type-B service chassis are evenly connected to Ss in all the type-A service chassis. Each type-B service chassis includes m Rs. Each R carries 1/m of internal data exchange tasks of the type-B service chassis. Each R may send data of the local chassis through an inter-chassis interconnection interface. Each R may receive data from another chassis through the inter-chassis interconnection interface. The m Rs in each type-B service chassis are connected to the Ss in the m type-A service chassis in sequence, so that inter-chassis data exchange of the type-B service chassis is completed on the Ss in the type-A service chassis. When a type-B service chassis is added to a system after the type-A service chassis are deployed, the type-B service chassis that is to be added is separately connected to the type-A service chassis. There is no need to change services on both the deployed type-A service chassis and the deployed type-B service chassis, or inter-chassis connections between the deployed type-A service chassis and the deployed type-B service chassis. Therefore, smooth capacity expansion is implemented.

As shown in FIG. 22, an (m+v)-chassis cluster system constructed by the m type-A service chassis and the v type-B service chassis still maintains m cross-connect planes. Composition of each in the m cross-connect planes is shown in Table 3.

TABLE 3

A connection manner of m cross-connect planes constructed by m type-A service chassis and v type-B service chassis

| Cross-connect plane number | Type-A service chassis 1 | Type-A service chassis 2 | Type-A service chassis 3 | ... | Type-A service chassis m − 1 | Type-A service chassis m | Type-B service chassis 1 | Type-B service chassis 2 | ... | Type-B service chassis v |
|---|---|---|---|---|---|---|---|---|---|---|
| 1 | S | R1 | R1 | ... | R1 | R1 | R1 | R1 | ... | R1 |
| 2 | R1 | S | R2 | ... | R2 | R2 | R2 | R2 | ... | R2 |
| 3 | R2 | R2 | S | ... | R3 | R3 | R3 | R3 | ... | R3 |
| ... | ... | ... | ... | ... | ... | ... | ... | ... | ... | ... |
| m − 1 | Rm − 2 | Rm − 2 | Rm − 2 | ... | S | Rm − 1 | Rm − 1 | Rm − 1 | ... | Rm − 1 |
| m | Rm − 1 | Rm − 1 | Rm − 1 | ... | Rm − 1 | S | Rm | Rm | ... | Rm |

It can be learned from Table 2 and Table 3 in the embodiment shown in FIG. 21 that, whether a cluster system includes only the type-A service chassis or includes both the type-A service chassis and the type-B service chassis, a core module of each cross-connect plane in the cluster system is an S in a type-A service chassis. The S carries the inter-chassis data exchange tasks of all service chassis on the cross-connect plane. Therefore, an engineering implementation capability of the S directly affects a construction scale of the cluster system. Table 4 lists performance requirements for Ss and Rs in the cluster system including components of the m type-A service chassis and the v type-B service chassis. As shown in Table 4, a single chassis refers to a chassis, and service performance of a single chassis indicates a value obtained by multiplying performance of a service forwarding module by a quantity of service forwarding modules.

A "fourth-type chassis" is referred to as a "type-D service chassis" for short. A "high-performance switching module" is referred to as an "S" for short. A "low-performance switching module" is referred to as an "R" for short. A "service forwarding module" is referred to as an "X" for short. The type-C service chassis includes an S. The type-D service chassis includes an R.

Figure 24:
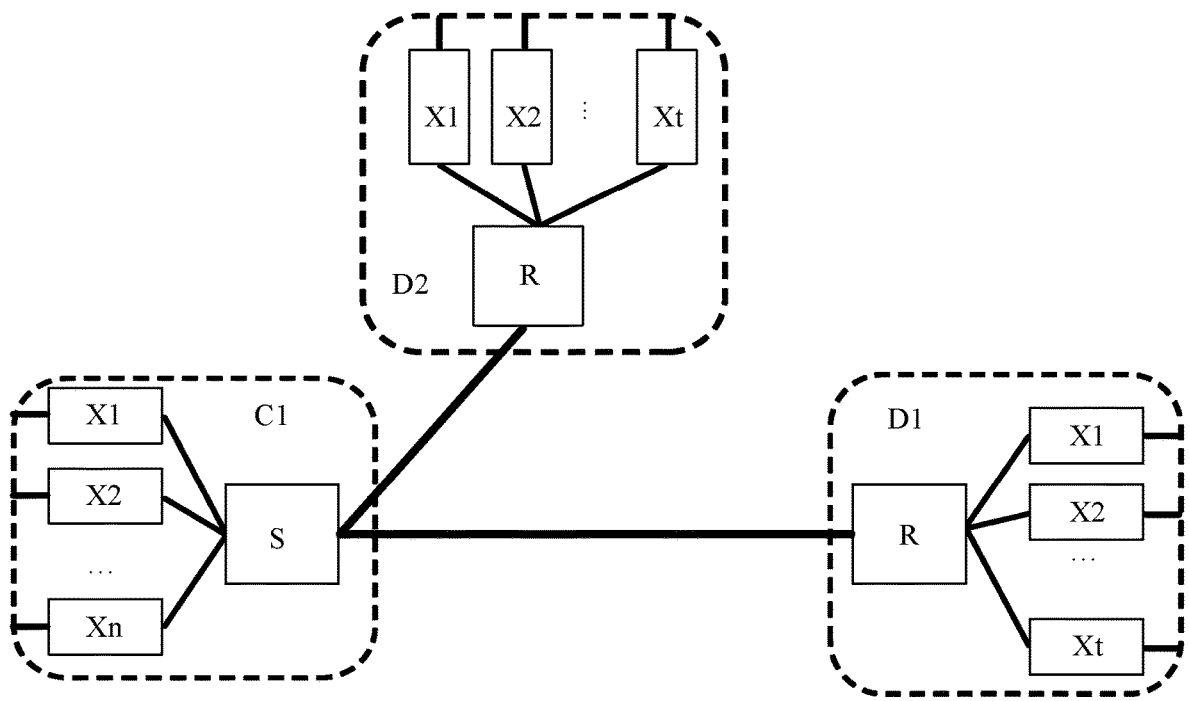
FIG. 24 is a schematic diagram 1 of a structure of another data communications system according to an embodiment of this application.

FIG. 24 is a schematic diagram 1 of a structure of another data communications system according to an embodiment of this application. As shown in FIG. 24, the another data communications system provided in this embodiment of this application includes a first chassis and a second chassis, where the first chassis includes a first high-performance switching module, a first service forwarding module, and a second service forwarding module, and the first service forwarding

TABLE 4

Performance requirements for an S and an R in an (m + v)-chassis cluster system constructed by m type-A service chassis and v type-B service chassis

| Quantity of type-A service chassis | Quantity of type-B service chassis | Quantity of Ss in a type-A service chassis | Quantity of Rs in a type-A service chassis | A performance requirement for an S in a type-A service chassis | A performance requirement for an R in a type-A service chassis | Quantity of Rs in a type-B service chassis | A performance requirement for an R in a type-B service chassis |
|---|---|---|---|---|---|---|---|
| m | v | 1 | m − 1 | (1 + (v/m)) times service performance of a single chassis | (1/m) times service performance of a single chassis | m | (1/m) times service performance of a single chassis |

It can be learned from Table 4 that the performance requirements for the S and the R in the cluster system are related to service performance of a single chassis and a total quantity of chassis.

In addition, the type-A service chassis and the type-B service chassis have the service forwarding modules. Refer to the description of the service forwarding module in the foregoing embodiment. Further, the chassis in the data communications system may communicate with another device outside the data communications system by using the service forwarding module. The type-A service chassis and the type-B service chassis may complete data communication in the data communications system by using the S, the R1, and the like.

According to the data communications system provided in the foregoing embodiment, the data communications system including the m type-A service chassis and the v type-B service chassis is provided. A central switching chassis is removed. When the type-B service chassis is added, only the type-A service chassis and the type-B service chassis are deployed. Therefore, a footprint of the data communications system is reduced. In addition, because the central switching chassis is removed, there is no need to add an auxiliary hardware device, and power consumption and costs are reduced. When the type-B service chassis is added in the system after the type-A service chassis are deployed, only the type-B service chassis that is to be added separately connects to the type-A service chassis. There is no need to change services on both the deployed type-A service chassis and the deployed type-B service chassis, or inter-chassis connections between the deployed type-A service chassis and the deployed type-B service chassis. Therefore, smooth capacity expansion can be implemented.

First, in the embodiments of this application, a "third-type chassis" is referred to as a "type-C service chassis" for short.

module and the second service forwarding module are configured to communicate with a device outside the data communications system;

the second chassis includes a first low-performance switching module;

the first high-performance switching module is connected to the first low-performance switching module;

the first high-performance switching module is configured to send data received from the first service forwarding module to the first low-performance switching module, and send data received from the first low-performance switching module to the second service forwarding module; and the first high-performance switching module is further configured to connect to a second low-performance switching module in a third chassis that is to be added to the communications system. In one embodiment, the first service forwarding module and the second service forwarding module may be a same module.

In one embodiment, the first high-performance switching module is further configured to: after the third chassis is added to the communications system, send data received from the second low-performance switching module to one of the first low-performance switching module, the first service forwarding module, and the second service forwarding module; and after the third chassis is added to the communications system, send data received from the one of the first low-performance switching module, the first service forwarding module, and the second service forwarding module to the second low-performance switching module.

For example, chassis are classified into a third-type chassis and a fourth-type chassis. In other words, the chassis are classified into a type-C service chassis and a type-D service chassis.

Figure 25:
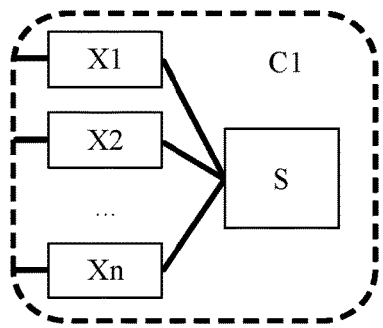
FIG. 25 is a schematic diagram 1 of a structure of a first chassis in another data communications system according to an embodiment of this application.
Figure 26:
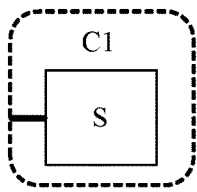
FIG. 26 is a schematic diagram 2 of a structure of a first chassis in another data communications system according to an embodiment of this application.

The data communications system includes the first chassis C1 and the second chassis D1. FIG. 25 is a schematic diagram 1 of a structure of a first chassis in another data communications system according to an embodiment of this application. As shown in FIG. 25, the first chassis C1 includes a first high-performance switching module S. In one embodiment, the first chassis C1 further includes n service forwarding modules Xs, for example, includes an X1, an X2, . . . , and an Xn, where n is a positive integer greater than or equal to 1. For example, the first chassis C1 includes a first service forwarding module X1 and a second service forwarding module X2. As shown in FIG. 25, each X in the C1 is connected to an S in the C1. To be specific, the X1 in the C1 and the X2 in the C1 each are connected to the S in the C1. FIG. 26 is a schematic diagram 2 of a structure of a first chassis in another data communications system according to an embodiment of this application. As shown in FIG. 26, the C1 shown in FIG. 25 may be simplified to obtain the structure shown in FIG. 26.

Figure 27:
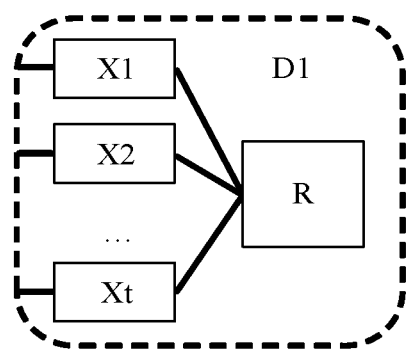
FIG. 27 is a schematic diagram 1 of a structure of a second chassis in another data communications system according to an embodiment of this application.
Figure 28:
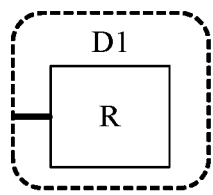
FIG. 28 is a schematic diagram 2 of a structure of a second chassis in another data communications system according to an embodiment of this application.

FIG. 27 is a schematic diagram 1 of a structure of a second chassis in another data communications system according to an embodiment of this application. As shown in FIG. 27, the second chassis D1 includes a first low-performance switching module R. In one embodiment, the second chassis D1 further includes t service forwarding modules Xs, for example, includes an X1, an X2, . . . , and an Xt, where t is a positive integer greater than or equal to 1. As shown in FIG. 27, each X in the D1 is connected to the R in the D1. FIG. 28 is a schematic diagram 2 of a structure of a second chassis in another data communications system according to an embodiment of this application. As shown in FIG. 28, the D1 shown in FIG. 27 may be simplified to obtain the structure shown in FIG. 28.

Figure 29:
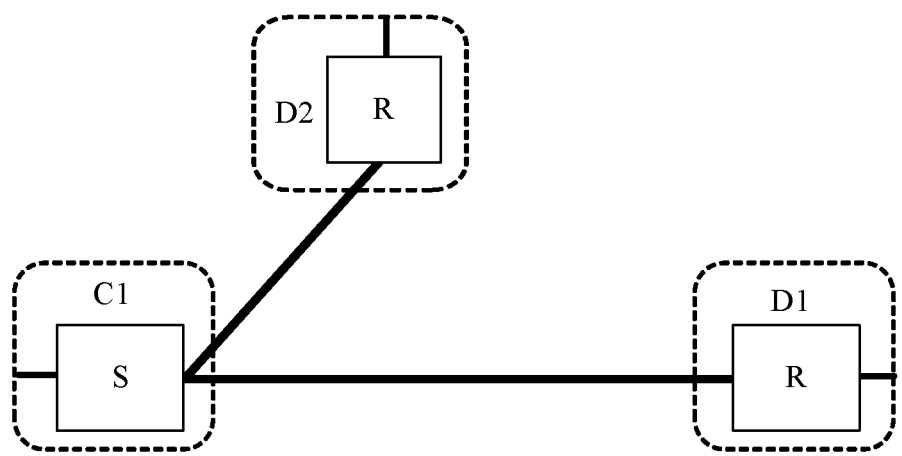
FIG. 29 is a schematic diagram 2 of a structure of another data communications system according to an embodiment of this application.

As shown in FIG. 24, the S in the C1 is connected to the R in the D1 through an inter-chassis interconnection interface. FIG. 29 is a schematic diagram 2 of a structure of another data communications system according to an embodiment of this application. Based on the structures shown in FIG. 26 and FIG. 28, the structure shown in FIG. 24 may be simplified to obtain the structure shown in FIG. 29.

In this case, the data communications system already has the type-C service chassis and the type-D service chassis, which are respectively the C1 and the D1. Then, a third chassis that is to be added to the data communications system is a type-D service chassis D2.

An X in the C1 may communicate with another device outside the data communications system, and further perform data sending and receiving with the another device outside the data communications system. Likewise, an X in the D1 may communicate with the another device outside the data communications system, and further perform the data sending and receiving with the another device outside the data communications system.

The S in the C1 may receive, through an intra-chassis interconnection interface, data sent by the X in the C1, for example, receive the data sent by the X1 in the C1 or the X2 in the C1. Then, the S in the C1 determines whether a destination of the data is the C1 or another chassis. If the S in the C1 determines that the destination of the data is the C1, the S in the C1 sends the data to the X in the C1 through the intra-chassis interconnection interface. If the S in the C1 determines that the destination of the data is the D1, the S in the C1 sends the data to the R in the D1 through the inter-chassis interconnection interface. The S in the C1 may also receive, through the inter-chassis interconnection interface, data sent by the R in the D1. Then, the S in the C1 determines whether a destination of the data is the C1 or another chassis. If the S in the C1 determines that the destination of the data is the C1, the S in the C1 sends the data to the X in the C1 through the intra-chassis interconnection interface, for example, sends to the X1 in the C1 or the X2 in the C1. If the S in the C1 determines that the destination of the data is the another chassis, the S in the C1 may identify a destination chassis, and the S in the C1 sends the data to the destination chassis through an inter-chassis interconnection interface. When there is only the C1 and the D1, if the S in the C1 determines that the destination of the data is the D1, the S in the C1 sends the data to the R in the D1 through the inter-chassis interconnection interface.

When the type-D service chassis is added to the data communications system including the C1 and the D1, for example, when the third chassis D2 is added, the provided D2 includes one R and at least one X, and a structure of the D2 is the same as that of the D1. When the D2 is added, the S in the C1 may be connected to the R in the D2.

The S in the C1 may receive, through the intra-chassis interconnection interface, the data sent by the X in the C1, for example, receive the data sent by the X1 in the C1 or the X2 in the C1. Then, the S in the C1 determines whether the destination of the data is the C1 or the another chassis. If the S in the C1 determines that the destination of the data is the C1, the S in the C1 sends the data to the X in the C1 through the intra-chassis interconnection interface. If the S in the C1 determines that the destination of the data is the another chassis, the S in the C1 may identify the destination chassis, and then the S in the C1 sends the data to the destination chassis through an inter-chassis interconnection interface. For example, if the S in the C1 determines that the destination of the data is the D1, the S in the C1 sends the data to the R in the D1 through the inter-chassis interconnection interface. If the S in the C1 determines that the destination of the data is the D2, the S in the C1 sends the data to the R in the D2 through an inter-chassis interconnection interface. The S in the C1 may also receive, through the inter-chassis interconnection interface, the data sent by the R in the D1. Then, the S in the C1 determines whether the destination of the data is the C1 or the another chassis. If the S in the C1 determines that the destination of the data is the C1, the S in the C1 sends the data to the X in the C1 through the intra-chassis interconnection interface, for example, sends to the X1 in the C1 or the X2 in the C1. If the S in the C1 determines that the destination of the data is the another chassis, the S in the C1 may identify the destination chassis, and the S in the C1 sends the data to the destination chassis through the inter-chassis interconnection interface. In this case, the D2 is added. If the S in the C1 determines that the destination of the data is the D2, the S in the C1 sends the data to the R in the D2 through the inter-chassis interconnection interface. The S in the C1 may also receive, through the inter-chassis interconnection interface, data sent by the R in the D2. Then, the S in the C1 determines whether a destination of the data is the C1 or another chassis. If the S in the C1 determines that the destination of the data is the C1, the S in the C1 sends the data to the X in the C1 through the intra-chassis interconnection interface, for example, sends to the X1 in the C1 or the X2 in the C1. If the S in the C1 determines that the destination of the data is the another chassis, the S in the C1 may identify a destination chassis, and the S in the C1 sends the data to the destination chassis through an inter-chassis interconnection interface. For example, the S in the C1 determines that the destination of the data is the D1, the S in the C1 sends the data to the R in the D1 through the inter-chassis interconnection interface.

Figure 30:
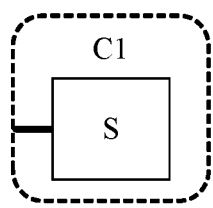
FIG. 30 is a schematic diagram of a structure of a single-chassis system in another data communications system according to an embodiment of this application.
Figure 31:
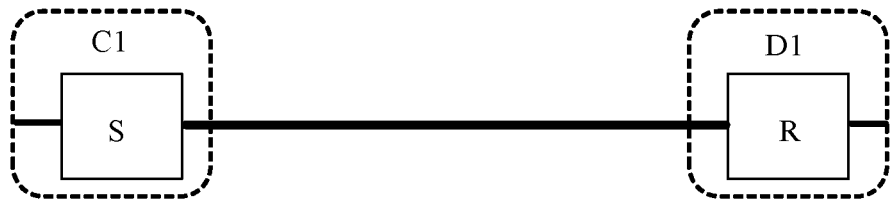
FIG. 31 is a schematic diagram of a structure of a two-chassis back-to-back cluster system in another data communications system according to an embodiment of this application.

During capacity expansion of a multi-chassis cluster data communications device system, FIG. 30 is a schematic diagram of a structure of a single-chassis system in another data communications system according to an embodiment of this application. As shown in FIG. 30, the single-chassis system includes only one type-C service chassis C1. The C1 includes one S. Then, first capacity expansion is performed. FIG. 31 is a schematic diagram of a structure of a two-chassis back-to-back cluster system in another data communications system according to an embodiment of this application. As shown in FIG. 31, the two-chassis back-to-back cluster system includes one type-C service chassis C1 and one type-D service chassis D1. The C1 includes one S, and the D1 includes one R. The S in the C1 is connected to the R in the D1. Because there is only one C1 in FIG. 30 and the C1 is not connected to another chassis, when the single-chassis system shown in FIG. 30 is expanded to the two-chassis back-to-back cluster system shown in FIG. 31, namely, when the D1 is added, the D1 is connected to the C1 through new cables. Existing cables are not adjusted. Therefore, the capacity expansion process does not affect a service deployed on the type-C service chassis C1, and the system shown in FIG. 30 is smoothly expanded to the system shown in FIG. 31.

Figure 32:
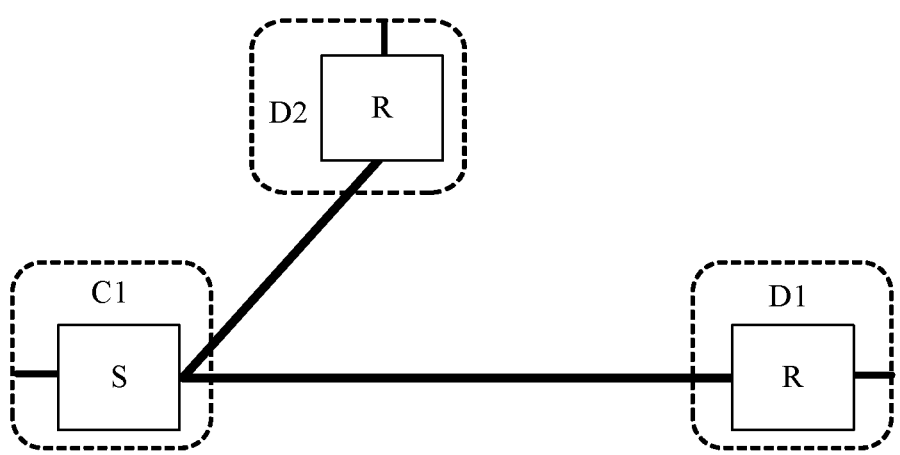
FIG. 32 is a schematic diagram of a structure of a three-chassis cluster system in another data communications system according to an embodiment of this application.

Then, second capacity expansion is performed. FIG. 32 is a schematic diagram of a structure of a three-chassis cluster system in another data communications system according to an embodiment of this application. As shown in FIG. 32, a type-D service chassis D2 is added to the system shown in FIG. 31. The C1 is connected to the D2 through a new cable. Existing cables are not adjusted. Therefore, the capacity expansion process does not affect services deployed on both the type-C service chassis C1 and the type-D service chassis D1, or an inter-chassis connection deployed between the C1 and the D1, and the system shown in FIG. 31 is smoothly expanded to the system shown in FIG. 32.

Figure 33:
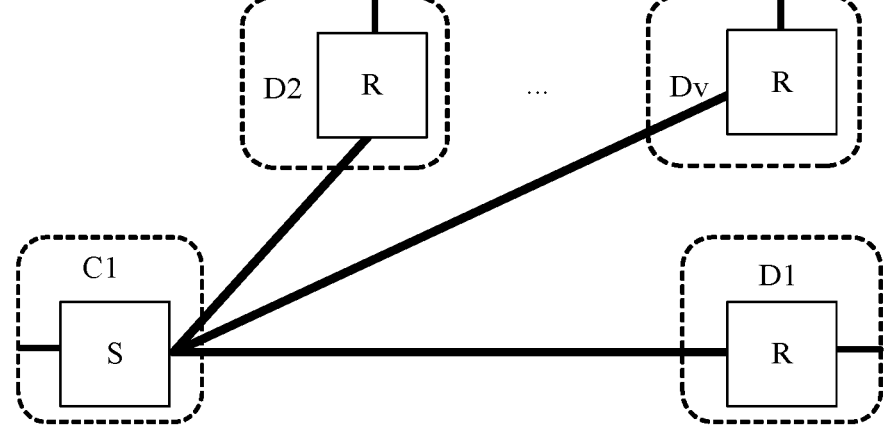
FIG. 33 is a schematic diagram of a structure of a multi-chassis cluster system in another data communications system according to an embodiment of this application.

When the capacity expansion continues, the rest may be deduced by analogy. FIG. 33 is a schematic diagram of a structure of a multi-chassis cluster system in another data communications system according to an embodiment of this application. When a $v^{th}$ type-D service chassis is added, an R in the Dv is connected to the S in the C1 through a new cable, where v is a positive integer greater than or equal to 1. It can be learned that, when new type-D service chassis are continuously added, the type-D service chassis that are to be added are connected to C1 through new cables. Existing cables are not adjusted. Therefore, each time one type-D service chassis adding has no effect on the deployed service chassis and inter-chassis connections, and the capacity expansion does not affect services on both the deployed type-C service chassis and the deployed type-D service chassis, or inter-chassis connections between the type-C service chassis and the deployed type-D service chassis. This implements smooth capacity expansion.

It can be learned that, in the foregoing capacity expansion process, because each type-D service chassis is connected only to the type-C service chassis, and there is no direct connection between the type-D service chassis, after the type-C service chassis and the S in the type-C service chassis are deployed, a type-D service chassis is re-added. The service on the deployed type-C service chassis and the service on the deployed type-D service chassis are not affected. The inter-chassis interconnection between the deployed type-C service chassis and the deployed type-D service chassis is not affected. Therefore, the smooth capacity expansion can be implemented chassis by chassis.

The multi-chassis cluster system shown in FIG. 33 has one type-C service chassis and v type-D service chassis. Then, one (1+v)-chassis cluster system may be constructed by the type-C service chassis and the v type-D service chassis. The (1+v)-chassis cluster system has only one cross-connect plane logically. Composition of the cross-connect plane is shown in Table 5.

TABLE 5

| Cross-connect plane number | Type-C service chassis 1 | Type-D service chassis 1 | Type-D service chassis 2 | ... | Type-D service chassis v |
|---|---|---|---|---|---|
| A connection manner of a cross-connect plane in a (1 + v)-chassis cluster system | | | | | |
| 1 | S | R | R | ... | R |

It can be learned from Table 5 that a core of the (1+v)-chassis cluster system is still the S in the type-C service chassis. The S carries inter-chassis data exchange tasks of all service chassis. Therefore, an engineering implementation capability of the S directly affects a construction scale of the cluster system. Table 6 lists performance requirements for an S and an R in the (1+v)-chassis cluster system.

TABLE 6

| Quantity of type-C service chassis | Quantity of type-D service chassis | Quantity of Ss in a type-C service chassis | Quantity of Rs in a type-C service chassis | A performance requirement for an S in a type-C service chassis | Quantity of Rs in a type-D service chassis | A performance requirement for an R in a type-D service chassis |
|---|---|---|---|---|---|---|
| Performance requirements for an S and an R in a (1 + v)-chassis cluster system | | | | | | |
| 1 | v | 1 | 0 | (1 + v) times service performance of a single chassis | 1 | One time service performance of a single chassis |

It can be learned from Table 6 that service performance of a single chassis in the (1+v)-chassis cluster system is related to a total quantity of chassis. As a cluster scale increases, a performance requirement for an S in the type-C service chassis is increasing. Table 7 lists performance requirements for an S and an R in the (1+v)-chassis cluster system with different values of v. In Table 6 and Table 7, a single chassis refers to a chassis.

TABLE 7

Performance requirements for an S and an R in a (1 + v)-chassis cluster system with different values of v

| Quantity of type-C service chassis | Quantity of type-D service chassis | Quantity of Ss in a type-C service chassis | Quantity of Rs in a type-C service chassis | A performance requirement for an S in a type-C service chassis | Quantity of Rs in a type-D service chassis | A performance requirement for an R in a type-D service chassis |
|---|---|---|---|---|---|---|
| m | v | 1 | 0 | (1 + v) times performance of a single chassis | m | One time performance of a single chassis |
| 1 | 0 | 1 | 0 | 1 | — | — |
| 1 | 1 | 1 | 0 | 2 | 1 | 1 |
| 1 | 2 | 1 | 0 | 3 | 1 | 1 |
| 1 | 3 | 1 | 0 | 4 | 1 | 1 |
| 1 | 4 | 1 | 0 | 5 | 1 | 1 |
| ... | ... | ... | ... | ... | ... | ... |

According to the data communications system provided in the foregoing embodiment, the data communications system including the type-C service chassis and the v type-D service chassis is provided. A central switching chassis is removed. When the type-D service chassis is added, only the type-C service chassis and the type-D service chassis are deployed. Therefore, a footprint of the data communications system is reduced. In addition, because the central switching chassis is removed, there is no need to add an auxiliary hardware device, and power consumption and costs are reduced. When the type-D service chassis is added in the system when the type-C service chassis is deployed, only the type-D service chassis that is to be added connects to the type-C service chassis. There is no need to change services on both the deployed type-C service chassis and the deployed type-D service chassis, or inter-chassis connections between the deployed type-C service chassis and the deployed type-D service chassis. Therefore, the smooth capacity expansion can be implemented.

Figure 34:
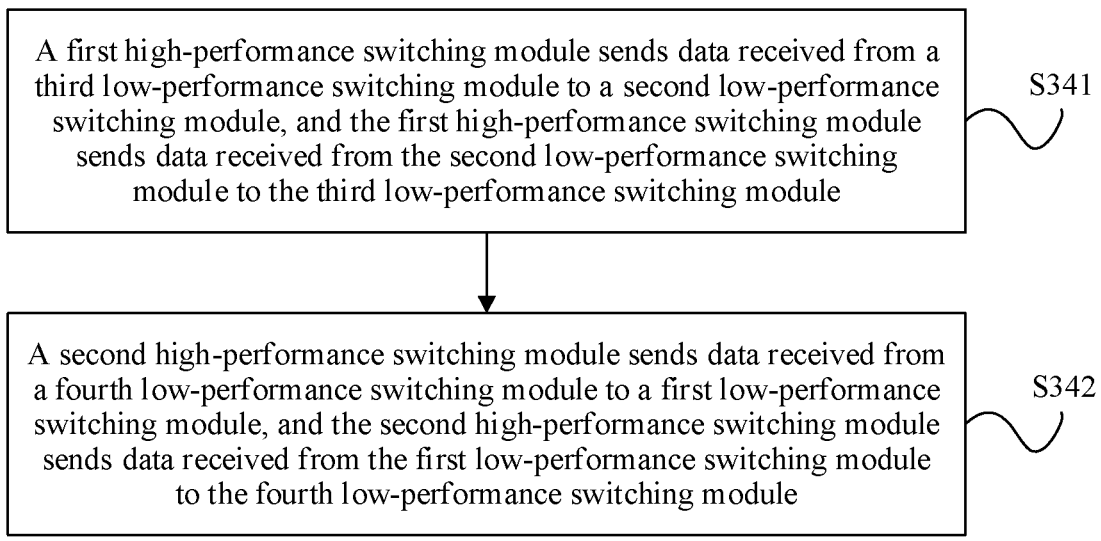
FIG. 34 shows a data communications method applied to a data communications system according to an embodiment of this application.

FIG. 34 shows a data communications method applied to a data communications system according to an embodiment of this application. The data communications system includes a first chassis and a second chassis. The first chassis includes a first high-performance switching module and a first low-performance switching module. The second chassis includes a second high-performance switching module and a second low-performance switching module. The first high-performance switching module is connected to the second low-performance switching module. The first low-performance switching module is connected to the second high-performance switching module. The first high-performance switching module is configured to connect to a third low-performance switching module in a third chassis that is to be added to the communications system. The second high-performance switching module is configured to connect to a fourth low-performance switching module in the third chassis that is to be added to the communications system. As shown in FIG. 34, the method provided in this embodiment of this application includes:

Operation S341: The first high-performance switching module sends data received from the third low-performance switching module to the second low-performance switching module, and the first high-performance switching module sends data received from the second low-performance switching module to the third low-performance switching module.

Operation S342: The second high-performance switching module sends data received from the fourth low-performance switching module to the first low-performance switching module, and the second high-performance switching module sends data received from the first low-performance switching module to the fourth low-performance switching module.

An execution sequence of the operation S341 and the operation S342 is not limited.

In one embodiment, the first chassis further includes a first service forwarding module and a second service forwarding module. The first service forwarding module and the second service forwarding module are configured to communicate with a device outside the data communications system. The method provided in this embodiment further includes the following operations:

Operation 343: The first low-performance switching module sends data received from the first service forwarding module to the second high-performance switching module.

Operation S344: The first low-performance switching module sends data received from the second high-performance switching module to the second service forwarding module.

The first chassis further includes a third service forwarding module and a fourth service forwarding module. The third service forwarding module and the fourth service forwarding module are configured to communicate with the device outside the data communications system. The method provided in this embodiment further includes the following operations:

Operation 345: The first high-performance switching module sends data received from the third service forwarding module to the second low-performance switching module.

Operation S346: The second low-performance switching module sends data received from the second high-performance switching module to the fourth service forwarding module.

An execution sequence of the foregoing operations is not limited.

For example, for principles of modules in this embodiment, and a method principle of this embodiment, refer to descriptions of the embodiments shown in FIG. 7 and FIG. 8.

Figure 35:
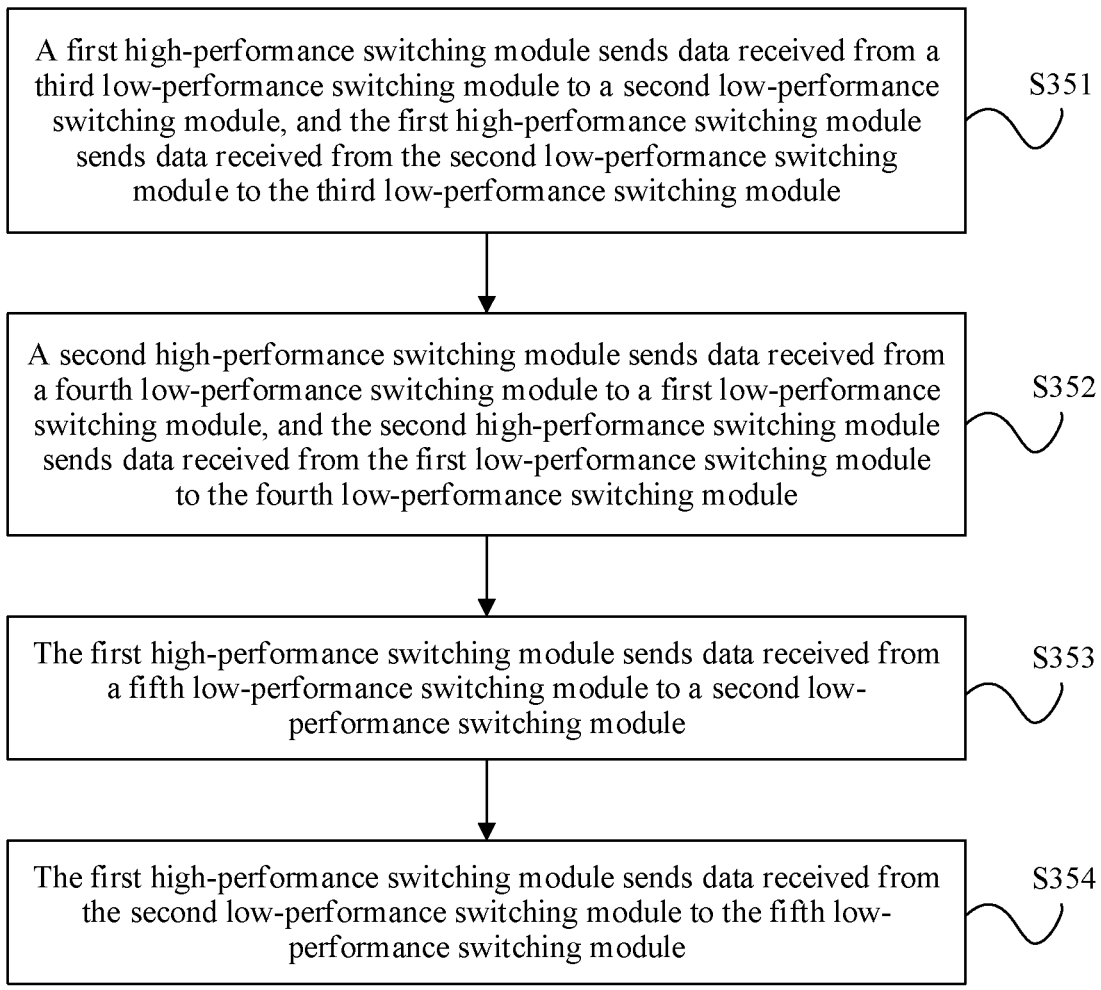
FIG. 35 shows another data communications method applied to a data communications system according to an embodiment of this application.

FIG. 35 shows another data communications method applied to a data communications system according to an embodiment of this application. The data communications system includes a first chassis and a second chassis. The first chassis includes a first high-performance switching module and a first low-performance switching module. The second chassis includes a second high-performance switching module and a second low-performance switching module. The first high-performance switching module is connected to the second low-performance switching module. The first low-performance switching module is connected to the second high-performance switching module. The first high-performance switching module is configured to connect to a third low-performance switching module in a third chassis that is to be added to the communications system. The second high-performance switching module is configured to connect to a fourth low-performance switching module in the third chassis that is to be added to the communications system. The data communications system further includes a fourth chassis. The fourth chassis includes a fifth low-performance switching module and a sixth low-performance switching module. The first high-performance switching module is connected to the fifth low-performance switching module. The second high-performance switching module is connected to the sixth low-performance switching module. As shown in FIG. 35, the method provided in this embodiment of this application includes:

Operation S351: The first high-performance switching module sends data received from the third low-performance switching module to the second low-performance switching module, and the first high-performance switching module sends data received from the second low-performance switching module to the third low-performance switching module.

Operation S352: The second high-performance switching module sends data received from the fourth low-performance switching module to the first low-performance switching module, and the second high-performance switching module sends data received from the first low-performance switching module to the fourth low-performance switching module.

Operation 353: The first high-performance switching module sends data received from the fifth low-performance switching module to the second low-performance switching module.

Operation 354: The first high-performance switching module sends data received from the second low-performance switching module to the fifth low-performance switching module.

An execution sequence of the operation S351, the operation S352, the operation S353, and the operation S354 is not limited.

For example, for principles of modules in this embodiment, and a method principle of this embodiment, refer to descriptions of the embodiments shown in FIG. 9 to FIG. 18.

In one embodiment, based on the embodiment shown in FIG. 34, the data communications system further includes a fifth chassis, the fifth chassis includes a third high-performance switching module, a seventh low-performance switching module, and an eighth low-performance switching module, the first chassis further includes a ninth low-performance switching module, and the second chassis further includes a tenth low-performance switching module, the third high-performance switching module is connected to the ninth low-performance switching module and the tenth low-performance switching module, the first high-performance switching module is connected to the seventh low-performance switching module, and the second high-performance switching module is connected to the eighth low-performance switching module, and the third high-performance switching module is configured to connect to an eleventh low-performance switching module in the third chassis that is to be added to the communications system, and the method provided in this embodiment of this application further includes:

Operation S361: The third high-performance switching module sends data received from the eleventh low-performance switching module to one of the ninth low-performance switching module and the tenth low-performance switching module, and sends data received from the one of the ninth low-performance switching module and the tenth low-performance switching module to the eleventh low-performance switching module.

Operation 362: The first high-performance switching module sends data received from the second low-performance switching module to the seventh low-performance switching module.

Operation 363: The first high-performance switching module sends data received from the seventh low-performance switching module to the second low-performance switching module.

Operation 364: The first high-performance switching module sends data received from the third low-performance switching module to one of the second low-performance switching module and the seventh low-performance switching module.

Operation 365: The first high-performance switching module sends data received from the one of the second low-performance switching module and the seventh low-performance switching module to the third low-performance switching module.

An execution sequence of the foregoing operations is not limited.

In one embodiment, the data communications system further includes a sixth chassis. The sixth chassis includes a twelfth low-performance switching module, a thirteenth low-performance switching module, and a fourteenth low-performance switching module. The twelfth low-performance switching module is connected to the first high-performance switching module. The thirteenth low-performance switching module is connected to the second high-performance switching module. The fourteenth low-performance switching module is connected to the third high-performance switching module. The method provided in this embodiment of this application further includes:

Operation 366: The first high-performance switching module sends data received from the twelfth low-performance switching module to one of the second low-performance switching module and the seventh low-performance switching module.

Operation 367: The first high-performance switching module sends data received from the one of the second low-performance switching module and the seventh low-performance switching module to the twelfth low-performance switching module.

An execution sequence of the foregoing operations is not limited.

For example, for principles of modules in this embodiment, and a method principle of this embodiment, refer to descriptions of the embodiments shown in FIG. 19 to FIG. 23.

Figure 36:
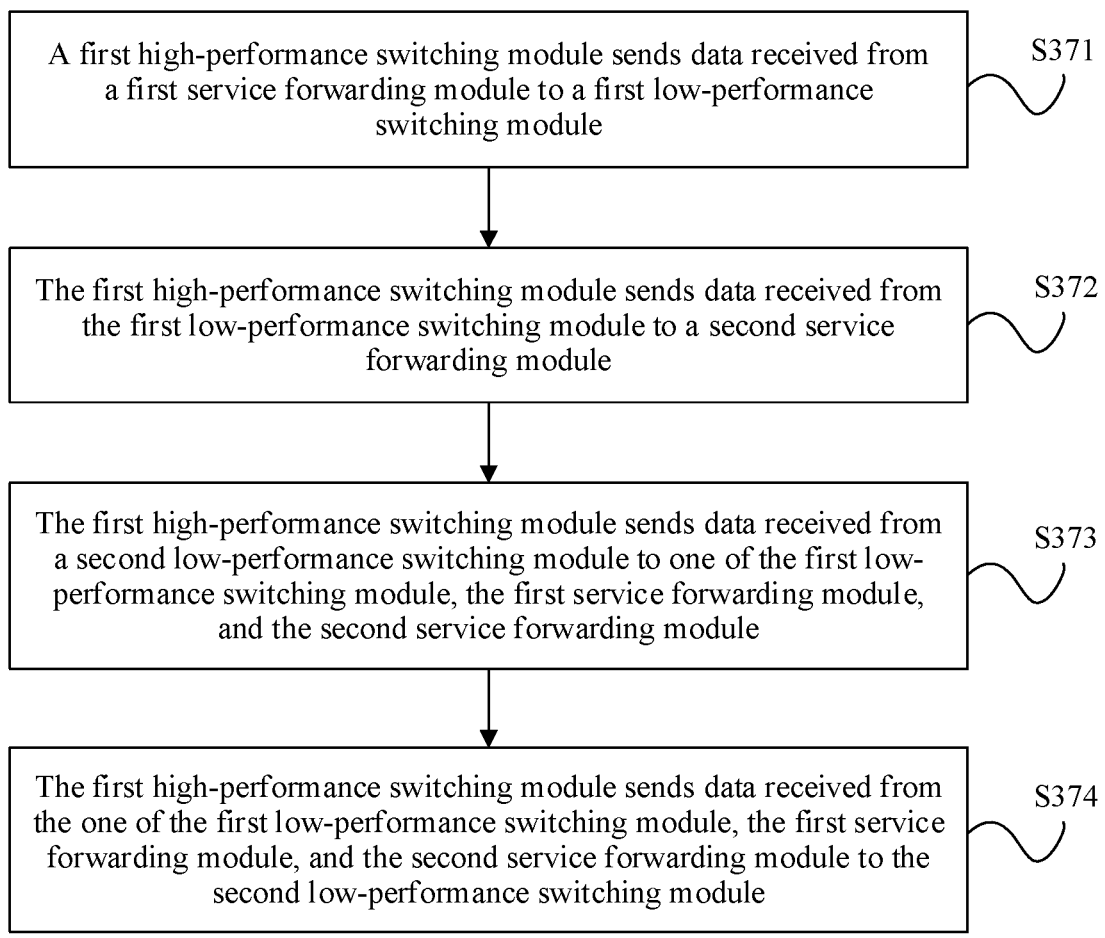
FIG. 36 shows another data communications method applied to a data communications system according to an embodiment of this application.

FIG. 36 shows another data communications method applied to a data communications system according to an embodiment of this application. The data communications system includes a first chassis and a second chassis. The first chassis includes a first high-performance switching module, a first service forwarding module, and a second service forwarding module. The first service forwarding module and the second service forwarding module are configured to communicate with a device outside the data communications system. The second chassis includes a first low-performance switching module. The first high-performance switching module is connected to the first low-performance switching module. The first high-performance switching module is configured to connect to a second low-performance switching module in a third chassis that is to be added to the communications system. The method provided in this embodiment includes:

Operation 371: The first high-performance switching module sends data received from the first service forwarding module to the first low-performance switching module.

Operation S372: The first high-performance switching module sends data received from the first low-performance switching module to the second service forwarding module.

Operation S373: The first high-performance switching module sends data received from the second low-performance switching module to one of the first low-performance switching module, the first service forwarding module, and the second service forwarding module.

Operation S374: The first high-performance switching module sends data received from the one of the first low-performance switching module, the first service forwarding module, and the second service forwarding module to the second low-performance switching module.

An execution sequence of the operation S371 to the operation S374 is not limited.

For example, for principles of modules in this embodiment, and a method principle of this embodiment, refer to descriptions of the embodiments shown in FIG. 24 to FIG. 33.

It should be noted that a module S, a module R, and a module X in this application are merely logical abstract concepts. In an engineering implementation, the foregoing modules may be subdivided, integrated, or cross-integrated with reference to design requirements such as engineering implementability, and system reliability. For example, one module S may be constructed by using one integrated circuit chip or circuit module, or one module S may be jointly constructed by using a plurality of integrated circuit chips or circuit modules. One module R may be constructed by using one integrated circuit chip or circuit module, or one module R may be jointly constructed by using a plurality of integrated circuit chips or circuit modules. One module X may be constructed by using one integrated circuit chip or circuit module, or one module X may be jointly constructed by using a plurality of integrated circuit chips or circuit modules. For example, one or more modules S and/or one or more modules R are integrated into one integrated circuit chip or one circuit module. For example, the module S uses a plurality of switching integrated circuit chips or circuit modules, and the module R uses one switching integrated circuit chip or circuit module. For example, one or more modules S, one or more modules R, and/or one or more modules X are integrated into one integrated circuit chip or one circuit module. For example, the module S or the module R uses a switching integrated circuit chip that has a plurality of serializer/deserializer (serializer/deserializer, serdes) data channels, so that a to-be-switched data cell, cell header-based information, and the like that meet a format requirement and that are input by any serdes data channel, are switched to the any serdes data channel for output.

In this application, a switching destination is determined, for example, based on a cell header. The cell header includes, for example, a destination identifier used to uniquely identify a destination module. The destination identifier includes, for example, a chassis number, a slot number, and a service forwarding module number.

The inter-chassis interconnection interface and the intra-chassis interconnection interface in this application include but are not limited to a printed circuit board (printed circuit board, PCB) interface, a cable interface, an optical cable interface, a wireless interface, and the like. A connection medium used in the inter-chassis interconnection interface and the intra-chassis interconnection interface includes but is not limited to a PCB, a cable, an optical cable, or the inter-chassis interconnection interface and the intra-chassis interconnection interface are directly in a wireless connection, or the like.

In this application, the S in the first-type chassis is designed, based on a preset solution, to reserve for a quantity of interfaces used to gain access to the R in the second-type chassis. The preset solution includes a maximum quantity of second-type chassis that can gain access to the communications system. The preset solution may be set based on a cluster system scale, a network interconnection requirement, a performance requirement, and the like.

Figure 37:
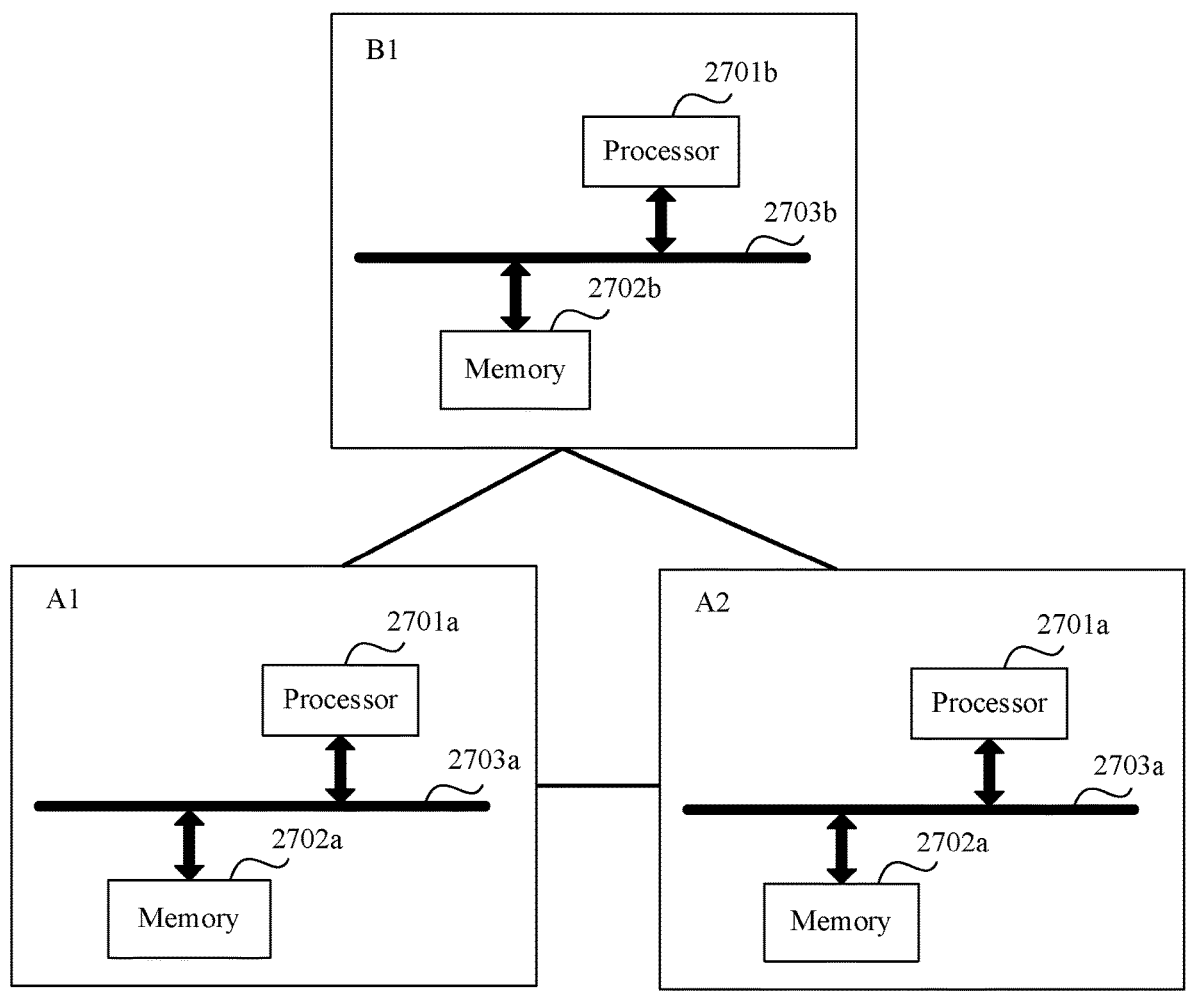
FIG. 37 is a schematic diagram of a structure of a multi-chassis cluster system in yet another data communications system according to an embodiment of this application.

FIG. 37 is a schematic diagram of a structure of a multi-chassis cluster system in yet another data communications system according to an embodiment of this application. As shown in FIG. 37, the data communications system provided in this embodiment of this application may be configured to perform actions or operations of the data communications system in the embodiments shown in FIG. 7 and FIG. 8, may be configured to perform actions or operations of the data communications system in the embodiments shown in FIG. 9 to FIG. 18, may be configured to perform actions or operations of the data communications system of the device in the embodiments shown in FIG. 19 to FIG. 20, and may be configured to perform actions or operations of the data communications system of the device in the embodiments shown in FIG. 21 to FIG. 23. The data communications system provided in this embodiment of this application includes a first chassis A1 and a second chassis A2, and further provides a third chassis B1 that is to be added to the data communications system.

For each first chassis, each first chassis specifically includes a processor 2701*a* and a memory 2702*a*.

The memory 2702*a* is configured to store a computer program.

The processor 2701*a* is configured to execute the computer program stored in the memory 2702*a*, to perform actions of the modules in the type-A service chassis in the embodiments shown in FIG. 7 to FIG. 23, or perform actions or operations of the type-A service chassis in the embodiments shown in FIG. 34 to FIG. 35. Details are not described again.

In one embodiment, the first chassis may further include a bus 2703*a*. The processor 2701*a* and the memory 2702*a* may be connected to each other through the bus 2703*a*. The bus 2703*a* may be a peripheral component interconnect (peripheral component interconnect, PCI) bus, an extended industry standard structure (extended industry standard architecture, EISA) bus, or the like. The bus 2703*a* may be classified into an address bus, a data bus, a control bus, and the like. For ease of representation, only one thick line is used to represent the bus in FIG. 37, but this does not mean that there is only one bus or only one type of bus.

For each second chassis, each second chassis specifically includes a processor 2701*b* and a memory 2702*b*.

The memory 2702b is configured to store a computer program.

The processor 2701b is configured to execute the computer program stored in the memory 2702b, to perform actions of the modules in the type-B service chassis in the embodiments shown in FIG. 7 to FIG. 23, or perform actions or operations of the type-B service chassis in the embodiments shown in FIG. 34 to FIG. 35. Details are not described again.

In one embodiment, the second chassis may further include a bus 2703b. The processor 2701b and the memory 2702b may be connected to each other through the bus 2703b. The bus 2703b may be a PCI bus, an EISA bus, or the like. The bus 2703b may be classified into an address bus, a data bus, a control bus, and the like. For ease of representation, only one thick line is used to represent the bus in FIG. 37, but this does not mean that there is only one bus or only one type of bus.

In the embodiments of this application, reference may be made to each other for the foregoing embodiments. Same or similar operations and nouns are not described one by one again.

Some or all of the foregoing modules may alternatively be implemented in a form of an integrated circuit that is embedded in a chip of an SMF entity. In addition, the modules may be separately implemented, or may be integrated together. In other words, the modules may be configured as one or more integrated circuits for implementing the foregoing method, for example, one or more application-specific integrated circuits (ASIC), one or more microprocessors, such as digital signal processor (DSP), or one or more field programmable gate arrays (FPGA).

Figure 38:
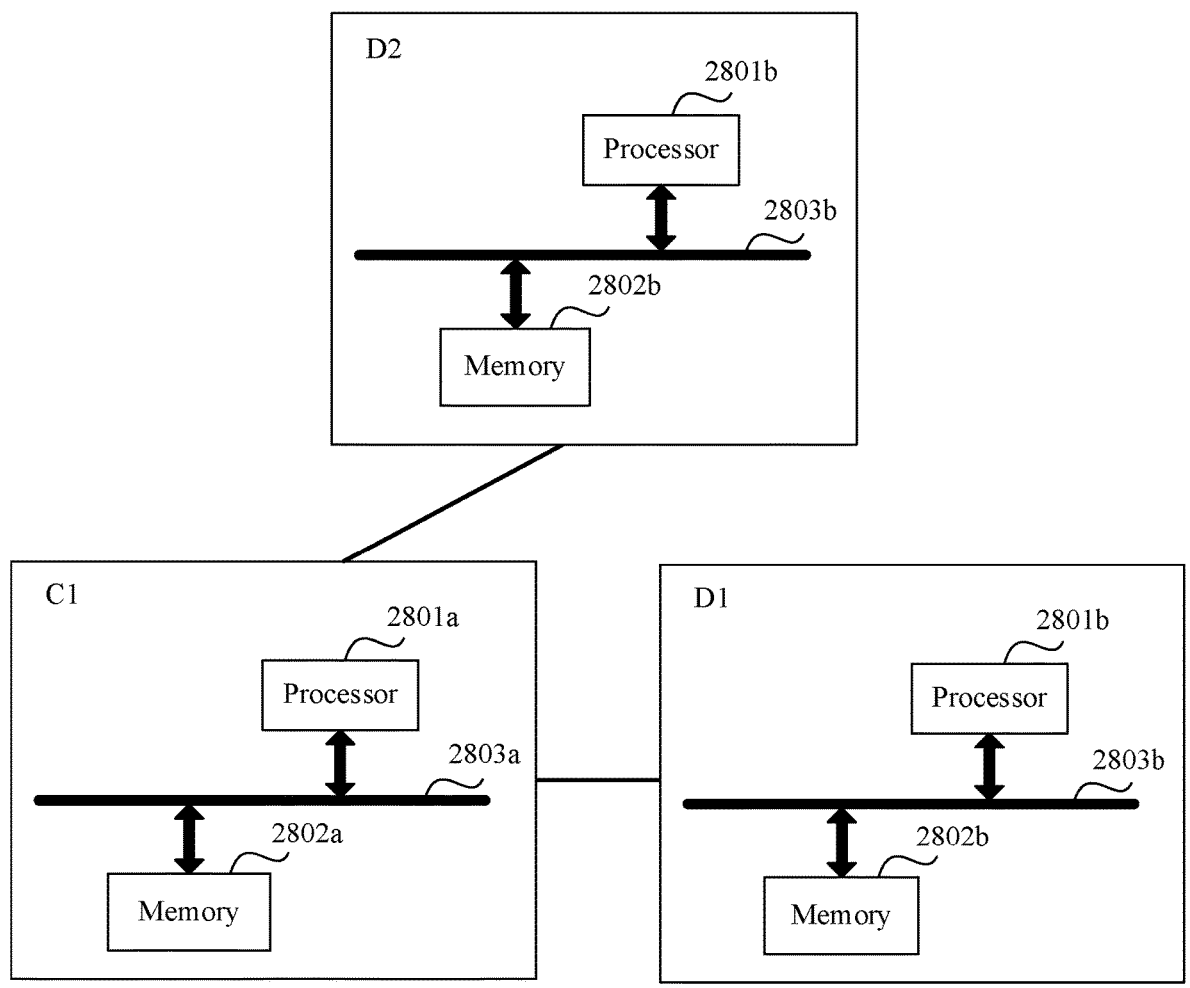
FIG. 38 is a schematic diagram of a structure of a multi-chassis cluster system in still another data communications system according to an embodiment of this application.

FIG. 38 is a schematic diagram of a structure of a multi-chassis cluster system in still another data communications system according to an embodiment of this application. As shown in FIG. 38, the data communications system provided in this embodiment of this application may be configured to perform actions or operations of the data communications system in the embodiments shown in FIG. 24 to FIG. 33. The data communications system provided in this embodiment of this application includes a first chassis C1 and a second chassis D1, and further provides a third chassis D2 that is to be added to the data communications system.

The first chassis C1 is a type-C service chassis, and the second chassis D1 and the third chassis D2 are both type-D service chassis.

For each type-C service chassis, each type-C service chassis specifically includes a processor 2801a and a memory 2802a.

The memory 2802a is configured to store a computer program.

The processor 2801a is configured to execute the computer program stored in the memory 2802a, to perform actions of the modules in the type-C service chassis in the embodiments shown in FIG. 24 to FIG. 33, or perform actions or operations of the type-C service chassis in the embodiment shown in FIG. 36. Details are not described again.

In one embodiment, the type-C service chassis may further include a bus 2803a. The processor 2801a and the memory 2802a may be connected to each other through the bus 2803a. The bus 2803a may be a PCI bus, an EISA bus, or the like. The bus 2803a may be classified into an address bus, a data bus, a control bus, and the like. For ease of representation, only one thick line is used to represent the bus in FIG. 38, but this does not mean that there is only one bus or only one type of bus.

For each type-D service chassis, each type-D service chassis specifically includes a processor 2801b and a memory 2802b.

The memory 2802b is configured to store a computer program.

The processor 2801b is configured to execute the computer program stored in the memory 2802b, to perform actions of the modules in the type-D service chassis in the embodiments shown in FIG. 24 to FIG. 33, or perform actions or operations of the type-D service chassis in the embodiment shown in FIG. 36. Details are not described again.

In one embodiment, the type-D service chassis may include a bus 2803b. The processor 2801b and the memory 2802b may be connected to each other through the bus 2803b. The bus 2803b may be a PCI bus, an EISA bus, or the like. The bus 2803b may be classified into an address bus, a data bus, a control bus, and the like. For ease of representation, only one thick line is used to represent the bus in FIG. 38, but this does not mean that there is only one bus or only one type of bus.

In the embodiments of this application, reference may be made to each other for the foregoing embodiments. Same or similar operations and nouns are not described one by one again.

Some or all of the foregoing modules may alternatively be implemented in a form of an integrated circuit that is embedded in a chip of a terminal device. In addition, the modules may be separately implemented, or may be integrated together. In other words, the modules may be configured as one or more integrated circuits for implementing the foregoing method, for example, one or more ASICs, one or more DSPs, or one or more FPGAs.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person skilled in the art should be aware that in the foregoing one or more examples, functions described in the embodiments of this application may be implemented by hardware, software, firmware, or any combination thereof. When the embodiments of this application is implemented by software, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

What is claimed is:

1. A data communications system, comprising a multi-chassis cluster data communications system, the multi-chassis cluster data communications system comprising:
a first chassis comprising a first high-performance switching module and a first low-performance switching module, wherein the first high-performance switching module has a higher performance requirement than the first low-performance switching module; and
a second chassis comprising a second high-performance switching module and a second low-performance switching module, wherein the second high-performance switching module has a higher performance requirement than the second low-performance switching module, wherein the first high-performance module and the second high-performance module are to be connected to one or more low-performance modules, wherein the first low-performance module and the second low-performance module are to be connected to only one high-performance module, wherein the first high-performance switching module is connected to the second low-performance switching module, wherein the first low-performance switching module is connected to the second high-performance switching module, wherein the first high-performance switching module is configured to connect to a third low-performance switching module in a third chassis that is to be added to the multi-chassis cluster data communications system, and wherein the second high-performance switching module is configured to connect to a fourth low-performance switching module in the third chassis that is to be added to the multi-chassis cluster data communications system, wherein the multi-chassis cluster data communications system doesn't include a central switching chassis such that a footprint of the multi-chassis cluster data communications system is reduced, and wherein the third chassis is to be separately connected to the first chassis and the second chassis to facilitate a capacity expansion of the multi-chassis cluster data communications system.

2. The data communications system according to claim 1, wherein the multi-chassis cluster data communications system further comprises a fourth chassis, wherein the fourth chassis comprises a fifth low-performance switching module and a sixth low-performance switching module,
wherein the first high-performance switching module is connected to the fifth low-performance switching module, and wherein the second high-performance switching module is connected to the sixth low-performance switching module.

3. The data communications system according to claim 2, wherein the first high-performance switching module is configured to:
send data received from the fifth low-performance switching module to the second low-performance switching module; and
send data received from the second low-performance switching module to the fifth low-performance switching module.

4. The data communications system according to claim 1, wherein the multi-chassis cluster data communications system further comprises a fifth chassis, wherein the fifth chassis comprises a third high-performance switching module, a seventh low-performance switching module and an eighth low-performance switching module, wherein the first chassis further comprises a ninth low-performance switching module, wherein the second chassis further comprises a tenth low-performance switching module,
wherein the third high-performance switching module is connected to the ninth low-performance switching module and the tenth low-performance switching module, wherein the first high-performance switching module is connected to the seventh low-performance switching module, wherein the second high-performance switching module is connected to the eighth low-performance switching module, and
wherein the third high-performance switching module is configured to connect to an eleventh low-performance switching module in the third chassis that is to be added to the multi-chassis cluster data communications system.

5. The data communications system according to claim 4, wherein the multi-chassis cluster data communications system further comprises a sixth chassis, and wherein the sixth chassis comprises a twelfth low-performance switching module, a thirteenth low-performance switching module and a fourteenth low-performance switching module, and
wherein the twelfth low-performance switching module is connected to the first high-performance switching module, the thirteenth low-performance switching module is connected to the second high-performance switching module, and the fourteenth low-performance switching module is connected to the third high-performance switching module.

6. The data communications system according to claim 4, wherein the first high-performance switching module is configured to:
send data received from the second low-performance switching module to the seventh low-performance switching module;
send data received from the seventh low-performance switching module to the second low-performance switching module;
after the third chassis is added to the multi-chassis cluster data communications system, send data received from the third low-performance switching module to one of the second low-performance switching module and the seventh low-performance switching module; and
after the third chassis is added to the multi-chassis cluster data communications system, send data received from the one of the second low-performance switching module and the seventh low-performance switching module to the third low-performance switching module.

7. The data communications system according to claim 1, wherein the first chassis further comprises a first service forwarding module and a second service forwarding module, wherein the first service forwarding module and the second service forwarding module are configured to communicate with a device outside the multi-chassis cluster data communications system, and wherein the first low-performance switching module is configured to:

send data received from the first service forwarding module to the second high-performance switching module; and send data received from the second high-performance switching module to the second service forwarding module.

8. The data communications system according to claim 1, wherein the first chassis further comprises a third service forwarding module and a fourth service forwarding module, wherein the third service forwarding module and the fourth service forwarding module are configured to communicate with a device outside the multi-chassis cluster data communications system, and wherein the first high-performance switching module is configured to:

send data received from the third service forwarding module to the second low-performance switching module; and send data received from the second low-performance switching module to the fourth service forwarding module.

9. The data communications system according to claim 1, wherein the first high-performance switching module is configured to:

after the third chassis is added to the multi-chassis cluster data communications system, send data received from the third low-performance switching module to the second low-performance switching module; and after the third chassis is added to the multi-chassis cluster data communications system, send data received from the second low-performance switching module to the third low-performance switching module.

10. A data communications system, comprising a multi-chassis cluster data communications system, the multi-chassis cluster data communications system comprising:

a first chassis comprising a first high-performance switching module, a first service forwarding module and a second service forwarding module, wherein the first service forwarding module and the second service forwarding module are configured to communicate with a device outside the multi-chassis cluster data communications system; and a second chassis comprising a first low-performance switching module, wherein the first high-performance switching module is connected to the first low-performance switching module, wherein the first high-performance switching module has a higher performance requirement than the first low-performance switching module, wherein the first high-performance module is to be connected to one or more low-performance modules, wherein the first low-performance module is to be connected to only one high-performance module, wherein the first high-performance switching module is configured to send data received from the first service forwarding module to the first low-performance switching module, and send data received from the first low-performance switching module to the second service forwarding module, and wherein the first high-performance switching module is further configured to connect to a second low-performance switching module in a third chassis that is to be added to the multi-chassis cluster data communications system, wherein the multi-chassis cluster data communications system doesn't include a central switching chassis such that a footprint of the multi-chassis cluster data communications system is reduced, and wherein the third chassis is to be separately connected to the first chassis to facilitate a capacity expansion of the multi-chassis cluster data communications system.

11. The data communications system according to claim 10, wherein the first high-performance switching module is further configured to:

after the third chassis is added to the multi-chassis cluster data communications system, send data received from the second low-performance switching module to one of the first low-performance switching module, the first service forwarding module, or the second service forwarding module; and after the third chassis is added to the multi-chassis cluster data communications system, send data received from the one of the first low-performance switching module, the first service forwarding module, or the second service forwarding module to the second low-performance switching module.

12. A data communications method comprising:

sending, by a first high-performance switching module of a first chassis of a data communications system, data received from a third low-performance switching module of a third chassis of the data communications system to a second low-performance switching module of a second chassis of the data communications system, wherein the data communications system comprises the multi-chassis cluster data communications system including the first chassis, the second chassis and the third chassis, wherein the first chassis further comprises a first low-performance switching module, wherein the second chassis further comprises a second high-performance switching module, wherein the first high-performance switching module is connected to the second low-performance switching module, wherein the first high-performance switching module has a higher performance requirement than the first low-performance switching module, wherein the second high-performance switching module has a higher performance requirement than the second low-performance switching module, wherein the first high-performance module and the second high-performance module are to be connected to one or more low-performance modules, wherein the first low-performance module and the second low-performance module are to be connected to only one high-performance module, wherein the first low-performance switching module is connected to the second high-performance switching module, wherein the first high-performance switching module is configured to connect to the third low-performance switching module of the third chassis that is to be added to the multi-chassis cluster data communications system, and wherein the second high-performance switching module is configured to connect to a fourth low-performance switching module in the third chassis that is to be added to the multi-chassis cluster data communications system;

sending, by the first high-performance switching module, data received from the second low-performance switching module to the third low-performance switching module;

sending, by the second high-performance switching module, data received from the fourth low-performance switching module to the first low-performance switching module; and sending, by the second high-performance switching module, data received from the first low-performance switching module to the fourth low-performance switching module, wherein the multi-chassis cluster data communications system doesn't include a central switching chassis such that a footprint of the multi-chassis cluster data communications system is reduced, and wherein the third chassis is to be separately connected to the first chassis and the second chassis to facilitate a capacity expansion of the multi-chassis cluster data communications system.

13. The method according to claim 12, wherein the multi-chassis cluster data communications system further comprises a fourth chassis, wherein the fourth chassis comprises a fifth low-performance switching module and a sixth low-performance switching module,
wherein the first high-performance switching module is connected to the fifth low-performance switching module, and wherein the second high-performance switching module is connected to the sixth low-performance switching module.

14. The method according to claim 13, further comprising:
sending, by the first high-performance switching module, data received from the fifth low-performance switching module to the second low-performance switching module; and
sending, by the first high-performance switching module, data received from the second low-performance switching module to the fifth low-performance switching module.

15. The method according to claim 12, wherein the multi-chassis cluster data communications system further comprises a fifth chassis having a third high-performance switching module, a seventh low-performance switching module and an eighth low-performance switching module, wherein the first chassis further comprises a ninth low-performance switching module, —wherein the second chassis further comprises a tenth low-performance switching module,
wherein the third high-performance switching module is connected to the ninth low-performance switching module and the tenth low-performance switching module, wherein the first high-performance switching module is connected to the seventh low-performance switching module, —wherein the second high-performance switching module is connected to the eighth low-performance switching module, and
wherein the third high-performance switching module is configured to connect to an eleventh low-performance switching module in the third chassis that is to be added to the multi-chassis cluster data communications system,
the method further comprising:
sending, by the third high-performance switching module, data received from the eleventh low-performance switching module to one of the ninth low-performance switching module or the tenth low-performance switching module, and sending data received from the one of the ninth low-performance switching module or the tenth low-performance switching module to the eleventh low-performance switching module.

16. The method according to claim 15, wherein the multi-chassis cluster data communications system further comprises a sixth chassis, wherein the sixth chassis comprises a twelfth low-performance switching module, a thirteenth low-performance switching module and a fourteenth low-performance switching module, and
wherein the twelfth low-performance switching module is connected to the first high-performance switching module, the thirteenth low-performance switching module is connected to the second high-performance switching module, and the fourteenth low-performance switching module is connected to the third high-performance switching module.

17. The method according to claim 16, further comprising:
sending, by the first high-performance switching module, data received from the twelfth low-performance switching module to one of the second low-performance switching module and the seventh low-performance switching module; and
sending, by the first high-performance switching module, data received from the one of the second low-performance switching module and the seventh low-performance switching module to the twelfth low-performance switching module.

18. The method according to claim 15, further comprising:
sending, by the first high-performance switching module, data received from the second low-performance switching module to the seventh low-performance switching module;
sending, by the first high-performance switching module, data received from the seventh low-performance switching module to the second low-performance switching module;
sending, by the first high-performance switching module, data received from the third low-performance switching module to one of the second low-performance switching module and the seventh low-performance switching module; and
sending, by the first high-performance switching module, data received from the one of the second low-performance switching module and the seventh low-performance switching module to the third low-performance switching module.

19. The method according to claim 12, wherein the first chassis further comprises a first service forwarding module and a second service forwarding module, wherein the first service forwarding module and the second service forwarding module are configured to communicate with a device outside the multi-chassis cluster data communications system, the method further comprising:
sending, by the first low-performance switching module, data received from the first service forwarding module to the second high-performance switching module; and
sending, by the first low-performance switching module, data received from the second high-performance switching module to the second service forwarding module.

20. The method according to claim 12, wherein the first chassis further comprises a third service forwarding module and a fourth service forwarding module, wherein the third service forwarding module and the fourth service forwarding module are configured to communicate with a multi-chassis cluster device outside the data communications system, the method further comprising:
sending, by the first high-performance switching module, data received from the third service forwarding module to the second low-performance switching module; and
sending, by the second low-performance switching module, data received from the second high-performance switching module to the fourth service forwarding module.

* * * * *